United States Patent

Uenoyama et al.

[11] Patent Number: 5,982,432
[45] Date of Patent: Nov. 9, 1999

[54] METHOD AND APPARATUS FOR CONVERTING COLOR COMPONENT TYPE OF PICTURE SIGNALS, METHOD AND APPARATUS FOR CONVERTING COMPRESSION FORMAT OF PICTURE SIGNALS AND SYSTEM FOR PROVIDING PICTURE SIGNALS OF A REQUIRED COMPRESSION FORMAT

[75] Inventors: Tsutomu Uenoyama, Kawasaki; Daisaku Komiya, Tokyo, both of Japan

[73] Assignee: Matsushita Electric Industrial Co., Ltd., Osaka, Japan

[21] Appl. No.: 09/030,819

[22] Filed: Feb. 26, 1998

[30] Foreign Application Priority Data

Feb. 27, 1997 [JP] Japan .................................. 9-58604
Jun. 16, 1997 [JP] Japan ................................. 9-172740

[51] Int. Cl.⁶ ............................................ H04N 7/24
[52] U.S. Cl. ..................... 348/391; 348/393; 348/396; 348/453
[58] Field of Search ................................ 348/391–398, 348/453, 581, 582; 382/238, 240, 248

[56] References Cited

U.S. PATENT DOCUMENTS

| | | | |
|---|---|---|---|
| 5,253,056 | 10/1993 | Puri et al. | 348/409 |
| 5,412,428 | 5/1995 | Tahara | 348/395 |
| 5,539,663 | 7/1996 | Agarwal | 348/396 |
| 5,650,824 | 7/1997 | Huang | 348/453 |
| 5,712,687 | 1/1998 | Naveen | 348/453 |

FOREIGN PATENT DOCUMENTS 837672 2/1996 Japan .
984011 3/1997 Japan .

OTHER PUBLICATIONS

"Information technology—Coding of moving pictures and associated audio for digital storage media at up to about 1,5 Mbit/s—Part 2: Video"; ISO/IEC 11172–2: 1993 (E).

"Information technology—Generic coding of moving pictures and associated audio information: Video"; ISO/IEC 13818–2:1996 (E).

*Primary Examiner*—Victor R. Kostak
*Attorney, Agent, or Firm*—Lowe Hauptman Gopstein Gilman & Berner

[57] ABSTRACT

In this picture signal converting apparatus, digital picture signals compressed in a DVC format are decoded to non-compressed picture signals of a 4:1:1 color component type which are composed of color difference signals and luminance signals. The color difference signals of the 4:1:1 color component type arranged in a matrix are removed on every other row to halve the number of color difference signals in a y direction, and a color difference signal is added to a position between each pair of color difference signals adjacent to each other in an x direction to double the number of color difference signals in the x direction. Therefore, converted color difference signals of a 4:2:0 color component type are produced from the color difference signals. Values of the converted color difference signals are determined according to values of the color difference signals. Thereafter, the converted color difference signals and the luminance signals of the non-compressed picture signals are combined to produce converted digital picture signals of the 4:2:0 color component type.

44 Claims, 37 Drawing Sheets

FIG. 1A PRIOR ART
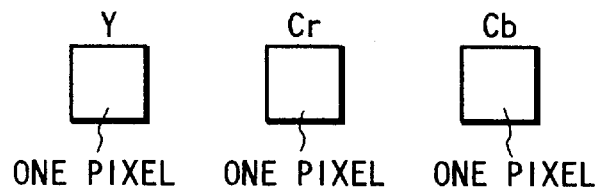
FIG. 1B PRIOR ART
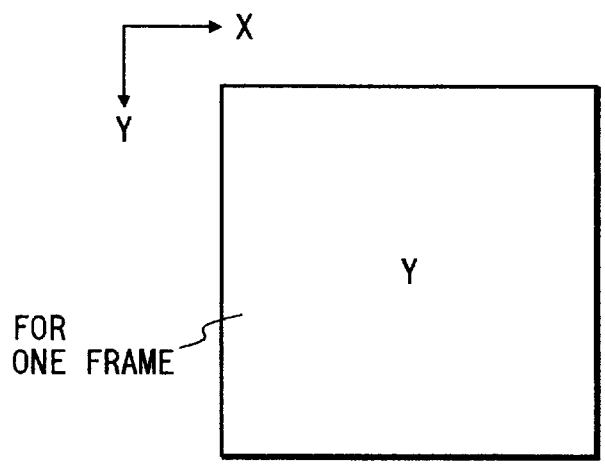
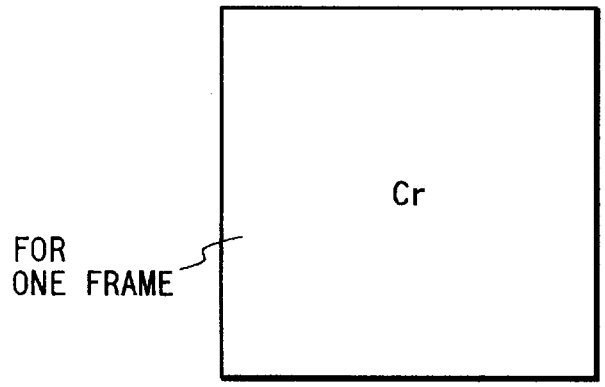
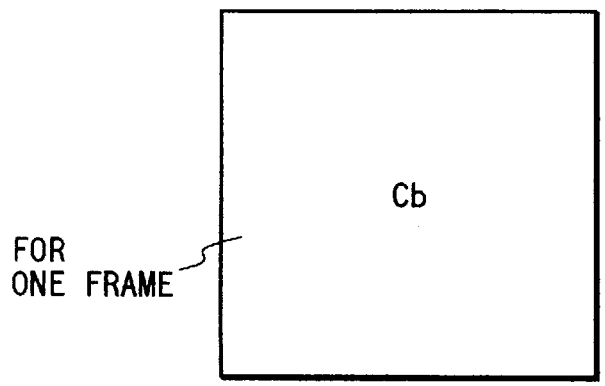

FIG. 4A PRIOR ART
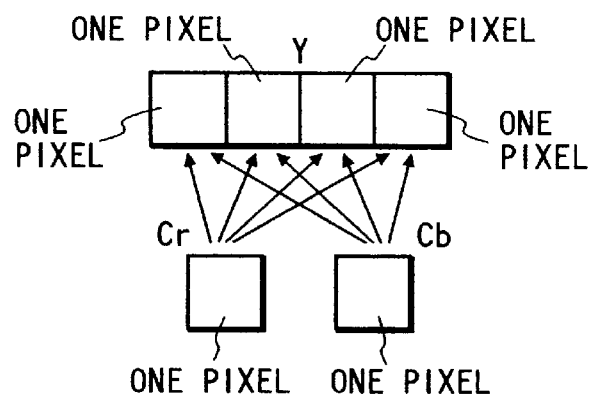
FIG. 4B PRIOR ART
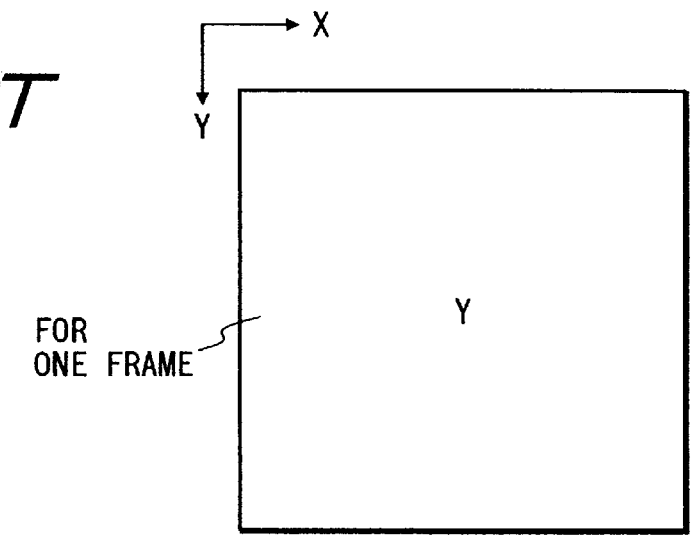
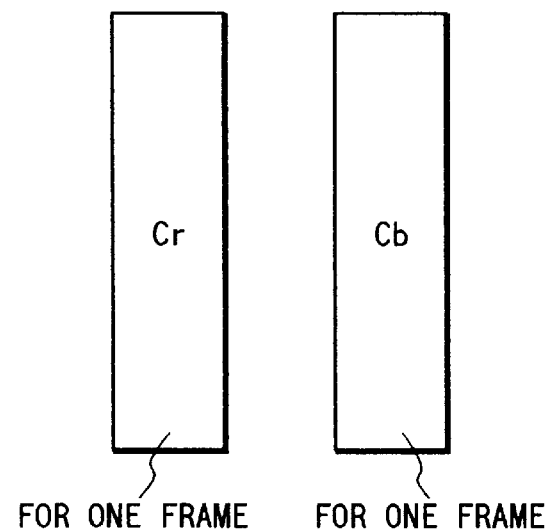

FIG. 8A

| Y0.0 | Y1.0 | Y2.0 | Y3.0 | Y4.0 | Y5.0 | Y6.0 | Y7.0 |
|------|------|------|------|------|------|------|------|
| Y0.1 | Y1.1 | Y2.1 | Y3.1 | Y4.1 | Y5.1 | Y6.1 | Y7.1 |
| Y0.2 | Y1.2 | Y2.2 | Y3.2 | Y4.2 | Y5.2 | Y6.2 | Y7.2 |
| Y0.3 | Y1.3 | Y2.3 | Y3.3 | Y4.3 | Y5.3 | Y6.3 | Y7.3 |

FIG. 8B

| $U^1 0.0$ | $U^1 1.0$ |
|-----------|-----------|
| $U^1 0.1$ | $U^1 1.1$ |
| $U^1 0.2$ | $U^1 1.2$ |
| $U^1 0.3$ | $U^1 1.3$ |

FIG. 8C

| $V^1 0.0$ | $V^1 1.0$ |
|-----------|-----------|
| $V^1 0.1$ | $V^1 1.1$ |
| $V^1 0.2$ | $V^1 1.2$ |
| $V^1 0.3$ | $V^1 1.3$ |

FIG. 8D

| $U^2 0.0$ | $U^2 1.0$ | $U^2 2.0$ | $U^2 3.0$ |
|-----------|-----------|-----------|-----------|
| $U^2 0.1$ | $U^2 1.1$ | $U^2 2.1$ | $U^2 3.1$ |

FIG. 8E

| $V^2 0.0$ | $V^2 1.0$ | $V^2 2.0$ | $V^2 3.0$ |
|-----------|-----------|-----------|-----------|
| $V^2 0.1$ | $V^2 1.1$ | $V^2 2.1$ | $V^2 3.1$ |

FIG. 10A

| Y0.0 | Y1.0 | Y2.0 | Y3.0 | Y4.0 | Y5.0 | Y6.0 | Y7.0 |
|---|---|---|---|---|---|---|---|
| Y0.1 | Y1.1 | Y2.1 | Y3.1 | Y4.1 | Y5.1 | Y6.1 | Y7.1 |

FIG. 10B

| U'0.0 | U'1.0 | U'2.0 | U'3.0 |
|---|---|---|---|
| U'0.1 | U'1.1 | U'2.1 | U'3.1 |

| V'0.0 | V'1.0 | V'2.0 | V'3.0 |
|---|---|---|---|
| V'0.1 | V'1.1 | V'2.1 | V'3.1 |

FIG. 10C

| U'0.0 | U'2.0 |
|---|---|
| U'0.1 | U'2.1 |

| V'0.0 | V'2.0 |
|---|---|
| V'0.1 | V'2.1 |

FIG. 11A

| 0 | 100 |
|---|---|
| 100 | 0 |
| 100 | 0 |
| 0 | 0 |

FIG. 11B

| 0 | 0 | 100 | 100 |
|---|---|---|---|
| 100 | 100 | 0 | 0 |

FIG. 11C

| 50 | 50 | 50 | 50 |
|---|---|---|---|
| 50 | 50 | 0 | 0 |

FIG. 11D

| 50 | 50 | 50 | - |
|---|---|---|---|
| 50 | 25 | 0 | - |

FIG. 11E

| 50 | 50 | - | - |
|---|---|---|---|
| 38 | 13 | - | - |

FIG. 12A

| 0 | 100 |
|---|---|
| 200 | 0 |
| 100 | 0 |
| 0 | 0 |

FIG. 13A

| 0 | 100 |
|---|---|
| 80 | 150 |
| 160 | 200 |
| 240 | 250 |

FIG. 12B

| 0 | 0 | 100 | 100 |
|---|---|---|---|
| 100 | 100 | 0 | 0 |

FIG. 13B

| 0 | 0 | 100 | 100 |
|---|---|---|---|
| 160 | 160 | 200 | 200 |

FIG. 12C

| 100 | 100 | 50 | 50 |
|---|---|---|---|
| 50 | 50 | 0 | 0 |

FIG. 13C

| 40 | 40 | 125 | 125 |
|---|---|---|---|
| 200 | 200 | 225 | 225 |

FIG. 12D

| 100 | 75 | 50 | - |
|---|---|---|---|
| 50 | 25 | 0 | - |

FIG. 13D

| 40 | 83 | 125 | - |
|---|---|---|---|
| 200 | 213 | 225 | - |

FIG. 12E

| 88 | 63 | - | - |
|---|---|---|---|
| 38 | 13 | - | - |

FIG. 13E

| 61 | 104 | - | - |
|---|---|---|---|
| 206 | 219 | - | - |

FIG. 17A

| 200 | 200 | 100 | 100 | 100 | 100 | 100 | 100 |
|-----|-----|-----|-----|-----|-----|-----|-----|
| 200 | 200 | 100 | 100 | 100 | 100 | 100 | 100 |

FIG. 17B

| 0 | 200 |
|---|-----|
| 0 | 200 |

FIG. 17C

| 0 | 200 | 200 | - |
|---|-----|-----|---|

FIG. 17D

| 40 | 160 | - | - |
|----|-----|---|---|

FIG. 17E

| 0 | 0 | 200 | 200 |
|---|---|-----|-----|

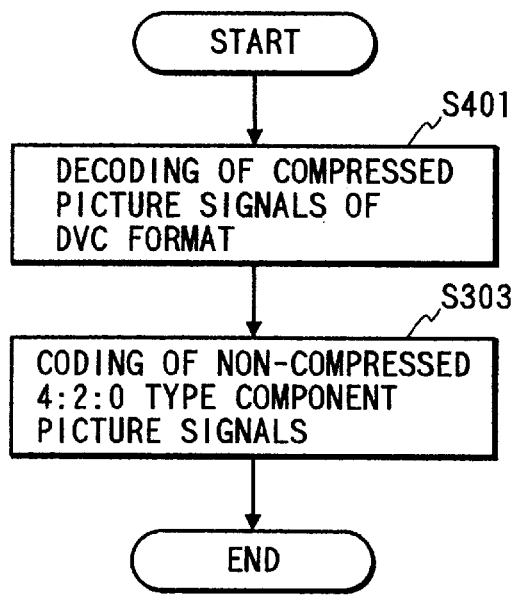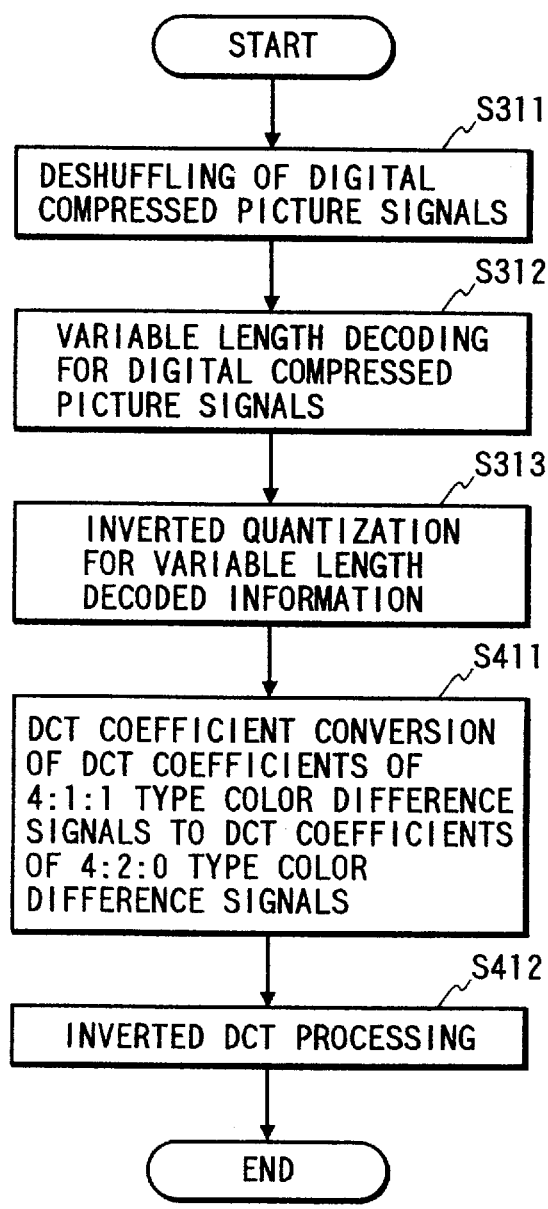

FIG. 40
A DCT BLOCK OF 4:1:1 TYPE
COLOR DIFFERENCE SIGNALS
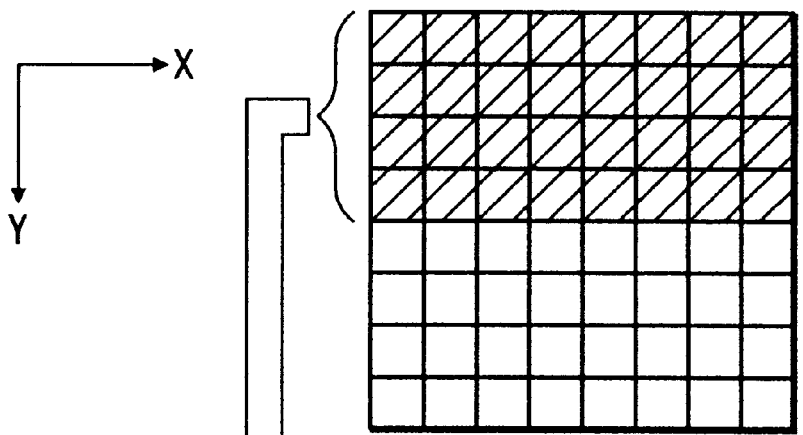
DCT COEFFICIENT CONVERSION
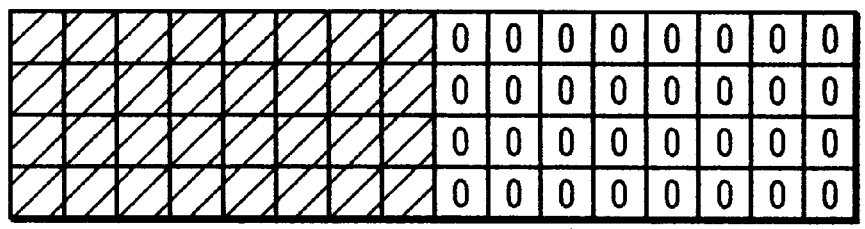
A DCT BLOCK OF 4:2:0 TYPE
COLOR DIFFERENCE SIGNALS
INVERTED DCT PROCESSING
4:2:0 TYPE COLOR DIFFERENCE SIGNALS
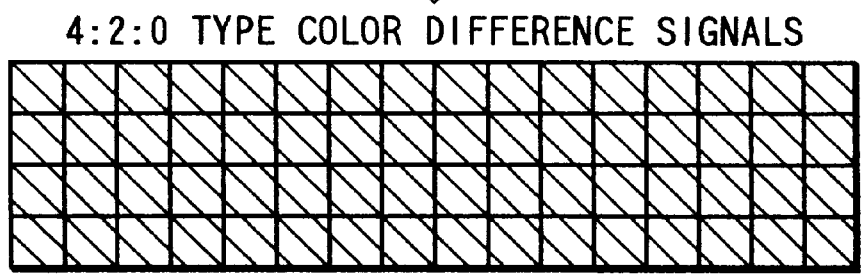

METHOD AND APPARATUS FOR CONVERTING COLOR COMPONENT TYPE OF PICTURE SIGNALS, METHOD AND APPARATUS FOR CONVERTING COMPRESSION FORMAT OF PICTURE SIGNALS AND SYSTEM FOR PROVIDING PICTURE SIGNALS OF A REQUIRED COMPRESSION FORMAT

BACKGROUND OF THE INVENTION

1. Field of the Invention

The present invention relates generally to a picture signal converting apparatus in which digital picture signals are converted, a picture signal converting method used in the picture signal converting apparatus and a picture providing system for providing picture signals obtained by converting digital picture signals in the picture signal converting apparatus, and more particularly to digital picture converting method and apparatus for directly converting digital picture signals based on a color component type or a compression format into digital picture signals based on another color component type or another compression format.

2. Description of the Related Art

Recently, a picture apparatus for processing digital picture signals has been often used, and digital picture signals of a color component type has been frequently used as the digital picture signals. In the digital picture signals of a color component type, a digital picture signal corresponding to one pixel is divided into a luminance signal Y and a first color difference signal Cr and a second color difference signal Cb, and there are many color component types respectively corresponding to a sampling frequency ratio of a group of two color difference signals Cr and Cb to a group of luminance signals.

A first color component type is a 4:4:4 color component type. As shown in FIG. 1A, one color difference signal Cr of one pixel and one color difference signal Cb of one pixel respectively correspond to a luminance signal Y of the same pixel for each pixel. Therefore, one luminance signal Y and two color difference signals Cr and Cb exist for each pixel. In this case, as shown in FIG. 1B, in cases where an X-Y co-ordinate system is considered for each type of signal Y, Cr and Cb, one luminance signal $Y_{(x,y)}$ placed at co-ordinates (x,y) corresponds to a pixel placed at co-ordinates (x,y) of a frame, two color difference signals $Cr_{(x,y)}$ and $Cb_{(x,y)}$ placed at co-ordinates (x,y) respectively correspond to the luminance signal $Y_{(x,y)}$. In this case, an information volume of luminance signals Y for one frame is the same as that of color difference signals Cr for one frame and that of color difference signals Cb for one frame. Here, x=0,1,2,3 - - - and y=0,1,2,3 - - - are satisfied.

A second color component type is a 4:2:2 color component type. As shown in FIG. 2A, one color difference signal Cr of one pixel and one color difference signal Cb of one pixel respectively correspond to two luminance signals of two pixels arranged in series. Therefore, as shown in FIG. 2B, in cases where an X-Y co-ordinate system is considered for each type of signal Y, Cr and Cb, one luminance signal $Y_{(x,y)}$ placed at co-ordinates (x,y) corresponds to a pixel placed at co-ordinates (x,y) of a frame, two color difference signals $Cr_{(x,y)}$ and $Cb_{(x,y)}$ respectively correspond to one luminance signal $Y_{(2x,y)}$ and one luminance signal $Y_{(2x+1,y)}$. In this case, an information volume of color difference signals Cr for one frame and an information volume of color difference signals Cb for one frame are respectively half that of luminance signals Y for one frame.

A third color component type is a 4:2:0 color component type. As shown in FIG. 3A, a color difference signal Cr of one pixel and a color difference signal Cb of one pixel respectively correspond to four luminance signals of four pixels arranged in a matrix of two lines and two rows. Therefore, as shown in FIG. 3B, in cases where an X-Y co-ordinate system is considered for each type of signal Y, Cr and Cb, one luminance signal $Y_{(x,y)}$ placed at co-ordinates (x,y) corresponds to a pixel placed at co-ordinates (x,y) of a frame, two color difference signals $Cr_{(x,y)}$ and $Cb_{(x,y)}$ respectively correspond to one luminance signal $Y_{(2x,2y)}$, one luminance signal $Y_{(2x+1,2y)}$, one luminance signal $Y_{(2x,2y+1)}$ and one luminance signal $Y_{(2x+1,2y+1)}$. In this case, an information volume of color difference signals Cr for one frame and an information volume of color difference signals Cb for one frame are respectively a quarter of that of luminance signals Y for one frame.

A fourth color component type is a 4:1:1 color component type. As shown in FIG. 4A, a color difference signal Cr of one pixel and a color difference signal Cb of one pixel respectively correspond to four luminance signals of four pixels arranged in series. Therefore, as shown in FIG. 4B, in cases where an X-Y co-ordinate system is considered for each type of signal Y, Cr and Cb, one luminance signal $Y_{(x,y)}$ placed at co-ordinates (x,y) corresponds to a pixel placed at co-ordinates (x,y) of a frame, two color difference signals $Cr_{(x,y)}$ and $Cb_{(x,y)}$ respectively correspond to one luminance signal $Y_{(4x,y)}$, one luminance signal $Y_{(4x+1,y)}$, one luminance signal $Y_{(4x+2,y)}$ and one luminance signal $Y_{(4x+3,y)}$. In this case, an information volume of color difference signals Cr for one frame and an information volume of color difference signals Cb for one frame are respectively a quarter of that of luminance signals Y for one frame.

2.1. Previously Proposed Art

A digital picture signal has been recently used in various video apparatuses such as a camera with a video tape recorder for public use or in the personal computers, so that a digital picture signal converting apparatus has been rapidly widespread. In general, the digital picture signal used in the personal computers and the video apparatuses for public use is compressed at a standardized compression format, and two types of compression formats are frequently used.

A first type of compression format is based on image compression standards of moving picture experts group 1 (MPEG1) or image compression standards of moving picture experts group 2 (MPEG2). The compression format based on MPEG1 or MPEG2 is often used for the picture signal used in a computer. In the compression formats based on MPEG1 and MPEG2, a time-redundancy between frames is reduced by performing a motion compensation, a space-redundancy in each frame is reduced by performing a discrete cosine transform, and a code volume is reduced by performing a variable length coding. MPEG1 is explained in a literature of ISO/IEC 11172-2 "Information Technology—Coding of Moving Pictures and Associated Audio for Digital Storage Media at up to about 1.5 Mbits/s—Part 2: Video", and MPEG2 is explained in a literature of ISO/IEC 13818-2 "Information Technology—Generic Coding of Moving Pictures and Associated Audio Information—Part 2: Video". Therefore, a detail description of MPEG1 and MPEG2 is omitted.

FIG. 5 is a block diagram of a conventional MPEG data producing apparatus in which MPEG data is produced according to the compression format based on MPEG1 or MPEG2.

As shown in FIG. 5, when a user uses an analog video apparatus 101 with an analog signal output terminal such as a video tape player or a video camera on condition that the analog video apparatus 101 has no digital signal output terminal, an analog picture signal output from the analog video apparatus 101 is converted into a non-compressed digital picture signal in an analog-to-digital converter 102. Also, when the user uses a digital video apparatus 103 with a digital signal output terminal, a non-compressed digital picture signal is directly output from the digital video apparatus 103. Thereafter, the non-compressed digital picture signal is input to an MPEG encoder 104, and MPEG data are produced from the non-compressed digital picture signal in the MPEG encoder 104 according to the compression format based on MPEG1 or MPEG2.

In this case, the non-compressed digital picture signal input to the MPEG encoder 104 is classified into the 4:2:2 color component type or the 4:4:4 color component type, all MPEG data based on MPEG1 is classified into the 4:2:0 color component type, and many MPEG data based on MPEG2 is classified into the 4:2:0 color component type.

A second type of compression format is based on image compression standards of DV, DVC, DVCPR0 or DVcam. The image compression standards are applied for a picture (or video) signal used in a digital video apparatus including a video apparatus for public use. Because signal data structures and compression formats based on DV, DVC, DVCPR0 and DVcam are similar to each other, DVC, DVCPR0 and DVcam are treated as DV in this specification. DV is image compression standards enacted in 1996 for a video cassette recorder and is based on "Specifications of Consumer-Use Digital VCRs (HD Digital VCR Conference, 1996)". A video apparatus using a picture signal based on DV has been recently widespread rapidly. Also, a video camera for public use has been widespread rapidly as a video apparatus using a picture signal based on DV, so that people can easily produce a picture signal based on DV at a low cost.

In the compression format based on DV, redundancy in each frame is reduced by performing a discrete cosine transform, and a code volume is reduced by performing a variable length coding. In addition, positions of data are changed in each frame in macroblock unit by performing a shuffling processing for a compressed signal based on DV.

A picture signal input or output to/from a video apparatus using a picture signal based on DV is classified into the 4:2:2 color component type or the 4:4:4 color component type, and the picture signal used in the video apparatus usually is classified into the 4:1:1 color component type.

As compared with MPEG data of an MPEG picture signal based on MPEG1 or MPEG2, when DV data of a DV picture signal based on DV is used, because the DV data are independently used for each frame, an editing operation of the DV data such as "cut & paste" can be easily performed for each frame. Also, because a code volume of the DV data for each frame is high and is almost six times as high as that of the MPEG data, a high quality image can be generally reproduced in case of the DV data.

Also, because the DV data having merits of the high quality image and the easy edition can be input to a computer, when a user operates a computer to process a picture, the user desires to use DV data of the picture in an input operation, an editing operation and a data storing operation for the purpose of easily processing the DV data and reproducing the picture at high quality. Also, the user desires to use MPEG data obtained from the DV data when the user transmits the picture to another computer through an internet or the like.

2.2. Problems to be Solved by the Invention

To produce the MPEG data from the DV data, it is required that the user uses a video apparatus using the DV picture signal as the digital video apparatus 103 and connects the video apparatus with the MPEG encoder 104. Therefore, two apparatuses such as the video apparatus using the DV picture signal and the MPEG encoder 104 are necessarily required, so that the user cannot process a picture at a low cost.

To process the picture at a low cost, there is an idea that the DV data of the picture input to a computer is directly converted into the MPEG data according to a software program without using any MPEG encoder. However, in cases where the DV data is directly converted into the MPEG data according to a software program, there are following problems. That is, there is no method for directly converting a 4:1:1 color component type digital picture signal used in a digital video apparatus, in which the DV data is processed, into a 4:2:0 color component type digital picture signal used for the MPEG data (first problem). Also, in cases where the DV data are decoded and the MPEG data are encoded, because a processing volume of the decoding and encoding operation is large, it takes a lot of time to perform the decoding and encoding operation in a general computer (second problem).

SUMMARY OF THE INVENTION

A first object of the present invention is to provide, with due consideration to the drawbacks of such a conventional picture signal converting apparatus and a conventional picture signal converting method, a picture signal converting apparatus and a picture signal converting method in which the direct conversion of a plurality of digital picture signals of a first color component type into a plurality of digital picture signals of a second color component type is easily and rapidly performed at a low cost.

A second object of the present invention is to provide a picture signal converting apparatus and a picture signal converting method in which the direct conversion of a plurality of digital picture signals compressed in a first compression format into a plurality of digital picture signals compressed in a second compression format is easily and rapidly performed at a low cost.

A third object of the present invention is to provide a picture providing system for providing a plurality of digital picture signals compressed according to a compression format requested by a user.

The first object is achieved by the provision of a picture signal converting apparatus comprising:

receiving means for receiving a digital picture signal of a 4:1:1 color component type for each of pixels of a frame, the digital picture signals being arranged in a matrix of rows and columns;

color difference signal converting means for directly converting color difference signals of the digital picture signals received by the receiving means into converted color difference signals of converted digital picture signals of a 4:2:0 color component type by removing color difference signals on every other row from the color difference signals of the digital picture signals to halve the number of color difference signals in a y direction, adding a color difference signal to a position between each pair of color difference signals adjacent to each other in an x direction to double the number of color difference signals in the x direction and setting the color difference signals, of which the number is halved in the y direction and is doubled in the x direction, as the converted color difference signals of the 4:2:0 color component type, and setting values of the converted color difference signals of the 4:2:0 color component type according to values of the color difference signals of the digital picture signals received by the receiving means; and outputting means for combining luminance signals of the digital picture signals received by the receiving means and the converted color difference signals of the converted digital picture signals of the 4:2:0 color component type obtained by the color difference signal converting means for each pixel of the frame to produce digital picture signals of the 4:2:0 color component type and outputting the digital picture signals of the 4:2:0 color component type.

In the above configuration, a color difference signal of the 4:1:1 color component type corresponds to four luminance signals of four pixels placed at co-ordinates (x,y), (x+1,y), (x,y+1) and (x+1,y+1), and a color difference signal of the 4:2:0 color component type corresponds to four luminance signals of four pixels placed at co-ordinates (x,y), (x+1,y), (x+2,y) and (x+3,y). Therefore, in cases where the number of color difference signals in the y direction is halved and the number of color difference signals in the x direction is doubled, the color difference signals of the 4:1:1 color component type are converted into converted color difference signals of the 4:2:0 color component type. In this case, values of the converted color difference signals are determined according to values of the color difference signals.

Also, because luminance signals of digital picture signals of the 4:1:1 color component type are the same as those of the digital picture signals of the 4:2:0 color component type, digital picture signals of the 4:2:0 color component type are produced by combining luminance signals of the digital picture signals of the 4:1:1 color component type and the converted color difference signals of the 4:2:0 color component type.

Accordingly, because the color difference signals of the 4:1:1 color component type can be easily converted into the converted color difference signals of the 4:2:0 color component type, the direct conversion of the digital picture signals of the 4:1:1 color component type into the digital picture signals of the 4:2:0 color component type can be easily and rapidly performed.

It is preferred that the color difference signal converting means comprise y-directional signal halving means for removing color difference signals on every other row from the color difference signals of the digital picture signals to halve the number of color difference signals in the y direction; and x-directional signal doubling means for adding a color difference signal to a position between each pair of color difference signals which are obtained by the y-directional signal halving means and are adjacent to each other in an X direction, setting a value of one added color difference signal to a value of one color difference signal adjacent to the added color difference signal in the x direction for each added color difference signal to double the number of color difference signals obtained by the y-directional signal halving means in the x direction and outputting the color difference signals as the converted color difference signals of the 4:2:0 color component type.

In the above configuration, when a color difference signal is added to a position between each pair of color difference signals adjacent to each other in an X direction to double the number of color difference signals in the x direction, a value of each added color difference signal is set to a value of one color difference signal adjacent to the added color difference signal in the x direction.

Accordingly, because any arithmetic calculation is not required to convert the color difference signals of the 4:1:1 color component type into the color difference signals of the 4:2:0 color component type, the color signal converting operation can be easily performed.

The above features of the present invention are also obtained by the provision of a picture signal converting method, comprising the steps of:

receiving a digital picture signal of a 4:1:1 color component type for each of pixels of a frame;

extracting color difference signals placed at co-ordinates (x,y) of an X-Y co-ordinate system (x=0,1,2,3, - - - , and y=0,1,2,3, - - - ) from the digital picture signals;

halving the number of color difference signals in a y direction by removing color difference signals placed at co-ordinates (x,2y) of even-numbered y values or co-ordinates (x,2y+1) of odd-numbered y values;

doubling the number of color difference signals in an x direction by adding a color difference signal to a position between each pair of color difference signals adjacent to each other in the X direction;

setting a value of one added color difference signal to a value of one color difference signal adjacent to the added color difference signal in the x direction for each added color difference signal to produce converted color difference signals of a 4:2:0 color component type from the color difference signals in which the number of converted color difference signals is halved in the y direction as compared with the number of color difference signals and the number of converted color difference signal is doubled in the x direction as compared with the number of color difference signals;

combining the converted color difference signals and luminance signals of the digital picture signals to produce digital picture signals of the 4:2:0 color component type; and outputting the digital picture signals of the 4:2:0 color component type.

Also, it is preferred that the color difference signal converting means comprise signal value setting means for setting values of two color difference signals of co-ordinates (x,2y) and (x,2y+1) (or (x,2y+1) and (x,2y+2)) adjacent to each other in a y direction to an average of values of the color difference signals of the co-ordinates (x,2y) and (x,2y+1) (or (x,2y+1) and (x,2y+2)) for each pair of color difference signals of co-ordinates (x,2y) and (x,2y+1) (or (x,2y+1) and (x,2y+2));

y-directional signal halving means for removing color difference signals on every other row from the color difference signals, of which the values are set by the signal value setting means, to halve the number of color difference signals in the y direction; and x-directional signal doubling means for adding a color difference signal to a position between each pair of color difference signals which are obtained by the y-directional signal halving means and are adjacent to each other in an X direction, setting a value of one added color difference signal to a value of a color difference signal adjacent to the added color difference signal in the x direction for each added color difference signal to double the number of color difference signals obtained by the y-directional signal halving means in the x direction and outputting the color difference signals as the converted color difference signals of the 4:2:0 color component type.

In the above configuration, an average of values of two color difference signals of co-ordinates (x,2y) and (x,2y+1) (or (x,2y+1) and (x,2y+2)) is calculated, and the average is set as values of the color difference signals. Thereafter, the number of color difference signals in the y direction is halved, and the number of color difference signals in the x direction is doubled.

Accordingly, because values of all color difference signals are used to set values of the converted color difference signals, color information of the digital picture signals of the 4:1:1 color component type can be faithfully maintained in the digital picture signals of the 4:2:0 color component type. Therefore, an original picture indicated by the digital picture signals of the 4:1:1 color component type can be faithfully reproduced at a high quality by producing a reproduced picture from the digital picture signals of the 4:2:0 color component type.

Also, because an average of values of two color difference signals of co-ordinates (x,2y) and (x,2y+1) (or (x,2y+1) and (x,2y+2)) is set as values of the color difference signals, even though a noise is undesirably added to a particular color difference signal, an adverse influence of the noise on the converted color difference signals can be reduced to half.

Also, because the calculation of the arithmetic average is only required in the signal value setting means, the arithmetic calculation is easy.

The above features of the present invention are also obtained by the provision of a picture signal converting method, comprising the steps of:

receiving a digital picture signal of a 4:1:1 color component type for each of pixels of a frame;

extracting color difference signals placed at co-ordinates (x,y) of an X-Y co-ordinate system (x=0,1,2,3, - - -, and y=0,1,2,3, - - - ) from the digital picture signals;

calculating an average of values of two color difference signals of co-ordinates (x,2y) and (x,2y+1) (or (x,2y+1) and (x,2y+2)) adjacent to each other in a y direction for each pair of color difference signals;

setting each average as values of the color difference signals of the co-ordinates (x,2y) and (x,2y+1) (or (x,2y+1) and (x,2y+2));

halving the number of color difference signals in the y direction by removing color difference signals placed at co-ordinates (x,2y) of even-numbered y values or co-ordinates (x,2y+1) of odd-numbered y values;

doubling the number of color difference signals in an x direction by adding a color difference signal to a position between each pair of color difference signals adjacent to each other in the X direction;

setting a value of one added color difference signal to a value of one color difference signal adjacent to the added color difference signal in the x direction for each added color difference signal to produce converted color difference signals of a 4:2:0 color component type from the color difference signals in which the number of converted color difference signals is halved in the y direction as compared with the number of color difference signals and the number of converted color difference signal is doubled in the x direction as compared with the number of color difference signals;

combining the converted color difference signals and luminance signals of the digital picture signals to produce digital picture signals of the 4:2:0 color component type; and outputting the digital picture signals of the 4:2:0 color component type.

Also, it is preferred that the color difference signal converting means comprise signal value setting means for setting values of two color difference signals of co-ordinates (x,2y) and (x,2y+1) (or (x,2y+1) and (x,2y+2)) adjacent to each other in the y direction to an average of values of the color difference signals of the co-ordinates (x,2y) and (x,2y+1) (or (x,2y+1) and (x,2y+2)) for each pair of color difference signals of co-ordinates (x,2y) and (x,2y+1) (or (x,2y+1) and (x,2y+2));

y-directional signal halving means for removing color difference signals on every other row from the color difference signals, of which the values are set by the signal value setting means, to halve the number of color difference signals in the y direction; and x-directional signal doubling means for adding a color difference signal to a position between each pair of color difference signals which are obtained by the y-directional signal halving means and are adjacent to each other in an X direction, setting a value of one added color difference signal to an interpolated value of the values of the color difference signals placed on both sides of the added color difference signal in the x direction for each added color difference signal to double the number of color difference signals obtained by the y-directional signal halving means in the x direction and outputting the color difference signals as the converted color difference signals of the 4:2:0 color component type.

In the above configuration, an average of values of two color difference signals of co-ordinates (x,2y) and (x,2y+1) (or (x,2y+1) and (x,2y+2)) is set as values of the color difference signals by the signal value setting means, and the number of color difference signals in the y direction is halved by the y-directional signal halving means. Thereafter, in the x-directional signal doubling means, a color difference signal is added to a position between each pair of color difference signals adjacent to each other in an X direction, and a value of each added color difference signal is set to an interpolated value of the values of the color difference signals placed on both sides of the added color difference signal in the x direction to double the number of color difference signals in the x direction.

Accordingly, even though values of particular converted color difference signals placed on both sides of one added color difference signal in the x direction are considerably different from each other, because an interpolated value of the values of the particular converted color difference signals is set as a value of a converted color difference signal placed between the particular converted color difference signals, the change of the values of the three converted color difference signals is made smooth. Therefore, when a discrete cosine transform (DCT) is performed for the converted color difference signals of the 4:2:0 color component type, because color information of the converted color difference signals is concentrated in lower frequency portions, a compression efficiency can be improved.

The above features of the present invention are also obtained by the provision of a picture signal converting method, comprising the steps of:

receiving a digital picture signal of a 4:1:1 color component type for each of pixels of a frame;

9 extracting color difference signals placed at co-ordinates (x,y) of an X-Y co-ordinate system (x=0,1,2,3, - - - , and y=0,1,2,3, - - - ) from the digital picture signals;

calculating an average of values of two color difference signals of co-ordinates (x,2y) and (x,2y+1) (or (x,2y+1) and (x,2y+2)) adjacent to each other in a y direction for each pair of color difference signals;

setting each average as values of the color difference signals of the co-ordinates (x,2y) and (x,2y+1) (or (x,2y+1) and (x,2y+2));

halving the number of color difference signals in the y direction by removing color difference signals placed at co-ordinates (x,2y) of even-numbered y values or co-ordinates (x,2y+1) of odd-numbered y values;

adding a color difference signal to a position between each pair of color difference signals adjacent to each other in an X direction to double the number of color difference signals in the x direction;

setting a value of one added color difference signal to an interpolated value of the values of the color difference signals placed on both sides of the added color difference signal in the x direction for each added color difference signal to produce converted color difference signals of a 4:2:0 color component type from the color difference signals in which the number of converted color difference signals is halved in the y direction as compared with the number of color difference signals and the number of converted color difference signal is doubled in the x direction as compared with the number of color difference signals;

combining the converted color difference signals and luminance signals of the digital picture signals to produce digital picture signals of the 4:2:0 color component type; and outputting the digital picture signals of the 4:2:0 color component type.

Also, it is preferred that the color difference signal converting means comprise average value calculating means for calculating a first average of values of two color difference signals placed at co-ordinates (x,2y) and (x,2y+1) (or (x,2y+1) and (x,2y+2)) adjacent to each other in the y direction and a second average of values of two color difference signals placed at co-ordinates (x+1,2y) and (x+1,2y+1) (or (x+1,2y+1) and (x+1,2y+2)) adjacent to each other in the y direction for each group of color difference signals of the co-ordinates (x,2y), (x,2y+1), (x+1,2y) and (x+1,2y+1) (or (x,2y+1), (x,2y+2), (x+1,2y+1) and (x+1,2y+2));

interpolated value calculating means for calculating a first interpolated value obtained by weighting the first and second averages calculated by the average value calculating means at a first weighting ratio and a second interpolated value obtained by weighting the first and second averages at a second weighting ratio for each pair of first and second averages;

signal value setting means for setting the first interpolated value calculated by the interpolated value calculating means as values of the color difference signals of the co-ordinates (x,2y) and (x,2y+1) (or (x,2y+1) and (x,2y+2));

y-directional signal halving means for removing color difference signals on every other row from the color difference signals, of which the values are set by the signal value setting means, to halve the number of color difference signals in the y direction; and

10 x-directional signal doubling means for adding a color difference signal to a position between each pair of color difference signals adjacent to each other in an X direction, setting a value of one added color difference signal to the second interpolated value calculated by the interpolated value calculating means for each added color difference signal to double the number of color difference signals obtained by the y-directional signal halving means in the x direction and outputting the color difference signals as the converted color difference signals of the 4:2:0 color component type.

In the above configuration, a first interpolated value calculated from values of four color difference signals of co-ordinates (x,2y), (x,2y+1), (x+1,2y) and (x+1,2y+1) (or (x,2y+1), (x,2y+2), (x+1,2y+1) and (x+1,2y+2)) is set as values of the color difference signals of the co-ordinates (x,2y) and (x,2y+1) (or (x,2y+1) and (x,2y+2)) by the signal value setting means, and the number of color difference signals in the y direction is halved by the y-directional signal halving means. Thereafter, in the x-directional signal doubling means, a color difference signal is added to a position between each pair of color difference signals adjacent to each other in an X direction, and a value of each added color difference signal is set to a second interpolated value calculated from values of four color difference signals of co-ordinates (x,2y), (x,2y+1), (x+1,2y) and (x+1,2y+1) (or (x,2y+1), (x,2y+2), (x+1,2y+1) and (x+1,2y+2)) to double the number of color difference signals in the x direction.

Accordingly, even though values of color difference signals are considerably different from each other, because values of all converted color difference signals are determined according to the linear interpolation, the change of the values of the converted color difference signals can be made smooth. Therefore, when a discrete cosine transform (DCT) is performed for the converted color difference signals of the 4:2:0 color component type, because color information of the converted color difference signals is concentrated in lower frequency portions, a compression efficiency can be improved.

The above features of the present invention are also obtained by the provision of a picture signal converting method, comprising the steps of:

receiving a digital picture signal of a 4:1:1 color component type for each of pixels of a frame;

extracting color difference signals placed at co-ordinates (x,y) of an X-Y co-ordinate system (x=0,1,2,3, - - - , and y=0,1,2,3, - - - ) from the digital picture signals;

calculating a first average of values of two color difference signals of co-ordinates (x,2y) and (x,2y+1) (or (x,2y+1) and (x,2y+2)) adjacent to each other in a y direction and a second average of values of two color difference signals of co-ordinates (x+1,2y) and (x+1, 2y+1) (or (x+1,2y+1) and (x+1,2y+2)) adjacent to each other in the y direction for each group of color difference signals of the co-ordinates (x,2y), (x,2y+1), (x+1, 2y) and (x+1,2y+1) (or (x,2y+1), (x,2y+2), (x+1,2y+1) and (x+1,2y+2));

calculating a first interpolated value obtained by weighting the first and second averages at a first weighting ratio and a second interpolated value obtained by weighting the first and second averages at a second weighting ratio for each pair of first and second averages;

setting the first interpolated value as values of the color difference signals of the co-ordinates (x,2y) and (x,2y+1) (or (x,2y+1) and (x,2y+2));

halving the number of color difference signals in the y direction by removing color difference signals placed at co-ordinates (x,2y) of even-numbered y values or co-ordinates (x,2y+1) of odd-numbered y values;

adding a color difference signal to a position between each pair of color difference signals adjacent to each other in an X direction to double the number of color difference signals in the x direction;

setting a value of one added color difference signal to the second interpolated value for each added color difference signal to produce converted color difference signals of a 4:2:0 color component type from the color difference signals in which the number of converted color difference signals is halved in the y direction as compared with the number of color difference signals and the number of converted color difference signal is doubled in the x direction as compared with the number of color difference signals;

combining the converted color difference signals and luminance signals of the digital picture signals to produce digital picture signals of the 4:2:0 color component type; and outputting the digital picture signals of the 4:2:0 color component type.

Also, it is preferred that the color difference signal converting means comprise average value calculating means for calculating an average of values of two color difference signals placed at co-ordinates (x,2y) and (x,2y+1) adjacent to each other in the y direction for each pair of color difference signals;

weighting factor calculating means for obtaining luminance signals of the digital picture signals corresponding to the color difference signals of co-ordinates (x,2y) and (x+1,2y) as first referential luminance signals, calculating a first weighting factor and a second weighting factor from values of the first referential luminance signals, obtaining luminance signals of the digital picture signals corresponding to the color difference signals of co-ordinates (x,2y+1) and (x+1,2y+1) as second referential luminance signals and calculating a third weighting factor and a fourth weighting factor from values of the second referential luminance signals;

interpolated value calculating means for calculating a first multiplied value by multiplying the value of the color difference signal of the co-ordinates (x,2y) by the first weighting factor obtained by the weighting factor calculating means, calculating a second multiplied value by multiplying the value of the color difference signal of the co-ordinates (x+1,2y) by the second weighting factor obtained by the weighting factor calculating means, calculating a third multiplied value by multiplying the value of the color difference signal of the co-ordinates (x,2y+1) by the third weighting factor obtained by the weighting factor calculating means, calculating a fourth multiplied value by multiplying the value of the color difference signal of the co-ordinates (x+1,2y+1) by the fourth weighting factor obtained by the weighting factor calculating means and calculating an interpolated value from the first, second, third and fourth multiplied values;

signal value setting means for setting each average calculated by the average value calculating means as values of the color difference signals of the co-ordinates (x,2y) and (x,2y+1);

y-directional signal halving means for removing color difference signals on every other row from the color difference signals, of which the values are set by the signal value setting means, to halve the number of color difference signals in the y direction; and x-directional signal doubling means for adding a color difference signal to a position between each pair of color difference signals adjacent to each other in an X direction, setting a value of one added color difference signal to the interpolated value calculated by the interpolated value calculating means for each added color difference signal to double the number of color difference signals obtained by the y-directional signal halving means in the x direction and outputting the color difference signals as the converted color difference signals of the 4:2:0 color component type.

In the above configuration, the interpolated value set for each of converted color difference signals, which are arranged on every other column in the converted color difference signals of the 4:2:0 color component type output from the color difference signal converting means, is calculated while referring values of luminance signals corresponding to the converted color difference signal.

Accordingly, because the luminance signals are referred when the digital color signals of the 4:1:1 color component type are directly converted into the digital color signals of the 4:2:0 color component type, the correlation between color information and luminance information generally existing in a natural picture as a specific feature can be included in the converted color difference signals, and an image of the natural picture can be reproduced at high definition.

The above features of the present invention are also obtained by the provision of a picture signal converting method, comprising the steps of:

receiving a digital picture signal of a 4:1:1 color component type for each of pixels of a frame;

extracting color difference signals placed at co-ordinates (x,y) of an X-Y co-ordinate system (x=0,1,2,3, - - - , and y=0,1,2,3, - - - ) from the digital picture signals;

calculating an average of values of two color difference signals of co-ordinates (x,2y) and (x,2y+1) adjacent to each other in the y direction for each pair of color difference signals;

extracting luminance signals placed at co-ordinates (x,y) of an X-Y luminance co-ordinate system from the digital picture signals as first referential luminance signals on condition that the first referential luminance signals correspond to the color difference signals of co-ordinates (x,2y) and (x+1,2y);

calculating a first weighting factor and a second weighting factor from values of the first referential luminance signals;

extracting other luminance signals of the X-Y luminance co-ordinate system from the digital picture signals as second referential luminance signals on condition that the second referential luminance signals correspond to the color difference signals of co-ordinates (x,2y+1) and (x+1,2y+1);

calculating a third weighting factor and a fourth weighting factor from values of the second referential luminance signals;

calculating a first multiplied value by multiplying the value of the color difference signal of the co-ordinates (x,2y) by the first weighting factor, calculating a second multiplied value by multiplying the value of the color difference signal of the co-ordinates (x+1,2y) by the second weighting factor, calculating a third multiplied value by multiplying the value of the color difference signal of the co-ordinates (x,2y+1) by the third weighting factor, calculating a fourth multiplied value by multiplying the value of the color difference signal of the co-ordinates (x+1,2y+1) by the fourth weighting factor and calculating an interpolated value from the first, second, third and fourth multiplied values;

setting each average as values of the color difference signals of the co-ordinates (x,2y) and (x,2y+1);

halving the number of color difference signals in the y direction by removing color difference signals placed at co-ordinates (x,2y) of even-numbered y values or co-ordinates (x,2y+1) of odd-numbered y values;

adding a color difference signal to a position between each pair of color difference signals adjacent to each other in an X direction to double the number of color difference signals in the x direction;

setting a value of one added color difference signal to the interpolated value for each added color difference signal to produce converted color difference signals of a 4:2:0 color component type from the color difference signals in which the number of converted color difference signals is halved in the y direction as compared with the number of color difference signals and the number of converted color difference signal is doubled in the x direction as compared with the number of color difference signals;

combining the converted color difference signals and luminance signals of the digital picture signals to produce digital picture signals of the 4:2:0 color component type; and outputting the digital picture signals of the 4:2:0 color component type.

Also, it is preferred that the color difference signal converting means comprise weighting factor calculating means for obtaining luminance signals corresponding to the color difference signals of co-ordinates (x,2y) and (x+1,2y) as first referential luminance signals, calculating a first weighting factor, a second weighting factor, a third weighting factor and a fourth weighting factor from values of the first referential luminance signals, obtaining luminance signals corresponding to the color difference signals of co-ordinates (x,2y+1) and (x+1,2y+1) as second referential luminance signals and calculating a fifth weighting factor and a sixth weighting factor, a seventh weighting factor and an eighth weighting factor from values of the second referential luminance signals;

interpolated value calculating means for calculating a first multiplied value by multiplying the value of the color difference signal of the co-ordinates (x,2y) by the first weighting factor obtained by the weighting factor calculating means, calculating a second multiplied value by multiplying the value of the color difference signal of the co-ordinates (x+1,2y) by the second weighting factor obtained by the weighting factor calculating means, calculating a third multiplied value by multiplying the value of the color difference signal of the co-ordinates (x,2y+1) by the fifth weighting factor obtained by the weighting factor calculating means, calculating a fourth multiplied value by multiplying the value of the color difference signal of the co-ordinates (x+1,2y+1) by the sixth weighting factor obtained by the weighting factor calculating means, calculating a first interpolated value from the first, second, third and fourth multiplied values, calculating a fifth multiplied value by multiplying the value of the color difference signal of the co-ordinates (x,2y) by the third weighting factor obtained by the weighting factor calculating means, calculating a sixth multiplied value by multiplying the value of the color difference signal of the co-ordinates (x+1,2y) by the fourth weighting factor obtained by the weighting factor calculating means, calculating a seventh multiplied value by multiplying the value of the color difference signal of the co-ordinates (x,2y+1) by the seventh weighting factor obtained by the weighting factor calculating means, calculating an eighth multiplied value by multiplying the value of the color difference signal of the co-ordinates (x+1,2y+1) by the eighth weighting factor obtained by the weighting factor calculating means, calculating a second interpolated value from the fifth, sixth, seventh and eighth multiplied values;

signal value setting means for setting the first interpolated value calculated by the interpolated value calculating means as values of the color difference signals of the co-ordinates (x,2y) and (x,2y+1);

y-directional signal halving means for removing color difference signals on every other row from the color difference signals, of which the values are set by the signal value setting means, to halve the number of color difference signals in the y direction; and x-directional signal doubling means for adding a color difference signal to a position between each pair of color difference signals which are obtained by the y-directional signal halving means and are adjacent to each other in an X direction, setting a value of one added color difference signal to the second interpolated value calculated by the interpolated value calculating means for each added color difference signal to double the number color difference signals obtained by the y-directional signal halving means in the x direction and outputting the color difference signals as the converted color difference signals of the 4:2:0 color component type.

In the above configuration, the interpolated value set for each of the converted color difference signals of the 4:2:0 color component type output from the color difference signal converting means is calculated while referring values of luminance signals corresponding to the converted color difference signal.

Accordingly, because each converted color difference signal is determined according to the interpolation based on four color difference signals, even though values of the color difference signals are considerably different from each other, the change of the values of the converted color difference signals can be made smooth. Therefore, when a discrete cosine transform (DCT) is performed for the converted color difference signals of the 4:2:0 color component type, because color information of the converted color difference signals is concentrated in lower frequency portions, a compression efficiency can be improved.

Also, because the value of each converted color difference signal is determined by referring the luminance signals corresponding to the converted color difference signal, the correlation between color information and luminance information generally existing in a natural picture as a specific feature can be included in the converted color difference signals, and an image of the natural picture can be faithfully reproduced at high definition.

The above features of the present invention are also obtained by the provision of a picture signal converting method, comprising the steps of:

receiving a digital picture signal of a 4:1:1 color component type for each of pixels of a frame;

extracting color difference signals placed at co-ordinates (x,y) of an X-Y co-ordinate system (x=0,1,2,3, - - -, and y=0,1,2,3, - - - ) from the digital picture signals;

extracting luminance signals placed at co-ordinates (x,y) of an X-Y luminance co-ordinate system from the digital picture signals as first referential luminance signals on condition that the first referential luminance signals correspond to the color difference signals of co-ordinates (x,2y) and (x+1,2y);

calculating a first weighting factor, a second weighting factor, a third weighting factor and a fourth weighting factor from values of the first referential luminance signals;

extracting other luminance signals from the digital picture signals as second referential luminance signals on condition that the second referential luminance signals correspond to the color difference signals of co-ordinates (x,2y+1) and (x+1,2y+1);

calculating a fifth weighting factor and a sixth weighting factor, a seventh weighting factor and an eighth weighting factor from values of the second referential luminance signals;

calculating a first multiplied value by multiplying the value of the color difference signal of the co-ordinates (x,2y) by the first weighting factor;

calculating a second multiplied value by multiplying the value of the color difference signal of the co-ordinates (x+1,2y) by the second weighting factor;

calculating a third multiplied value by multiplying the value of the color difference signal of the co-ordinates (x,2y+1) by the fifth weighting factor;

calculating a fourth multiplied value by multiplying the value of the color difference signal of the co-ordinates (x+1,2y+1) by the sixth weighting factor;

calculating a first interpolated value from the first, second, third and fourth multiplied values;

calculating a fifth multiplied value by multiplying the value of the color difference signal of the co-ordinates (x,2y) by the third weighting factor;

calculating a sixth multiplied value by multiplying the value of the color difference signal of the co-ordinates (x+1,2y) by the fourth weighting factor;

calculating a seventh multiplied value by multiplying the value of the color difference signal of the co-ordinates (x,2y+1) by the seventh weighting factor;

calculating an eighth multiplied value by multiplying the value of the color difference signal of the co-ordinates (x+1,2y+1) by the eighth weighting factor;

calculating a second interpolated value from the fifth, sixth, seventh and eighth multiplied values;

setting the first interpolated value as values of the color difference signals of the co-ordinates (x,2y) and (x,2y+1);

halving the number of color difference signals in the y direction by removing color difference signals placed at co-ordinates (x,2y) of even-numbered y values or co-ordinates (x,2y+1) of odd-numbered y values;

adding a color difference signal to a position between each pair of color difference signals adjacent to each other in an X direction to double the number of color difference signals in the x direction;

setting a value of one added color difference signal to the second interpolated value for each added color difference signal to produce converted color difference signals of a 4:2:0 color component type from the color difference signals in which the number of converted color difference signals is halved in the y direction as compared with the number of color difference signals and the number of converted color difference signal is doubled in the x direction as compared with the number of color difference signals;

combining the converted color difference signals and luminance signals of the digital picture signals to produce digital picture signals of the 4:2:0 color component type; and outputting the digital picture signals of the 4:2:0 color component type.

The second object is achieved by the provision of a picture signal converting apparatus comprising:

receiving means for receiving a digital picture signal compressed in a first format for each of pixels of a frame;

picture decoding means for decoding the digital picture signals received by the receiving means to produce a plurality of non-compressed picture signals of a 4:1:1 color component type, the non-compressed picture signals being arranged in a matrix of rows and columns;

component signal converting means for directly converting color difference signals of the non-compressed picture signals obtained by the picture decoding means into a plurality of converted color difference signals of a 4:2:0 color component type by removing color difference signals on every other row from the color difference signals of the non-compressed picture signals to halve the number of color difference signals in a y direction and adding a color difference signal to a position between each pair of color difference signals adjacent to each other in an x direction to double the number of color difference signals in the x direction, setting values of the converted color difference signals of the 4:2:0 color component type according to values of the color difference signals of the non-compressed picture signals obtained by the picture decoding means and combining luminance signals of the non-compressed picture signals obtained by the picture decoding means and the converted color difference signals of the 4:2:0 color component type obtained by the color difference signal converting means for each pixel of the frame to produce non-compressed picture signals of the 4:2:0 color component type;

picture coding means for coding the non-compressed picture signals of the 4:2:0 color component type obtained by the component signal converting means to produce a plurality of digital picture signals compressed in a second format different from the first format; and output means for outputting the digital picture signals compressed in the second format obtained by the picture coding means.

In the above configuration, a plurality of digital picture signals compressed in a first format is decoded to a plurality of non-compressed picture signals of a 4:1:1 color component type, the non-compressed picture signals of the 4:1:1 color component type are directly converted into a plurality of converted color difference signals of a 4:2:0 color component type. In this conversion, color difference signals are removed on every other row from the color difference signals of the 4:1:1 color component type and color difference signals are added on every other column to remaining color difference signals. Therefore, a plurality of converted color difference signals of the 4:2:0 color component type, in which the number of signals in the y direction is half that of color difference signals of the 4:1:1 color component type and the number of converted color difference signals in the x direction is double that of color difference signals of the 4:1:1 color component type, are produced. Values of the converted color difference signals are determined according to values of the color difference signals of the 4:1:1 color component type. Thereafter, luminance signals of the non-compressed picture signals and the converted color difference signals of the 4:2:0 color component type are combined to produce non-compressed picture signals of the 4:2:0 color component type. Thereafter, the non-compressed picture signals of the 4:2:0 color component type are coded to a plurality of digital picture signals compressed in a second format.

Accordingly, in cases where a user uses a plurality of digital compressed picture signals compressed in the first format in his computer C1 and the transmission of signals compressed in the second format from the computer to another computer C2 through a network is more advantageous than that of signals compressed in the first format, the digital compressed picture signals compressed in the first format can be easily converted into a plurality of digital compressed picture signals compressed in the second format, and the digital compressed picture signals compressed in the second format can be rapidly transmitted to the computer C2 through a network.

The above features of the present invention are also obtained by the provision of a picture signal converting method, comprising the steps of:

receiving a digital picture signal compressed in a DVC format for each of pixels of a frame, the digital picture signals compressed in the DVC format being obtained by performing a discrete cosine transform (DCT) processing for each block of non-compressed picture signals of a 4:1:1 color component type to obtain a block of DCT coefficients from each block of non-compressed picture signals, quantizing each block of DCT coefficients to obtain a block of quantized values from each block of DCT coefficients, coding each block of quantized values to obtain a block of variable-length codes from each block of quantized values and recording each block of variable-length codes as the digital picture signals compressed in the DVC format;

decoding the digital picture signals to produce a plurality of non-compressed picture signals of a 4:1:1 color component type, the non-compressed picture signals being arranged in a matrix of rows and columns;

removing color difference signals on every other row from the color difference signals of the non-compressed picture signals to halve the number of color difference signals in a y direction;

adding a color difference signal to a position between each pair of color difference signals adjacent to each other in an x direction to double the number of color difference signals in the x direction;

setting values of the color difference signals according to values of the non-compressed picture signals of the 4:1:1 color component type to directly convert the color difference signals of the 4:1:1 color component type into converted color difference signals of a 4:2:0 color component type;

combining luminance signals of the non-compressed picture signals of the 4:1:1 color component type and the converted color difference signals of the 4:2:0 color component type for each pixel of the frame to produce non-compressed picture signals of the 4:2:0 color component type;

coding the non-compressed picture signals of the 4:2:0 color component type to produce a plurality of digital picture signals compressed in a moving picture experts group (MPEG) format in which a time-redundancy between frames is reduced by performing a motion compensation, a space-redundancy in each frame is reduced by performing a discrete cosine transform and a code volume is reduced by performing a variable length coding; and outputting the digital picture signals compressed in the MPEG format.

It is preferred that the first format be the DVC format, the second format be the MPEG format, the picture decoding means comprise preparing means for deshuffling the digital picture signals to rearrange the digital picture signals;

variable-length decoding means for performing a variable-length decoding for the digital picture signals deshuffled by the preparing means to produce a plurality of quantized values;

inverted quantization means for performing an inverted quantization for the quantized values produced by the variable-length decoding means to produce a plurality of blocks of discrete cosine transform (DCT) coefficients of the non-compressed picture signals of the 4:1:1 color component type; and inverted DCT processing means for performing an inverted DCT processing for each block of DCT coefficients produced by the inverted quantization means to produce a plurality of blocks of non-compressed picture signals of the 4:1:1 color component type, and the picture coding means comprise an input buffer for storing the non-compressed picture signals of the 4:2:0 color component type produced by the component signal converting means as picture signals of a current frame frame by frame, the non-compressed picture signals being classified into a plurality of blocks of non-compressed picture signals respectively corresponding to a block of the current frame;

DCT compressing means for performing a discrete cosine transform (DCT) processing for each block of non-compressed picture signals stored in the input buffer to obtain a plurality of blocks of discrete cosine transform (DCT) coefficients and quantizing the DCT coefficients to obtain a plurality of blocks of quantized values;

inverted DCT expanding means for performing an inverted DCT processing for the blocks of DCT coefficients obtained by the DCT compressing means to reproduce the blocks of non-compressed picture signals of the 4:2:0 color component type;

frame picture storing means for storing each block of non-compressed picture signals of the 4:2:0 color component type reproduced by the inverted DCT expanding means as picture signals of a block of a referential frame, other non-compressed picture signals of the 4:2:0 color component type corresponding to a frame succeeding to the referential frame being stored in the input buffer;

motion predicting means for calculating a motion vector indicating the motion of a picture according to one block of non-compressed picture signals of the current frame stored in the input buffer and the non-compressed picture signals of the 4:2:0 color component type of the referential frame stored in the frame picture storing means for each block of the current frame and calculating an inter-frame difference between one block of non-compressed picture signals of the current frame and a corresponding block of non-compressed picture signals of the referential frame indicated by the motion vector for each block of the current frame;

coding selecting means for selecting a type of coding performed for the quantized values of the current frame obtained by the DCT compressing means;

variable length coding means for performing a variable length coding for the quantized values obtained by the DCT compressing means according to the coding type selected by the coding selecting means, the motion vectors and the inter-frame differences calculated by the motion predicting means to produce pieces of variable length coded data; and structure coding means for producing the digital picture signals compressed in the MPEG format from the variable length coded data obtained by the variable length coding means.

In the above configuration, the digital picture signals compressed in the DVC format are decoded to the non-compressed picture signals of the 4:1:1 color component type, and the non-compressed picture signals of the 4:2:0 color component type are coded to the digital picture signals compressed in the MPEG format.

Also, it is preferred that the motion predicting means comprise hierarchy picture producing means for producing a plurality of current hierarchy pictures of different resolutions from a current original picture of each block of the current frame indicated by one block of non-compressed picture signals stored in the input buffer and producing a plurality of referential hierarchy pictures from a referential original picture of each block of the referential frame indicated by one block of non-compressed picture signals stored in the frame picture storing means, a current hierarchy picture of the highest resolution being the current original picture, a current hierarchy picture of a resolution lower than that of a specific current hierarchy picture being obtained each time every other pixel is removed in an x direction from pixels of the specific current original picture and every other pixel is removed in a y direction from pixels of the specific current original picture, a referential hierarchy picture of the highest resolution being the referential original picture, and a referential hierarchy picture of a resolution lower than that of a specific referential hierarchy picture being obtained each time every other pixel is removed in an x direction from pixels of the specific referential original picture and every other pixel is removed in a y direction from pixels of the specific referential original picture;

motion vector producing means for repeatedly calculating an intermediate motion vector from one current hierarchy picture and one referential hierarchy picture produced by the hierarchy picture producing means and a rough motion vector calculated just before the calculation of the intermediate motion vector while changing the current and referential hierarchy pictures of the same resolution to other current and referential hierarchy pictures of higher resolution for each calculation of the intermediate motion vector and setting the intermediate motion vector as the rough motion vector for each calculation of the intermediate motion vector, and finally calculating the motion vector from the current and referential hierarchy pictures of the highest resolution, the motion vector being calculated for each block of the current frame, the motion vector for a block of the current frame indicating a block of the referential frame, and the rough motion vector indicating candidates for a particular block of the referential frame indicated by the intermediate motion vector; and inter-frame difference information producing means for producing inter-frame difference information indicating the inter-frame difference between a group of pixel values of one block of the current frame and a group of pixel values of a corresponding block of the referential frame indicated by the motion vector produced by the motion vector producing means for each block of the current frame.

In the above configuration, a plurality of current hierarchy pictures of different resolutions are produced from a current original picture of each block of the current frame, and a plurality of referential hierarchy pictures are produced from a referential original picture of each block of the referential frame. Thereafter, an intermediate motion vector is repeatedly calculated from one current hierarchy picture and one referential hierarchy picture while changing the current and referential hierarchy pictures to other current and referential hierarchy pictures of higher resolution for each calculation of the intermediate motion vector, and the motion vector is finally calculated from the current and referential hierarchy pictures of the highest resolution. In this case, the intermediate motion vector is set as a rough motion vector for each calculation of the intermediate motion vector, and the intermediate motion vector indicating a particular block of the referential frame is calculated while using the rough motion vector indicating candidates for the particular block of the referential frame.

Thereafter, inter-frame difference information indicating the inter-frame difference between a group of pixel values of one block of the current frame and a group of pixel values of a corresponding block of the referential frame indicated by the motion vector is produced for each block of the current frame.

Therefore, in cases where a large object is drawn in a natural picture, an intermediate motion vector roughly indicating the motion of the large object is calculated more precisely each time the intermediate motion vector is calculated. Therefore, a motion vector indicating the motion of the large object can be precisely calculated.

Accordingly, even though a large object is dynamically moved in a moving picture, a motion vector faithfully expressing a natural motion of the large object can be obtained.

Also, because an intermediate motion vector calculated in a previous stage is used as a rough motion vector for the calculation of a next intermediate motion vector, a calculation volume required for the calculation of the motion vector can be considerably reduced even though the intermediate motion vector is repeatedly calculated by using the current hierarchy pictures and the referential hierarchy pictures.

Also, it is preferred that the picture coding means further comprise:

a DCT coefficient buffer for storing a block of DCT coefficients of luminance signals extracted from each block of DCT coefficients of the non-compressed picture signals produced by the inverted quantization means, each block of DCT coefficients of luminance signals corresponding to a block of the current frame, and the DCT coefficients of each block being arranged in a matrix of rows and columns; and hierarchical inverted DCT processing means for repeatedly extracting a group of DCT coefficients from each block of DCT coefficients of luminance signals stored in the DCT coefficient buffer on condition that a frequency band of the group of DCT coefficients gradually extends to a higher frequency and performing an inverted DCT processing for each group of DCT coefficients to produce a plurality of hierarchy pictures respectively indicated by a plurality of non-compressed luminance signals, the hierarchy pictures of different resolutions being produced for each block of the current frame, and the motion predicting means comprise motion vector producing means for repeatedly calculating an intermediate motion vector from one hierarchy picture produced by the hierarchical inverted DCT processing means and a referential original picture of the referential frame indicated by non-compressed luminance signals of the non-compressed picture signals stored in the frame picture storing means and a rough motion vector calculated just before the calculation of the intermediate motion vector while changing the hierarchy picture to another hierarchy picture of a higher resolution for each calculation of the intermediate motion vector and setting the intermediate motion vector as the rough motion vector for each calculation of the intermediate motion vector, and finally calculating the motion vector from the hierarchy picture of the highest resolution and the referential original picture for each block of the current frame, the motion vector for a block of the current frame indicating a block of the referential frame, and the rough motion vector indicating candidates for a particular block of the referential frame indicated by the intermediate motion vector; and inter-frame difference information producing means for producing inter-frame difference information indicating the inter-frame difference between a group of pixel values of one block of the current frame and a group of pixel values of a corresponding block of the referential frame indicated by the motion vector calculated by the motion vector producing means for each block of the current frame.

In the above configuration, a plurality of hierarchy pictures of different resolutions indicated by a plurality of non-compressed luminance signals are produced for each block of the current frame. Thereafter, an intermediate motion vector is repeatedly calculated from one hierarchy picture and a referential original picture of the referential frame, and the motion vector is finally calculated from the current and referential hierarchy pictures of the highest resolution. In this case, the intermediate motion vector is set as a rough motion vector for each calculation of the intermediate motion vector, and the intermediate motion vector indicating a particular block of the referential frame is calculated while using the rough motion vector indicating candidates for the particular block of the referential frame.

Thereafter, inter-frame difference information indicating the inter-frame difference between a group of pixel values of one block of the current frame and a group of pixel values of a corresponding block of the referential frame indicated by the motion vector is produced for each block of the current frame.

Accordingly, because the hierarchy pictures of different resolutions are produced for each block of the current frame and are used to calculate the motion vector, the motion vector faithfully indicating a motion of a picture can be precisely obtained.

Also, it is preferred that the picture coding means further comprise:

a DCT coefficient buffer for storing a block of DCT coefficients of luminance signals extracted from each block of DCT coefficients of the non-compressed picture signals produced by the inverted quantization means, each block of DCT coefficients of luminance signals corresponding to a block of the current frame, and the DCT coefficients of each block being arranged in a matrix of rows and columns; and a one-dimensional inverted DCT processing means for extracting a block of DCT coefficients of luminance signals arranged in a row as an x-directional group of DCT coefficients from each block of DCT coefficients stored in the DCT coefficient buffer, extracting a block of DCT coefficients of luminance signals arranged in a column as a y-directional group of DCT coefficients from each block of DCT coefficients stored in the DCT coefficient buffer, performing an inverted DCT processing for the x-directional group of DCT coefficients to obtain x-directional information composed of non-compressed luminance signals arranged in the x direction for each block of a current frame and performing an inverted DCT processing for the y-directional group of DCT coefficients to obtain y-directional information composed of non-compressed luminance signals arranged in the y direction for each block of the current frame, and the motion predicting means comprise motion vector producing means for calculating an x-directional motion vector according to the x-directional information obtained by the one-dimensional inverted DCT processing means and non-compressed luminance signals of the non-compressed picture signals stored in the frame picture storing means for each block of the current frame, specifying a plurality of remarked blocks of the referential frame arranged in the neighborhood of a particular block indicated by the x-directional motion vector and calculating a motion vector according to the y-directional information obtained by the one-dimensional inverted DCT processing means and non-compressed luminance signals of the remarked blocks for each block of the current frame; and inter-frame difference information producing means for producing inter-frame difference information indicating the inter-frame difference between a group of pixel values of one block of the current frame and a group of pixel values of a corresponding block of the referential frame indicated by the motion vector calculated by the motion vector producing means for each block of the current frame.

In the above configuration, x-directional information composed of non-compressed luminance signals arranged in the x direction is produced for each block of a current frame, and y-directional information composed of non-compressed luminance signals arranged in the y direction is produced for each block of the current frame. Thereafter, an x-directional motion vector is calculated according to the x-directional information and non-compressed luminance signals of a referential frame, and a motion vector is calculated according to the x-directional motion vector and the y-directional information.

Accordingly, a calculation volume required for the calculation of the motion vector can be reduced as compared with a case that the hierarchy pictures are produced, and the motion vector faithfully indicating a motion of a picture can be precisely obtained.

The second object is also achieved by the provision of a picture signal converting apparatus comprising:

receiving means for receiving a digital picture signal compressed in a first format for each of pixels of a frame;

picture decoding means for decoding the digital picture signals received by the receiving means to produce a plurality of discrete cosine transform (DCT) coefficients of non-compressed picture signals of a 4:1:1 color component type, converting the DCT coefficients into a plurality of DCT coefficients of non-compressed picture signals of a 4:2:0 color component type and producing a plurality of non-compressed picture signals of the 4:2:0 color component type from the DCT coefficients of the non-compressed picture signals of the 4:2:0 color component type;

picture coding means for coding the non-compressed picture signals of the 4:2:0 color component type obtained by the picture decoding means to produce a plurality of digital picture signals compressed in a second format different from the first format; and output means for outputting the digital picture signals compressed in the second format obtained by the picture coding means.

In the above configuration, a plurality of digital picture signal compressed in a first format are decoded to a plurality of DCT coefficients of non-compressed picture signals of a 4:1:1 color component type, the DCT coefficients are converted into a plurality of DCT coefficients of non-compressed picture signals of a 4:2:0 color component type, a plurality of non-compressed picture signals of the 4:2:0 color component type are produced from the DCT coefficients of the non-compressed picture signals of the 4:2:0 color component type, and the non-compressed picture signals of the 4:2:0 color component type are coded to a plurality of digital picture signals compressed in a second format.

Accordingly, because the DCT coefficients corresponding to the 4:1:1 color component type are converted into the DCT coefficients corresponding to the 4:2:0 color component type, it is not required to convert color difference signals of the 4:1:1 color component type into color difference signals of the 4:2:0 color component type.

It is preferred that the first format be the DVC format, the second format be the MPEG format, and the picture decoding means comprises preparing means for deshuffling the digital picture signals to rearrange the digital picture signals;

variable-length decoding means for performing a variable-length decoding for the digital picture signals deshuffled by the preparing means to produce a plurality of quantized values;

inverted quantization means for performing an inverted quantization for the quantized values produced by the variable-length decoding means to produce a plurality of blocks of discrete cosine transform (DCT) coefficients of the non-compressed picture signals of the 4:1:1 color component type, the DCT coefficients of each block being arranged in a matrix of rows and columns;

DCT coefficient converting means for extracting a block of DCT coefficients of non-compressed color difference signals of the 4:1:1 color component type from each block of DCT coefficients of the non-compressed picture signals obtained by the inverted quantization means and converting each block of DCT coefficients of the non-compressed color difference signals of the 4:1:1 color component type to a block of DCT coefficients of non-compressed color difference signals of a 4:2:0 color component type by removing a lower half portion of DCT coefficients corresponding to higher frequency from each block of DCT coefficients to halve a resolution of the DCT coefficients in a y direction for each block and adding DCT coefficients on the right side of the remaining DCT coefficients for each block to double a resolution of the DCT coefficients in an x direction for each block; and inverted DCT processing means for performing an inverted DCT processing for each block of DCT coefficients of non-compressed luminance signals extracted from the DCT coefficients of the non-compressed picture signals obtained by the inverted quantization means and a corresponding block of DCT coefficients of the non-compressed color difference signals of the 4:2:0 color component type obtained by the DCT coefficient converting means to produce a plurality of blocks of non-compressed picture signals of the 4:2:0 color component type.

In the above configuration, color difference information in each block of DCT coefficients is mainly expressed by lower frequency components placed on the upper left side of the block. Therefore, the conversion of a block of DCT coefficients of the non-compressed color difference signals of the 4:1:1 color component type into a block of DCT coefficients of non-compressed color difference signals of a 4:2:0 color component type is performed by removing a lower half portion of DCT coefficients corresponding to higher frequency from the block of DCT coefficients of the 4:1:1 color component type to halve a resolution of the DCT coefficients of the 4:1:1 color component type in a y direction and adding DCT coefficients on the right side of the remaining DCT coefficients to double a resolution of the DCT coefficients of the 4:1:1 color component type in an x direction.

Accordingly, because color difference information existing in the block of DCT coefficients of the non-compressed color difference signals of the 4:1:1 color component type is maintained in the block of DCT coefficients of the non-compressed color difference signals of the 4:2:0 color component type. Therefore, any viewer does not feel an unnatural color change in a reproduced picture obtained from the digital picture signals compressed in the MPEG format.

The above features of the present invention are also obtained by the provision of a picture signal converting method, comprising the steps of:

receiving a digital picture signal compressed in a DVC format for each of pixels of a frame, the digital picture signals compressed in the DVC format being obtained by performing a discrete cosine transform (DCT) processing for each block of non-compressed picture signals of a 4:1:1 color component type to obtain a block of DCT coefficients from each block of non-compressed picture signals, quantizing each block of DCT coefficients to obtain a block of quantized values from each block of DCT coefficients, coding each block of quantized values to obtain a block of variable-length codes from each block of quantized values and recording each block of variable-length codes as the digital picture signals compressed in the DVC format;

performing a variable-length decoding for the digital picture signals compressed in the DVC format to produce a plurality of quantized values;

performing an inverted quantization for the quantized values to produce a plurality of blocks of discrete cosine transform (DCT) coefficients of the non-compressed picture signals of the 4:1:1 color component type, each block of DCT coefficients of the non-compressed picture signals being classified into a block of DCT coefficients of non-compressed luminance signals and a block of DCT coefficients of the non-compressed color difference signals of the 4:1:1 color component type;

converting each block of DCT coefficients of the non-compressed color difference signals of the 4:1:1 color component type into a block of DCT coefficients of non-compressed color difference signals of a 4:2:0 color component type, the DCT coefficients of each block being arranged in a matrix of rows and columns;

combining each block of DCT coefficients of the non-compressed color difference signals of the 4:2:0 color component type and a corresponding block of DCT coefficients of non-compressed luminance signals to produce a plurality of blocks of DCT coefficients of non-compressed picture signals of the 4:2:0 color component type;

performing an inverted DCT processing for each block of DCT coefficients of non-compressed picture signals of the 4:2:0 color component type to produce a block of non-compressed picture signals of the 4:2:0 color component type for each block of DCT coefficients;

coding each block of non-compressed picture signals of the 4:2:0 color component type to produce a plurality of digital picture signals compressed in a moving picture experts group (MPEG) format in which a time-redundancy between frames is reduced by performing a motion compensation, a space-redundancy in each frame is reduced by performing a discrete cosine transform and a code volume is reduced by performing a variable length coding; and outputting the digital picture signals compressed in the MPEG format, and the step of converting each block of DCT coefficients comprises the steps of:

removing a lower half portion of DCT coefficients corresponding to higher frequency from each block of DCT coefficients to halve a resolution of the DCT coefficients in a y direction for each block; and adding DCT coefficients on the right side of the remaining DCT coefficients for each block to double a resolution of the DCT coefficients in an x direction for each block and to produce the blocks of DCT coefficients of the non-compressed color difference signals of the 4:2:0 color component type.

The third object is achieved by the provision of a picture providing system, comprising:

picture input means for receiving a plurality of digital picture signals compressed in a first format;

picture reproducing means for reproducing a digital picture according to a plurality of digital picture signals compressed in a second format different from the first format;

picture providing means for receiving the digital picture signals compressed in the first format from the picture input means, converting the digital picture signals compressed in the first format into the digital picture signals compressed in the second format and transmitting the digital picture signals compressed in the second format to the picture reproducing means; and a network through which the digital picture signals compressed in the first format is transmitted from the picture input means to the picture providing means and the digital picture signals compressed in the second format is transmitted from the picture providing means to the picture reproducing means, the picture providing means comprising:

communicating means for receiving the digital picture signals compressed in the first format from the picture input means through the network and outputting the digital picture signals compressed in the second format to the picture reproducing means through the network; and picture signal converting means for converting the digital picture signals of the first format received by the communicating means into the digital picture signals compressed in the second format and outputting the digital picture signals compressed in the second format to the communicating means, and the picture signal converting means comprising picture decoding means for decoding the digital picture signals compressed in the first format to produce a plurality of non-compressed picture signals of a 4:1:1 color component type, the non-compressed picture signals being arranged in a matrix of rows and columns;

component signal converting means for directly converting color difference signals of the non-compressed picture signals obtained by the picture decoding means into converted color difference signals of a 4:2:0 color component type by removing color difference signals on every other row from the color difference signals of the non-compressed picture signals to halve the number of color difference signals in a y direction and adding a color difference signal to a position between each pair of color difference signals adjacent to each other in an x direction to double the number of color difference signals in the x direction, setting values of the converted color difference signals of the 4:2:0 color component type according to values of the color difference signals of the non-compressed picture signals obtained by the picture decoding means and combining luminance signals of the non-compressed picture signals obtained by the picture decoding means and the converted color difference signals of the 4:2:0 color component type obtained by the color difference signal converting means for each pixel of the frame to produce non-compressed picture signals of the 4:2:0 color component type; and picture coding means for coding the non-compressed picture signals of the 4:2:0 color component type obtained by the component signal converting means to produce the digital picture signals compressed in the second format.

In the above configuration, a plurality of digital picture signals compressed in a first format transmitted from the picture input means are received in the picture providing means. In the picture providing means, the digital picture signals are decoded to a plurality of non-compressed picture signals of a 4:1:1 color component type, the non-compressed picture signals are directly converted into a plurality of non-compressed picture signals of a 4:2:0 color component type, and the non-compressed picture signals of the 4:2:0 color component type are coded to a plurality of digital picture signals compressed in a second format. Thereafter, when the picture reproducing means request the digital picture signals compressed in the second format of the picture providing means, the digital picture signals compressed in the second format are transmitted to the picture reproducing means and are reproduced.

Therefore, because the direct conversion is performed by the picture providing means, even though a compression format of the digital picture signals required by the picture reproducing means differs from that of the digital picture signals transmitted from the picture input means, the digital picture signals of the second format required by the picture reproducing means can be provided for the picture input means.

The third object is also achieved by the provision of a picture providing system, comprising:

picture input means for receiving a plurality of digital picture signals compressed in a first format;

picture reproducing means for reproducing a digital picture according to a plurality of digital picture signals compressed in a second format different from the first format;

picture providing means for receiving the digital picture signals compressed in the first format from the picture input means, converting the digital picture signals compressed in the first format into the digital picture signals compressed in the second format and transmitting the digital picture signals compressed in the second format to the picture reproducing means; and a network through which the digital picture signals compressed in the first format is transmitted from the picture input means to the picture providing means and the digital picture signals compressed in the second format is transmitted from the picture providing means to the picture reproducing means, the picture providing means comprising:

communicating means for receiving the digital picture signals compressed in the first format from the picture input means through the network and outputting the digital picture signals compressed in the second format to the picture reproducing means through the network; and picture signal converting means for converting the digital picture signals of the first format received by the communicating means into the digital picture signals compressed in the second format and outputting the digital picture signals compressed in the second format to the communicating means, and the picture signal converting means comprising picture decoding means for decoding the digital picture signals of the first format to produce a plurality of discrete cosine transform (DCT) coefficients of non-compressed picture signals of a 4:1:1 color component type, converting the DCT coefficients into a plurality of DCT coefficients of non-compressed picture signals of a 4:2:0 color component type and producing a plurality of non-compressed picture signals of the 4:2:0 color component type from the DCT coefficients of the non-compressed picture signals of the 4:2:0 color component type; and picture coding means for coding the non-compressed picture signals of the 4:2:0 color component type obtained by the picture decoding means to produce the digital picture signals compressed in the second format.

In the above configuration, a plurality of digital picture signals of a first format transmitted from the picture input means to the picture providing means are decoded to a plurality of DCT coefficients of non-compressed picture signals of a 4:1:1 color component type, the DCT coefficients are directly converted into a plurality of DCT coefficients of non-compressed picture signals of a 4:2:0 color component type, an inverted DCT processing is performed for the DCT coefficients of the non-compressed picture signals of the 4:2:0 color to produce a plurality of non-compressed picture signals of the 4:2:0 color component type component type, and the non-compressed picture signals of the 4:2:0 color component type are coded to a plurality of digital picture signals compressed in a second format.

Therefore, because the direct conversion is performed by the picture providing means, even though a compression format of the digital picture signals required by the picture reproducing means differs from that of the digital picture signals transmitted from the picture input means, the digital picture signals of the second format required by the picture reproducing means can be provided for the picture input means.

BRIEF DESCRIPTION OF THE DRAWINGS

The objects, features and advantages of the present invention will be apparent from the following description taken in conjunction with the accompanying drawings, in which:

FIG. 1A shows the correspondence of a luminance signal Y to color difference signals Cr and Cb in the 4:4:4 color component type digital picture signal;

FIG. 1B shows the comparison of information volumes of the luminance signal Y and the color difference signals Cr and Cb in the 4:4:4 color component type digital picture signal;

FIG. 4A shows the correspondence of a luminance signal Y to color difference signals Cr and Cb in the 4:1:1 color component type digital picture signal;

FIG. 4B shows the comparison of information volumes of the luminance signal Y and the color difference signals Cr and Cb in the 4:1:1 color component type digital picture signal;

FIG. 8A shows a plurality of values of 4:1:1 type luminance signals Y corresponding to 8*4 pixels placed at a sub-frame;

FIG. 8B shows a plurality of values of 4:1:1 type first color difference signals Cr corresponding to the luminance signals Y;

FIG. 8C shows a plurality of values of 4:1:1 type second color difference signals Cb corresponding to the luminance signals Y;

FIG. 8D shows a plurality of values of 4:2:0 type first converted color difference signals Cr' corresponding to the luminance signals Y;

FIG. 8E shows a plurality of values $V^2_{x,y}$ of 4:2:0 type second converted color difference signals Cb' corresponding to the luminance signals Y;

FIG. 10A shows a plurality of values of 4:2:2 type luminance signals Y;

FIG. 10B shows a plurality of values of the 4:2:2 type color difference signals Cr and Cb;

FIG. 10C shows a plurality of values of the 4:1:1 type color difference signals Cr and Cb compressed in the DV compression format;

FIG. 11A shows a first actual example of values of 4:1:1 type color difference signals Cr (or Cb) input to the picture signal converting unit shown in FIG. 6;

FIG. 11B shows a first actual example of values of 4:2:0 type converted color difference signals Cr' (or Cb') output from the picture signal converting unit in the first color difference signal converting method;

FIG. 11C shows a first actual example of values of 4:2:0 type converted color difference signals Cr' (or Cb') output from the picture signal converting unit in the second color difference signal converting method;

FIG. 11D shows a first actual example of values of 4:2:0 type converted color difference signals Cr' (or Cb') output from the picture signal converting unit in the third color difference signal converting method;

FIG. 11E shows a first actual example of values of 4:2:0 type converted color difference signals Cr' (or Cb') output from the picture signal converting unit in the fourth color difference signal converting method;

FIG. 12A shows a second actual example of values of 4:1:1 type color difference signals Cr (or Cb) input to the picture signal converting unit shown in FIG. 6;

FIG. 12B shows a second actual example of values of 4:2:0 type converted color difference signals Cr' (or Cb') output from the picture signal converting unit in the first color difference signal converting method;

FIG. 12C shows a second actual example of values of 4:2:0 type converted color difference signals Cr' (or Cb') output from the picture signal converting unit in the second color difference signal converting method;

FIG. 12D shows a second actual example of values of 4:2:0 type converted color difference signals Cr' (or Cb') output from the picture signal converting unit in the third color difference signal converting method;

FIG. 12E shows a second actual example of values of 4:2:0 type converted color difference signals Cr' (or Cb') output from the picture signal converting unit in the fourth color difference signal converting method;

FIG. 13A shows a third actual example of values of 4:1:1 type color difference signals Cr (or Cb) input to the picture signal converting unit shown in FIG. 6;

FIG. 13B shows a third actual example of values of 4:2:0 type converted color difference signals Cr' (or Cb') output from the picture signal converting unit in the first color difference signal converting method;

FIG. 13C shows a third actual example of values of 4:2:0 type converted color difference signals Cr' (or Cb') output from the picture signal converting unit in the second color difference signal converting method;

FIG. 13D shows a third actual example of values of 4:2:0 type converted color difference signals Cr' (or Cb') output from the picture signal converting unit in the third color difference signal converting method;

FIG. 13E shows a third actual example of values of 4:2:0 type converted color difference signals Cr' (or Cb') output from the picture signal converting unit in the fourth color difference signal converting method;

FIG. 17A shows an actual example of values of 4:1:1 type luminance signals Y;

FIG. 17B shows an actual example of values of 4:1:1 type color difference signals Cr (or Cb) input to a picture signal converting unit shown in FIG. 14;

FIG. 17C shows an actual example of values of 4:2:0 type converted color difference signals Cr' (or Cb') output from the picture signal converting unit in the fifth color difference signal converting method;

FIG. 17D shows an actual example of values of 4:2:0 type converted color difference signals Cr' (or Cb') output from the picture signal converting unit in the sixth color difference signal converting method;

FIG. 17E shows an actual example of values of 4:2:0 type converted color difference signals Cr' (or Cb') output from the picture signal converting unit in the first color difference signal converting method of the first embodiment;

FIG. 38 is a flow chart showing the whole processing performed in the picture signal converting apparatus shown in FIG. 37;

FIG. 39 is a flow chart showing a picture decoding processing performed in a picture signal decoding unit shown in FIG. 37;

FIG. 40 shows a component type conversion from 4:1:1 type to 4:2:0 type in a DCT coefficient converting processing and an inverted DCT processing for DCT coefficients of 4:2:0 type color difference signals;

DETAILED DESCRIPTION OF THE EMBODIMENTS

Preferred embodiments of a picture signal converting apparatus, a picture signal converting method and a picture providing system according to the present invention are described with reference to the drawings.

First Embodiment

In this embodiment, a picture signal converting apparatus and a picture signal converting method in which a 4:1:1 color component type digital picture signal (hereinafter, called a 4:1:1 type component picture signal) is directly converted into a 4:2:0 color component type digital picture signal (hereinafter, called a 4:2:0 type component picture signal) are described.

Figure 2A:
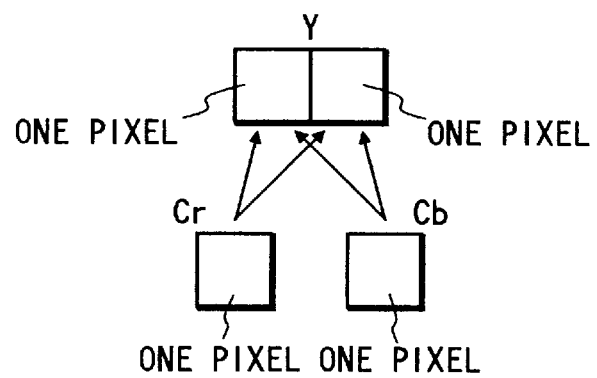
FIG. 2A shows the correspondence of a luminance signal Y to color difference signals Cr and Cb in the 4:2:2 color component type digital picture signal.
Figure 2B:
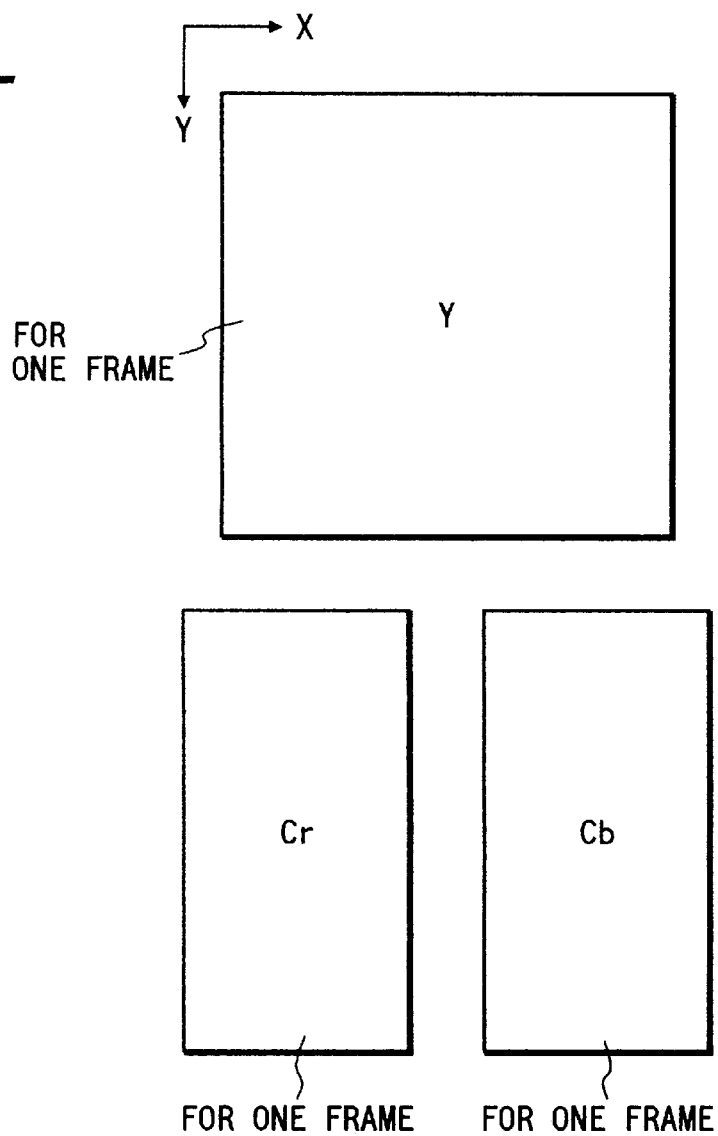
FIG. 2B shows the comparison of information volumes of the luminance signal Y and the color difference signals Cr and Cb in the 4:2:2 color component type digital picture signal.
Figure 3A:
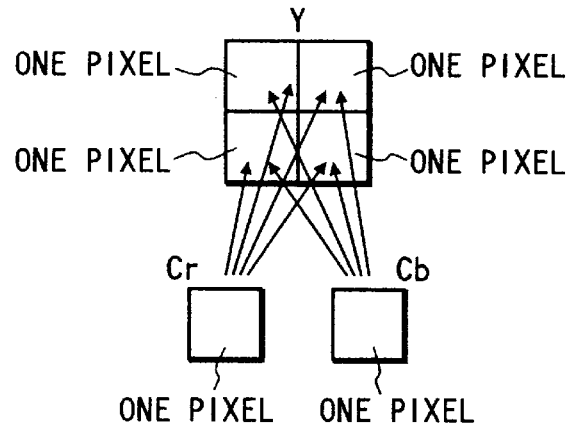
FIG. 3A shows the correspondence of a luminance signal Y to color difference signals Cr and Cb in the 4:2:0 color component type digital picture signal.
Figure 3B:
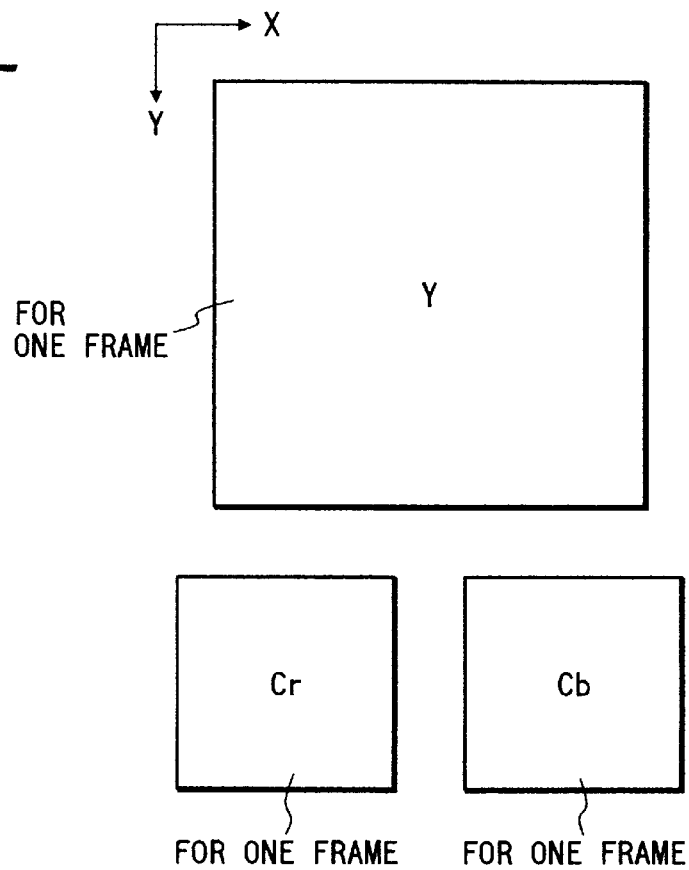
FIG. 3B shows the comparison of information volumes of the luminance signal Y and the color difference signals Cr and Cb in the 4:2:0 color component type digital picture signal.
Figure 5:
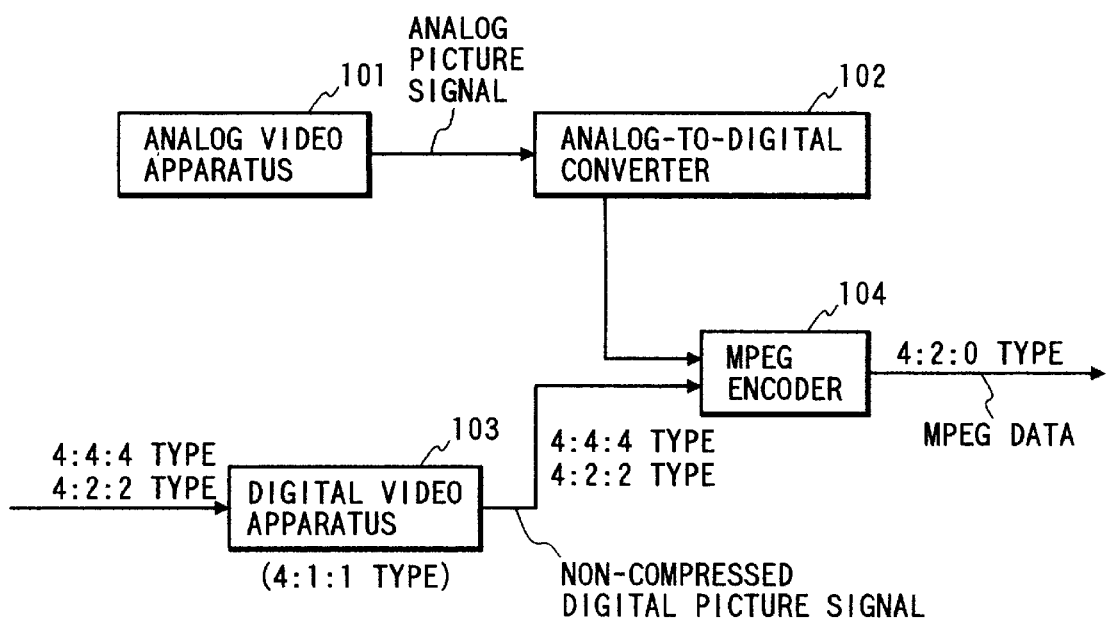
FIG. 5 is a block diagram of a conventional MPEG data producing apparatus.
Figure 6:
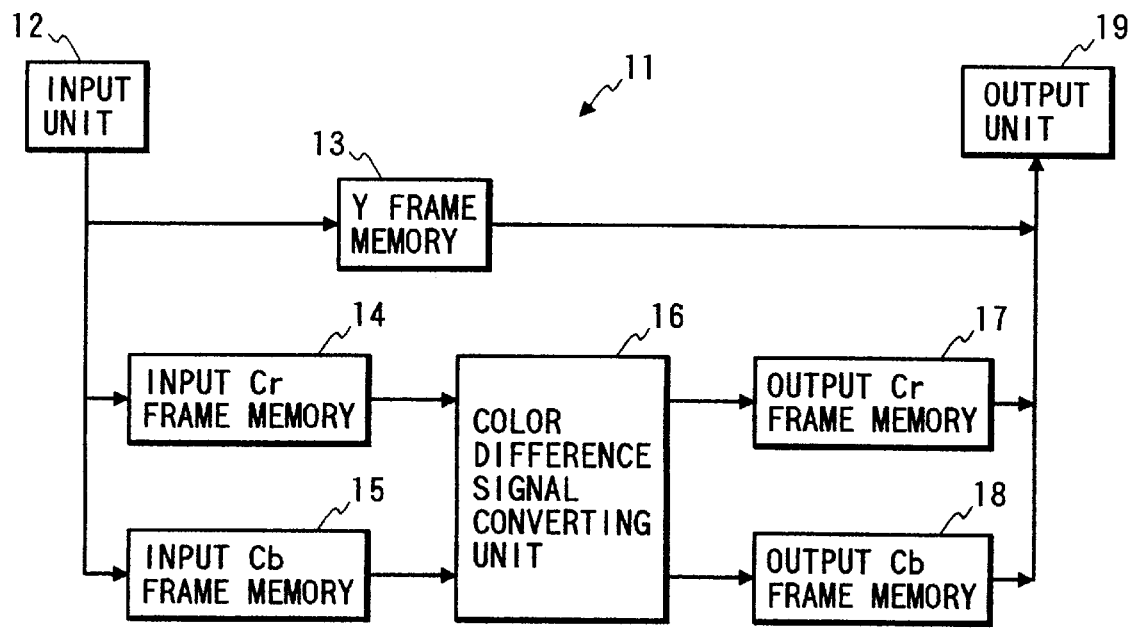
FIG. 6 is a block diagram of a picture signal converting apparatus according to a first embodiment of the present invention.
Figure 7:
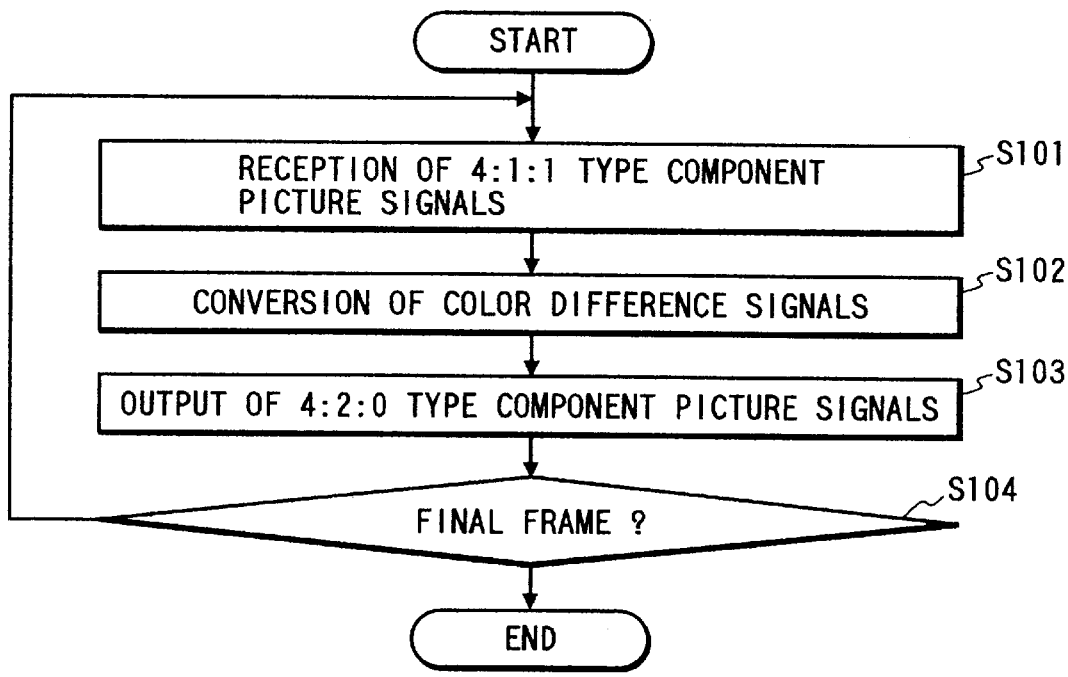
FIG. 7 is a flow chart showing the whole processing performed in the picture signal converting apparatus shown in FIG. 6.

FIG. 6 is a block diagram of a picture signal converting apparatus according to a first embodiment of the present invention, and FIG. 7 is a flow chart showing the whole processing performed in the picture signal converting apparatus.

As shown in FIG. 6, a picture signal converting apparatus 11 comprises an input unit 12 for receiving 4:1:1 type component picture signals of one frame for each frame, an Y frame memory 13 for storing luminance signals Y of the 4:1:1 type component picture signals (hereinafter, called 4:1:1 type luminance signals) for each frame, an input Cr frame memory 14 for storing first color difference signals Cr of the 4:1:1 type component picture signals (hereinafter, called 4:1:1 type first color difference signals) for each frame on condition that the first color difference signals Cr are placed at Cr co-ordinates (x,y) of an X-Y co-ordinate system, an input Cb frame memory 15 for storing second color difference signals Cb of the 4:1:1 type component picture signals (hereinafter, called 4:1:1 type second color difference signals) for each frame on condition that the second color difference signals Cb are placed at Cb co-ordinates (x,y) of an X-Y co-ordinate system, a color difference signal converting unit 16 for converting the 4:1:1 type first color difference signals Cr into first converted color difference signals Cr of 4:2:0 type component picture signals (hereinafter, called 4:2:0 type first converted color difference signals) for each frame and converting the second color difference signals Cb into second converted color difference signals Cb' of the 4:2:0 type component picture signals (hereinafter, called 4:2:0 type second converted color difference signals) for each frame, an output Cr frame memory 17 for storing the 4:2:0 type first converted color difference signals Cr' for each frame on condition that the 4:2:0 type first converted color difference signals Cr' are placed at Cr' co-ordinates (x,y) of an X-Y co-ordinate system, an output Cb frame memory 18 for storing the 4:2:0 type second converted color difference signals Cb' for each frame on condition that the 4:2:0 type second converted color difference signals Cb' are placed at Cb' co-ordinates (x,y) of an X-Y co-ordinate system, and an output unit 19 for outputting the 4:2:0 type component picture signals composed of the luminance signals Y stored in the Y frame memory 13, the 4:2:0 type first converted color difference signals Cr' and the 4:2:0 type second converted color difference signals Cb' for each frame.

In the above configuration, an operation performed in the picture signal converting apparatus 11 is described in brief with reference to FIG. 7.

As shown in FIG. 7, in a step S101, a processing frame of a moving picture is specified, the input unit 12 receives a plurality of 4:1:1 type component picture signals of the processing frame, a plurality of 4:1:1 type luminance signals Y are stored in the Y frame memory 13, a plurality of 4:1:1 type first color difference signals Cr are stored in the input Cr frame memory 14, and a plurality of 4:1:1 type second color difference signals Cb are stored in the input Cb frame memory 15.

In a step S102, the color difference signals Cr and Cb stored in the input Cr frame memory 14 and the input Cb frame memory 15 are input to the color difference signal converting unit 16 and are converted into color difference signals Cr' and Cb' of a plurality of 4:2:0 type component picture signals according to a first color difference signal converting method, a second color difference signal converting method, a third color difference signal converting method or a fourth color difference signal converting method. Thereafter, the first converted color difference signals Cr' are stored in the output Cr frame memory 17, and the second converted color difference signals Cb' are stored in the output Cb frame memory 18.

In a step S103, the luminance signals Y stored in the Y frame memory 13, the first converted color difference signals Cr' stored in the output Cr frame memory 17 and the second converted color difference signals Cb' stored in the output Cb frame memory 18 are combined in the output unit 19 to produce a plurality of 4:2:0 type component picture signals of the processing frame, and the 4:2:0 type component picture signals are output from the output unit 19.

In a step S104, it is judged whether or not the processing frame is a final frame of the moving picture. In cases where the processing frame is a final frame of the moving picture, the operation is finished. In cases where the processing frame is not a final frame of the moving picture, a next frame is newly specified as a processing frame, and the steps S101 to S104 are repeated for the processing frame newly specified.

Each of the color difference signal converting methods performed in the step S102 is described in detail with reference to FIGS. 8 to 10.

FIG. 8A shows a plurality of values $Y_{x,y}$ of luminance signals Y corresponding to 8*4 pixels placed at one sub-frame (8 columns*4 rows) of the processing frame, FIG. 8B shows a plurality of values $U^1_{x,y}$ of 4:1:1 type first color difference signals Cr corresponding to the luminance signals Y, FIG. 8C shows a plurality of values $V^1_{x,y}$ of 4:1:1 type second color difference signals Cb corresponding to the luminance signals Y, FIG. 8D shows a plurality of values $U^2_{x,y}$ of 4:2:0 type first converted color difference signals Cr' corresponding to the luminance signals Y, and FIG. 8E shows a plurality of values $V^2_{x,y}$ of 4:2:0 type second converted color difference signals Cb' corresponding to the luminance signals Y. Here, x=0,1,2, - - - and y=0,1,2, - - - are satisfied.

An X-Y co-ordinate system having an original point (0,0) at its top left is considered for each type of signals Y, Cr, Cb, Cr' and Cb', a luminance value of the luminance signal Y corresponding to the pixel placed at co-ordinates (x,y) is indicated by $Y_{x,y}$, a value of the 4:1:1 type first color difference signal Cr corresponding to the luminance signals of the values $Y_{4x,y}$, $Y_{4x+1,y}$, $Y_{4x+2,y}$ and $Y_{4x+3,y}$ is indicated by $U^1_{x,y}$, a value of the 4:1:1 type second color difference signal Cb corresponding to the luminance signals of the values $Y_{4x,y}$, $Y_{4x+1,y}$, $Y_{4x+2,y}$ and $Y_{4x+3,y}$ is indicated by $V^1_{x,y}$, a value of the 4:2:0 type first converted color difference signal Cr' corresponding to the luminance signals of the values $Y_{2x,2y}$, $Y_{2x+1,2y}$, $Y_{2x,2y+1}$ and $Y_{2x+1,2y+1}$ is indicated by $V^1_{x,y}$, a value of the 4:2:0 type second converted color difference signal Cb' corresponding to the luminance signals of the values $Y_{2x,2y}$, $Y_{2x+1,2y}$, $Y_{2x,2y+1}$ and $Y_{2x+1,2y+1}$ is indicated by $V^2_{x,y}$.

Because the processing frame is composed of a plurality of sub-frames, the color difference signal converting processing is performed for each sub-frame in the step S102.

Figure 9A:
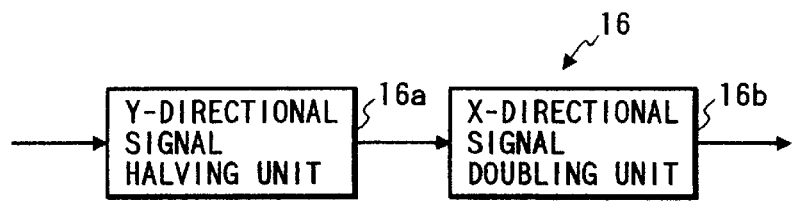
FIG. 9A is a block diagram of a color difference signal converting unit shown in FIG. 6 in a first color difference signal converting method.

In the first color difference signal converting method, as shown in FIG. 9A, the color difference signal converting unit 16 comprises a y-directional signal halving unit 16a for removing first color difference signals Cr on every other row from the first color difference signals stored in the input Cr frame memory 14 to halve the number of first color difference signals Cr in the y direction and removing second color difference signals Cb on every other row from the second color difference signals stored in the input Cb frame memory 15 to halve the number of second color difference signals Cb in the y direction; and an x-directional signal doubling unit 16b for adding a first color difference signal to a position between each pair of first color difference signals Cr which are obtained in the y-directional signal halving unit 16a and are adjacent to each other in the X direction, setting a value of one added first color difference signal to a value of one first color difference signal Cr adjacent to the added first color difference signal in the x direction for each added first color difference signal to double the number of first color difference signals Cr obtained in the y-directional signal halving unit 16b in the x direction, adding a second color difference signal to a position between each pair of second color difference signals Cb which are obtained in the y-directional signal halving unit 16a and are adjacent to each other in the X direction, setting a value of one added second color difference signal to a value of one second color difference signal Cr adjacent to the added second color difference signal in the x direction for each added second color difference signal to double the number of second color difference signals Cb obtained in the y-directional signal halving unit 16b in the x direction, outputting the first color difference signals as the 4:2:0 type first converted color difference signals Cr' of the 4:2:0 color component type and outputting the second color difference signals obtained by the x-directional signal doubling unit 16b as the 4:2:0 type second converted color difference signals Cb'.

In the above configuration, in the halving unit 16a, odd numbered color difference signals Cr and Cb (having values $U^1_{x,2y+1}$ and $V^1_{x,2y+1}$) placed at odd-numbered y co-ordinate values or even-numbered color difference signals Cr and Cb (having values $U^1_{x,2y}$ and $V^1_{x,2y}$) placed at even-numbered y co-ordinate values are removed from the 4:1:1 type color difference signals Cr and Cb stored in the frame memories 14 and 15 to halve the number of first (or second) color difference signals Cr (or Cb) in the y direction. Thereafter, in the doubling unit 16b, a first (or second) color difference signal Cr (or Cb) is added to a position between each pair of first (or second) color difference signals Cr (or Cb) adjacent to each other in the X direction, and a value of one added first (or second) color difference signal is set to a value of one first (or second) color difference signal Cr (or Cb) adjacent to the added first (or second) color difference signal in the x direction to double the number of first (or second) color difference signals Cr (or Cb) in the x direction. Thereafter, the first (or second) color difference signals Cr (or Cb) are output as first (or second) converted color difference signals Cr ' (or Cb'). That is, a resolution of the converted color difference signals Cr' and Cb' in the y direction (or longitudinal direction) is halved in the halving unit 16a, and a resolution of the converted color difference signals Cr' and Cb' in the x direction (or lateral direction) is doubled in the doubling unit 16b by setting a value $U^1_{x,2y}$ (or $V^1_{x,2y}$) of each first (or second) color difference signal Cr (or Cb) placed at co-ordinates (x,2y) as values $U^2_{2x,y}$ and $U^2_{2x+1,y}$ (or $V^2_{2x+1,y}$) of two first (or second) converted color difference signal Cr' (or Cb') placed at co-ordinates (2x,y) and (2x+1,y).

In cases where the odd-numbered color difference signals Cr and Cb having values $U^1_{x,2y+1}$ and $V^1_{x,2y+1}$ are removed, the even-numbered color difference signals Cr and Cb having values $U^1_{x,2y}$ and $V^1_{x,2y}$ remain, and values of converted color difference signals Cr' and Cb' are determined according to a signal conversion equation (1).

$$U^2_{2x,y} = U^2_{2x+1,y} = U^1_{x,2y}$$
$$V^2_{2x,y} = V^2_{2x+1,y} = V^1_{x,2y} \qquad (1)$$

The signal conversion equation (1) indicates that any arithmetic calculation is not required to convert the 4:1:1 type color difference signals Cr and Cb into the 4:2:0 type color difference signals Cr' and Cb'.

For example, as shown in FIGS. 8A to 8E, in cases where color difference signals Cr and Cb corresponding to luminance signals Y of one sub-frame composed of 8*4 pixels are input to the color difference signal converting unit 16, values of 4:2:0 type converted color difference signals Cr' and Cb' are determined as follows.
$U^2_{0,0} = U^2_{1,0} = U^1_{0,0}$, $U^2_{2,0} = U^2_{3,0} = U^1_{1,0}$, $U^2_{0,1} = U^2_{1,1} = U^1_{0,2}$, $U^2_{2,1} = U^2_{3,1} = U^1_{1,2}$, $V^2_{0,0} = V^2_{1,0} = V^1_{0,0}$, $V^2_{2,0} = V^2_{3,0} = V^1_{1,0}$, $V^2_{0,1} = V^2_{1,1} = V^1_{0,2}$ and $V^2_{2,1} = V^2_{3,1} = V^1_{1,2}$ Also, in cases where the even-numbered color difference signals Cr and Cb having values $U^1_{x,2y}$ and $V^1_{x,2y}$ are removed, the odd-numbered color difference signals Cr and Cb having values $U^1_{x,2y+1}$ and $V^1_{x,2y+1}$ remain, and values of converted color difference signals Cr' and Cb' are determined according to a signal conversion equation (1)'.

$$U^2_{2x,y} = U^2_{2x+1,y} = U^1_{x,2y+1}$$
$$V^2_{2x,y} = V^2_{2x+1,y} = V^1_{x,2y+1} \qquad (1)'$$

Accordingly, in cases where 4:1:1 type component picture signals are directly converted into 4:2:0 type component picture signals, this conversion can be easily performed because any arithmetic calculation such as addition, substraction, multiplication or division is not required.

In general, when 4:2:2 type component picture signals indicating a picture are input to a digital video apparatus to record the picture in the apparatus by converting 4:2:2 type color difference signals into 4:1:1 type color difference signals compressed in the DV compression format, each 4:1:1 type color difference signal is produced by removing one 4:2:2 type color difference signal placed on the right side from two 4:2:2 type color difference signals adjacent to each other in the x direction. The production of the 4:1:1 type color difference signals is, for example, shown in FIGS. 10A to 10C.

FIG. 10A shows a plurality of values $Y_{x,y}$ of 4:2:2 type luminance signals Y input to the digital video apparatus, FIG. 10B shows a plurality of values $U^1_{x,y}$ and $V^1_{x,y}$ of the 4:2:2 type color difference signals Cr and Cb, and FIG. 10C shows a plurality of values of the 4:1:1 type color difference signals Cr and Cb compressed in the DV compression format.

As shown in FIGS. 10A to 10C, 4:2:2 type color difference signals having values $U^1_{2x+1,y}$ and $V^1_{2x+1,y}$ are removed in the digital video apparatus to produce 4:1:1 type color difference signals. Therefore, for example, the value $U^1_{0,0}$ of the 4:2:2 type color difference signal shown in FIG. 10B is used as the values $U^2_{0,0}$ and $U^2_{1,0}$ of the 4:2:0 type color difference signal shown in FIG. 8D without any signal converting arithmetic calculation, the value $U^1_{2,0}$ of the 4:2:2 type color difference signal shown in FIG. 10B is used as the values $U^2_{2,0}$ and $U^2_{3,0}$ of the 4:2:0 type color difference signal shown in FIG. 8D without any signal converting arithmetic calculation, the value $U^1_{0,1}$ of the 4:2:2 type color difference signal shown in FIG. 10B is used as the values $U^2_{0,1}$ and $U^2_{1,1}$ of the 4:2:0 type color difference signal shown in FIG. 8D without any signal converting arithmetic calculation, and the value $U^1_{2,1}$ of the 4:2:2 type color difference signal shown in FIG. 10B is used as the values $U^2_{2,1}$ and $U^2_{3,1}$ of the 4:2:0 type color difference signal shown in FIG. 8D without any signal converting arithmetic calculation.

Accordingly, in cases where 4:2:2 type component picture signals indicating a picture are input to a digital video apparatus to record the picture in the digital video apparatus by converting 4:2:2 type color difference signals into 4:1:1 type color difference signals compressed in the DV compression format and the 4:1:1 type color difference signals are converted into 4:2:0 type component picture signals compressed according to MPEG1 or MPEG2, because the value $U^1_{1,0}$ of the 4:2:2 type color difference signal is not used as the values $U^2_{2,0}$ and $U^2_{3,0}$ of the 4:2:0 type color difference signal but the value $U^1_{2,0}$ of the 4:2:2 type color difference signal is used as the values $U^2_{2,0}$ and $U^2_{3,0}$ of the 4:2:0 type color difference signal, color information of the 4:2:2 type color difference signals can be faithfully maintained in the 4:2:0 type component picture signals.

Also, because any arithmetic calculation is not required to convert 4:2:2 type color difference signals into 4:2:0 type color difference signals, the color signal converting operation can be easily performed in this first color difference signal converting method.

Next, the second color difference signal converting method performed in the step S102 is described with reference to FIGS. 8A to 8E.

Figure 9B:
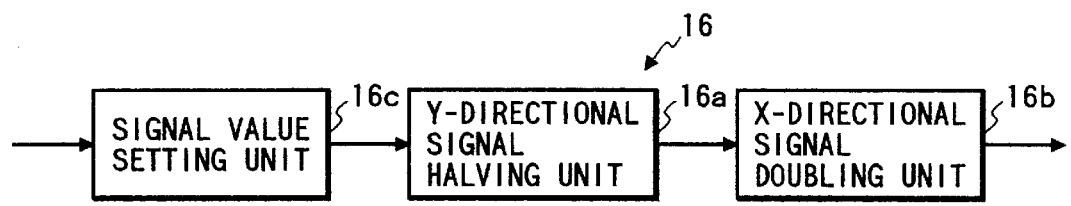
FIG. 9B is a block diagram of a color difference signal converting unit shown in FIG. 6 in a second color difference signal converting method.

In the second color difference signal converting method, as shown in FIG. 9B, the color difference signal converting unit 16 comprises:
  a signal value setting unit 16c for setting values of two first color difference signals Cr of co-ordinates (x,2y) and (x,2y+1) (or (x,2y+1) and (x,2y+2)) adjacent to each other in the y direction to a first average of values of the first color difference signals Cr of the co-ordinates (x,2y) and (x,2y+1) (or (x,2y+1) and (x,2y+2)) for each pair of first color difference signals Cr of co-ordinates (x,2y) and (x,2y+1) (or (x,2y+1) and (x,2y+2)) and setting values of two second color difference signals Cb of co-ordinates (x,2y) and (x,2y+1) (or (x,2y+1) and (x,2y+2)) adjacent to each other in the y direction to a second average of values of the second color difference signals Cb of the co-ordinates (x,2y) and (x,2y+1) (or (x,2y+1) and (x,2y+2)) for each pair of second color difference signals Cb of co-ordinates (x,2y) and (x,2y+1) (or (x,2y+1) and (x,2y+2)), the y-directional signal halving unit 16a for removing first color difference signals Cr on every other row from the first color difference signals, of which the values are set in the signal value setting unit 16c, to halve the number of first color difference signals Cr in the y direction and removing second color difference signals Cr on every other row from the second color difference signals, of which the values are set in the signal value setting unit 16c, to halve the number of second color difference signals Cb in the y direction, and the x-directional signal doubling unit 16b.

In the above configuration, in the signal value setting unit 16c, an average of two values $U^1_{x,2y}$ and $U^1_{x,2y+1}$ (or $V^1_{x,2y}$ and $V^1_{x,2y+1}$) of two color difference signals Cr (or Cb) adjacent to each other in the y direction is calculated for each pair of color difference signals Cr (or Cb) adjacent to each other in the y direction, and the average is set as values $U^1_{x,2y}$ and $U^1_{x,2y+1}$ (or $V^1_{x,2y}$ and $V^1_{x,2y+1}$) of two color difference signals Cr (or Cb). Thereafter, in the same manner as in the first color difference signal converting method, the number of color difference signals Cr (or Cb) in the y direction is halved in the y-directional signal halving unit 16a, and the number of color difference signals Cr (or Cb) in the x direction is doubled in the x-directional signal doubling unit 16b. That is, values of converted color difference signals Cr' and Cb' are determined according to a signal conversion equation (2).

$$U^2_{2x,y}=U^2_{2x+1,y}=(U^1_{x,2y}=U^1_{x,2y+1})/2$$
$$V^2_{2x,y}=V^2_{2x+1,y}=(V^1_{x,2y}=V^1_{x,2y+1})/2 \quad (2)$$

Here x=0,1,2,3, - - - and y=0,1,2,3, - - - are satisfied.

For example, as shown in FIGS. 8A to 8E, in cases where color difference signals Cr and Cb corresponding to luminance signals Y of one sub-frame composed of 8*4 pixels are input to the color difference signal converting unit 16, values of 4:2:0 type converted color difference signals Cr' and Cb' are determined as follows.
$U^2_{0,0}=U^2_{1,0}=(U^1_{0,0}+U^1_{0,1})/2$, $U^2_{2,0}=U^2_{3,0}=(U^1_{1,0}+U^1_{1,1})/2$, $U^2_{0,1}=U^2_{1,1}=(U^1_{0,2}+U^1_{0,3})/2$, $U^2_{2,1}=U^2_{3,1}=(U^1_{1,2}+U^1_{1,3})/2$, $V^2_{0,0}=V^2_{1,0}=(V^1_{0,0}+V^1_{0,1})/2$, $V^2_{2,0}=V^2_{3,0}=(V^1_{1,0}+V^1_{1,1})/2$, $V^2_{0,1}=V^2_{1,1}=(V^1_{0,2}+V^1_{0,3})/2$ and $V^2_{2,1}=V^2_{3,1}=(V^1_{1,2}+V^1_{1,3})/2$ Accordingly, because all 4:1:1 type color difference signals Cr and Cb are used to produce the 4:2:0 type converted color difference signals Cr' and Cb', color information of the 4:1:1 type component picture signals can be faithfully maintained in the 4:2:0 type component picture signals. Therefore, an original picture indicated by the 4:1:1 type component picture signals can be faithfully reproduced at a high quality by producing a reproduced picture from the 4:2:0 type component picture signals.

Also, because an average of two values $U^1_{x,2y}$ and $U^1_{x,2y+1}$ of two color difference signals Cr (or Cb) placed at positions adjacent to each other is calculated and set as values $U^2_{2x,y}$ and $U^2_{2x+1,y}$ of two converted color difference signals Cr' (or Cb') adjacent to each other, even though a particular color difference signal Cr (or Cb), in which a noise is undesirably added, is input to the converting unit 16, an adverse influence of the noise on the converted color difference signals Cr' (or Cb') can be reduced to half.

Also, because the calculation of the arithmetic average is only required to the converting unit 16, the arithmetic calculation is easy, so that the 4:2:0 type converted color difference signals Cr' (or Cb') can be easily obtained.

Next, the third color difference signal converting method performed in the step S102 is described with reference to FIGS. 8A to 8E.

Figure 9C:
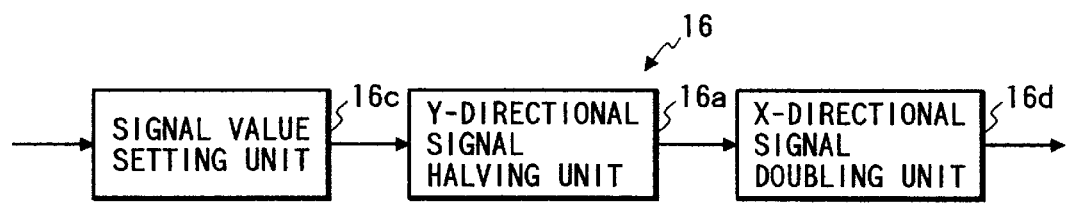
FIG. 9C is a block diagram of a color difference signal converting unit shown in FIG. 6 in a third color difference signal converting method.

In the third color difference signal converting method, as shown in FIG. 9C, the color difference signal converting unit 16 comprises:

the signal value setting unit 16c, the y-directional signal halving unit 16a, and an x-directional signal doubling unit 16d for adding a color difference signal Cr (or Cb) to a position between each pair of color difference signals Cr (or Cb) which are obtained in the y-directional signal halving unit 16b and are adjacent to each other in the X direction, setting a value of one added color difference signal Cr (or Cb) to an interpolated value of the values of the color difference signals Cr (or Cb) placed on both sides of the added color difference signal in the x direction for each added color difference signal to double the number of color difference signals in the x direction and outputting the color difference signals as the 4:2:0 type converted color difference signals Cr' (or Cb').

In the above configuration, the number of first (or second) color difference signals Cr (or Cb) is halved in the halving unit 16a, Thereafter, in the doubling unit 16d, a first (or second) color difference signal Cr (or Cb) is added to a position between each pair of first (or second) color difference signals Cr (or Cb) adjacent to each other in the X direction, a value of one added color difference signal Cr (or Cb) to an interpolated value of the values of the color difference signals Cr (or Cb) placed on both sides of the added color difference signal in the x direction for each added color difference signal to double the number of color difference signals in the x direction, and the color difference signals are output as the 4:2:0 type converted color difference signals Cr' (or Cb'). That is, in the halving unit 16a, a resolution of the converted color difference signals Cr' and Cb' in the y direction is reduced to half that of the 4:1:1 type color difference signals Cr and Cb in the same manner as in the second color difference signal converting method. Also, in the doubling unit 16d, for example, a particular converted color difference signal Cr' (or Cb') placed at each odd-numbered x co-ordinate value is added, a value $U^2_{2x+1,y}$ (or $V^2_{2x+1,y}$) of each particular converted color difference signal Cr' (or Cb') is set to an interpolated value of values $U^2_{2x,y}$ and $U^2_{2(x+1),y}$ (or $V^2_{2x,y}$ and $V^2_{2(x+1),y}$) of converted color difference signals Cr' (or Cb') placed on both sides of the particular converted color difference signal in the x direction, so that a resolution of the converted color difference signals Cr' and Cb' in the x direction is doubled. For example, values of converted color difference signals Cr' and Cb' are determined according to a signal conversion equation (3).

$$U^2_{2x,y}=(U^1_{x,2y}+U^1_{x,2y+1})/2$$
$$U^2_{2x+1,y}=(\alpha U^2_{2x,y}+(1-\alpha)U^2_{2(x+1),y})/2$$
$$V^2_{2x,y}=(V^1_{x,2y}+V^1_{x,2y+1})/2$$
$$V^2_{2x+1,y}=(\alpha V^2_{2x,y}+(1-\alpha)V^2_{2(x+1),y})/2 \quad (3)$$

Here x=0,1,2,3, - - - , y=0,1,2,3, - - - and $0 \leq \alpha \leq 1$ are satisfied.

In this case, because any of values of rightmost converted color difference signals is not determined according to the interpolation for each sub-frame, the values are determined according to the extrapolation. For example, a value of one rightmost converted color difference signal is set to a value of a second rightmost converted color difference signal placed on the left side of the rightmost converted color difference signal for each row of each sub-frame.

As an example shown in FIGS. 8A to 8E, in cases where color difference signals Cr and Cb corresponding to luminance signals Y of one sub-frame composed of 8*4 pixels are input to the color difference signal converting unit 16, when a constant value α is set to 0.5, values of 4:2:0 type converted color difference signals Cr' and Cb' are determined as follows.

$U^2_{0,0}=(U^1_{0,0}+U^1_{0,1})/2$, $U^2_{2,0}=(U^1_{1,0}+U^1_{1,1})/2$, $U^2_{1,0}=(U^2_{0,0}+U^2_{2,0})/2$, $U^2_{3,0}=U^2_{2,0}$, $U^2_{0,1}=(U^1_{0,2}+U^1_{0,3})/2$, $U^2_{2,1}=(U^1_{1,2}+U^1_{1,3})/2$, $U^2_{1,1}=(U^2_{0,1}+U^2_{2,1})/2$, $U^2_{3,1}=U^2_{2,1}$, $V^2_{0,0}=(V^1_{0,0}+V^1_{0,1})/2$, $V^2_{2,0}=(V^1_{1,0}+V^1_{1,1})/2$, $V^2_{1,0}=(V^2_{0,0}+V^2_{2,0})/2$, $V^2_{3,0}=V^2_{2,0}$, $V^2_{0,1}=(V^1_{0,2}+V^1_{0,3})/2$, $V^2_{2,1}=(V^1_{1,2}+V^1_{1,3})/2$, $V^2_{1,1}=(V^2_{0,1}+V^2_{2,1})/2$, $V^2_{3,1}=V^2_{2,1}$

Accordingly, even though values $U^2_{2x,y}$ and $U^2_{2(x+1),y}$ of particular converted color difference signals Cr' (or Cb') produced from values of color difference signals Cr (or Cb) are considerably different from each other, because a value between the values $U^2_{2x,y}$ and $U^2_{2(x+1),y}$ is interpolated as a value $U^2_{2x+1,y}$ of a converted color difference signal placed between the particular converted color difference signals, the change of the values of the three converted color difference signals Cr' (or Cb') is made smooth. Therefore, when a discrete cosine transform (DCT) is performed for the 4:2:0 type converted color difference signals to perform the compression based on MPEG1 or MPEG2 for the 4:2:0 type component picture signals, because color information of the converted color difference signals is concentrated in lower frequency portions, a compression efficiency can be improved.

Next, the fourth color difference signal converting method performed in the step S102 is described with reference to FIGS. 8A to 8E.

Figure 9D:
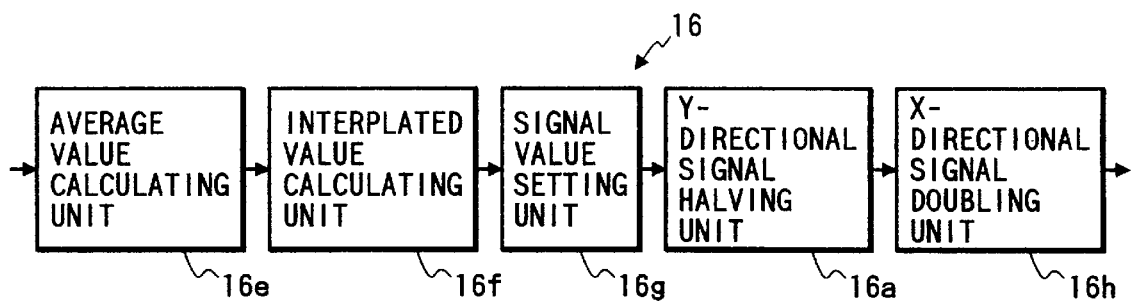
FIG. 9D is a block diagram of a color difference signal converting unit shown in FIG. 6 in a fourth color difference signal converting method.

In the fourth color difference signal converting method, as shown in FIG. 9D, the color difference signal converting unit 16 comprises:

an average value calculating unit 16e for calculating a first average of values of two first (or second) color difference signals Cr (or Cb) of co-ordinates (x,2y) and (x,2y+1) adjacent to each other in the y direction and a second average of values of two first (or second) color difference signals Cr (or Cb) of co-ordinates (x+1,2y) and (x+1,2y+1) adjacent to each other in the y direction for each group of first (or second) color difference signals of the co-ordinates (x,2y), (x,2y+1), (x+1,2y) and (x+1,2y+1);

an interpolated value calculating unit 16f for calculating a first interpolated value obtained by weighting the first and second averages at a first weighting ratio and a second interpolated value obtained by weighting the first and second averages at a second weighting ratio for each pair of first and second averages;

a signal value setting unit 16g for setting the first interpolated value calculated in the interpolated value calculating unit 16f as values of the first (or second) color difference signals of the co-ordinates (x,2y) and (x,2y+1);

the y-directional signal halving unit 16a; and an x-directional signal doubling unit 16h for adding a first (or second) color difference signal to a position between each pair of first (or second) color difference signals Cr (or Cb) which are obtained in the y-directional signal halving unit 16h and are adjacent to each other in the x direction, setting a value of one added first (or second) color difference signal to the second interpolated value for each added first (or second) color difference signal to double the number of first (or second) color difference signals in the x direction and outputting the first (or second) color difference signals as the 4:2:0 type first (or second) converted color difference signals Cr' (or Cb').

In the above configuration, in the average value calculating unit 16e, a first average of two values $U^1_{x,2y}$ and $U^1_{x,2y+1}$ (or $V^1_{x,2y}$ and $V^1_{x,2y+1}$) of two color difference signals Cr (or Cb) adjacent to each other in the y direction and a second average of two values $U^1_{x+1,2y}$ and $U^1_{x+1,2y+1}$ (or $V^1_{x+1,2y}$ and $V^1_{x+1,2y+1}$) of two color difference signals Cr (or Cb) adjacent to each other in the y direction are calculated. Thereafter, in the interpolated value calculating unit 16f, a first interpolated value and a second interpolated value are calculated from the first and second averages. Thereafter, in the signal value setting unit 16g, the first interpolated value is set as values of the color difference signals of the co-ordinates (x,2y) and (x,2y+1). Thereafter, the number of color difference signals in the y direction is halved in the halving unit 16a. Thereafter, in the doubling unit 16b, the number of color difference signals in the x direction is doubled by adding a color difference signal to a position between each pair of color difference signals Cr (or Cb) adjacent to each other in the X direction and setting a value of one added color difference signal to the second interpolated value for each added color difference signal, and the color difference signals Cr (or Cb) are output as converted color difference signals Cr' (or Cb'). That is, the first interpolated value is set as a value $U^2_{2x,y}$ (or $V^2_{2x,y}$) of each converted color difference signal Cr' (or Cb') in the setting unit 16g, a resolution of the color difference signals Cr and Cb in the y direction is reduced to half that of the 4:1:1 type color difference signals Cr and Cb in the same manner as in the second color difference signal converting method, and the second interpolated value is set as a value $U^2_{2x+1,y}$ (or $V^2_{2x+1,y}$) of each converted color difference signal Cr' (or Cb') in the doubling unit 16d. For example, values of converted color difference signals Cr' and Cb' are determined according to a signal conversion equation (4).

$$U^2_{2x,y}=(3A+B)/4$$

$$U^2_{2x+1,y}=(A+3B)/4$$

$$A=(U^1_{x,2y}+U^1_{x,2y+1})/2$$

$$B=(U^1_{x+1,2y}+U^1_{x+1,2y+1})/2$$

$$V^2_{2x,y}=(3C+D)/4$$

$$V^2_{2x+1,y}=(C+3D)/4$$

$$C=(V^1_{x,2y}+V^1_{x,2y+1})/2$$

$$D=(V^1_{x+1,2y}+V^1_{x+1,2y+1})/2 \qquad (4)$$

Here x=0,1,2,3, - - - and y=0,1,2,3, - - - are satisfied.

In this case, any of values of rightmost converted color difference signals is not determined according to the interpolation for each sub-frame. Also, any of values of second rightmost converted color difference signals placed on the left side of the rightmost converted color difference signals is not determined according to the interpolation for each sub-frame. Therefore, the values of rightmost converted color difference signals and the values of second rightmost converted color difference signals are determined according to the extrapolation. For example, a value of one rightmost converted color difference signal and a value of one second rightmost converted color difference signal are set to a value of a third rightmost converted color difference signal placed on the left side of the second rightmost converted color difference signal for each row of each sub-frame.

As an example shown in FIGS. 8A to 8E, in cases where color difference signals Cr and Cb corresponding to luminance signals Y of one sub-frame composed of 8*4 pixels are input to the color difference signal converting unit 16, values of 4:2:0 type converted color difference signals Cr' and Cb' are determined as follows.

$$U^2_{0,0} = (U^1_{0,0} + U^1_{0,1}) * 3/8 + (U^1_{1,0} + U^1_{1,1}) * 1/8,$$

$$U^2_{1,0} = (U^1_{0,0} + U^1_{0,1}) * 1/8 + (U^1_{1,0} + U^1_{1,1}) * 3/8,$$

$$U^2_{0,1} = (U^1_{0,2} + U^1_{0,3}) * 3/8 + (U^1_{1,2} + U^1_{1,3}) * 1/8, \text{ and}$$

$$U^2_{1,1} = (U^1_{0,2} + U^1_{0,3}) * 1/8 + (U^1_{1,2} + U^1_{1,3}) * 3/8$$

Accordingly, even though values of color difference signals input to the converting unit 16 are considerably different from each other, because values of all converted color difference signals are determined according to the linear interpolation and are output from the converting unit 16, the change of the values of the converted color difference signals can be made smoother that in the third color difference signal converting method. Therefore, when a discrete cosine transform (DCT) is performed for the 4:2:0 type converted color difference signals, a compression efficiency can be improved more than that in the third color difference signal converting method.

Next, three actual examples (x=0,1 and y=0,1 in the equations (1), (2), (3) and (4)) of the color difference signal conversion are described with reference to FIGS. 11 and 13.

In a first actual example, in cases where 4:1:1 type color difference signals Cr (or Cb), of which values are shown in FIG. 11A, are input to the color difference signal converting unit 16, when the color difference signals are converted according to the first color difference signal converting method, 4:2:0 type converted color difference signals Cr' (or Cb'), of which values are shown in FIG. 11B, are output from the converting unit 16. Also, when the color difference signals are converted according to the second color difference signal converting method, 4:2:0 type converted color difference signals Cr' (or Cb'), of which values are shown in FIG. 11C, are output from the converting unit 16. Also, when the color difference signals are converted according to the third color difference signal converting method, 4:2:0 type converted color difference signals Cr' (or Cb'), of which values are shown in FIG. 11D, are output from the converting unit 16. Also, when the color difference signals are converted according to the fourth color difference signal converting method, 4:2:0 type converted color difference signals Cr' (or Cb'), of which values are shown in FIG. 11E, are output from the converting unit 16.

Also, in a second actual example, in cases where 4:1:1 type color difference signals Cr (or Cb), of which values are shown in FIG. 12A, are input to the color difference signal converting unit 16, 4:2:0 type converted color difference signals Cr' (or Cb'), of which values are shown in FIG. 12B, are output from the converting unit 16 when the color difference signals are converted according to the first color difference signal converting method, 4:2:0 type converted color difference signals Cr' (or Cb'), of which values are shown in FIG. 12C, are output from the converting unit 16 when the color difference signals are converted according to the second color difference signal converting method, 4:2:0 type converted color difference signals Cr' (or Cb'), of which values are shown in FIG. 12D, are output from the converting unit 16 when the color difference signals are converted according to the third color difference signal converting method, and 4:2:0 type converted color difference signals Cr' (or Cb'), of which values are shown in FIG. 12E, are output from the converting unit 16 when the color difference signals are converted according to the fourth color difference signal converting method.

Also, in a third actual example, in cases where 4:1:1 type color difference signals Cr (or Cb), of which values are shown in FIG. 13A, are input to the color difference signal converting unit 16, 4:2:0 type converted color difference signals Cr' (or Cb'), of which values are shown in FIG. 13B, are output from the converting unit 16 when the color difference signals are converted according to the first color difference signal converting method, 4:2:0 type converted color difference signals Cr' (or Cb'), of which values are shown in FIG. 13C, are output from the converting unit 16 when the color difference signals are converted according to the second color difference signal converting method, 4:2:0 type converted color difference signals Cr' (or Cb'), of which values are shown in FIG. 13D, are output from the converting unit 16 when the color difference signals are converted according to the third color difference signal converting method, and 4:2:0 type converted color difference signals Cr' (or Cb'), of which values are shown in FIG. 13E, are output from the converting unit 16 when the color difference signals are converted according to the fourth color difference signal converting method.

Here, in cases where a value calculated according to one of the signal conversion equations is not an integral number, the value is rounded off to an integral number. Also, in cases where a value of a converted color difference signal is not determined because the value is determined by using a value of a color difference signal not indicated in FIG. 11A, FIG. 12A or FIG. 13A, the value is indicated by a sign "-" in FIG. 11E, FIG. 12E or FIG. 13E.

Features of conversion results (or converted color difference signals Cr' (or Cb')) in the actual examples are described.

In the first and second color difference signal converting methods, values $U^2_{2x,y}$ and $U^2_{2x+1,y}$ (or $V^2_{2x,y}$ and $V^2_{2x+1,y}$) of converted color difference signals Cr' (or Cb') adjacent to each other in the x direction are the same as each other in all actual examples.

In the first color difference signal converting method, because odd-numbered color difference signals placed at odd-numbered y co-ordinate values (or even-numbered lines) are not used to determine converted color difference signals, values of the odd-numbered color difference signals do not influence on values of converted color difference signals. For example, a set of values of color difference signals in the first line shown in FIG. 11A, a set of values of color difference signals in the first line shown in FIG. 12A and a set of values of color difference signals in the first line shown in FIG. 13A are the same as each other. In this case, though a set of values of color difference signals in the second line shown in FIG. 11A, a set of values of color difference signals in the second line shown in FIG. 12A and a set of values of color difference signals in the second line shown in FIG. 13A are different from each other, a set of values of converted color difference signals placed in the first line shown in FIG. 11B, a set of values of converted color difference signals placed in the first line shown in FIG. 12B and a set of values of converted color difference signals placed in the first line shown in FIG. 13B are the same as each other.

In the third color difference signal converting method, a first average of two values of two color difference signals placed at co-ordinates (x,2y) and (x,2y+1) adjacent to each other in the y direction is set as a value of a converted color difference signal placed at co-ordinates (2x,y), a second average of two values of two color difference signals placed at co-ordinates (x+1,2y) and (x+1,2y+1) adjacent to each other in the y direction is set as a value of a converted color difference signal placed at co-ordinates (2x+2,y), and a value between the first and second averages is interpolated as a value of a converted color difference signal placed at co-ordinates (2x+1,y). In these actual examples, an average of the first and second averages is set as a value of a converted color difference signal at co-ordinates (2x+1,y).

In the fourth color difference signal converting method, though the first and second averages are calculated in the same manner as in the third color difference signal converting method, any of the first and second averages is not used as a value of a converted color difference signal, but two interpolated values between the first and second averages are used as values of two converted color difference signals adjacent to each other in the x direction. Therefore, even though values of the color difference signals input to the converting unit 16 vary widely, because any of the values or any of the first and second averages is not used as a value of a converted color difference signal, the variation of values of converted color difference signals output from the converting unit 16 can be made small. Also, even though a noise is added to a color difference signal, the influence of the noise on the converted color difference signals can be considerably reduced.

Accordingly, as is described above, in cases where the picture signal converting apparatus 11 and one of the color difference signal converting methods are used, the 4:1:1 type component picture signals can be directly converted into the 4:2:0 type component picture signals.

Second Embodiment

In general, luminance information of a natural picture and color information of the natural picture correlate to each other. Therefore, there is high probability that luminance degrees at pixels vary as colors at the pixels vary. In this embodiment, to consider this special feature of the natural picture, values of luminance signals Y are referred to directly convert the 4:1:1 type component picture signals into the 4:2:0 type component picture signals.

Figure 14:
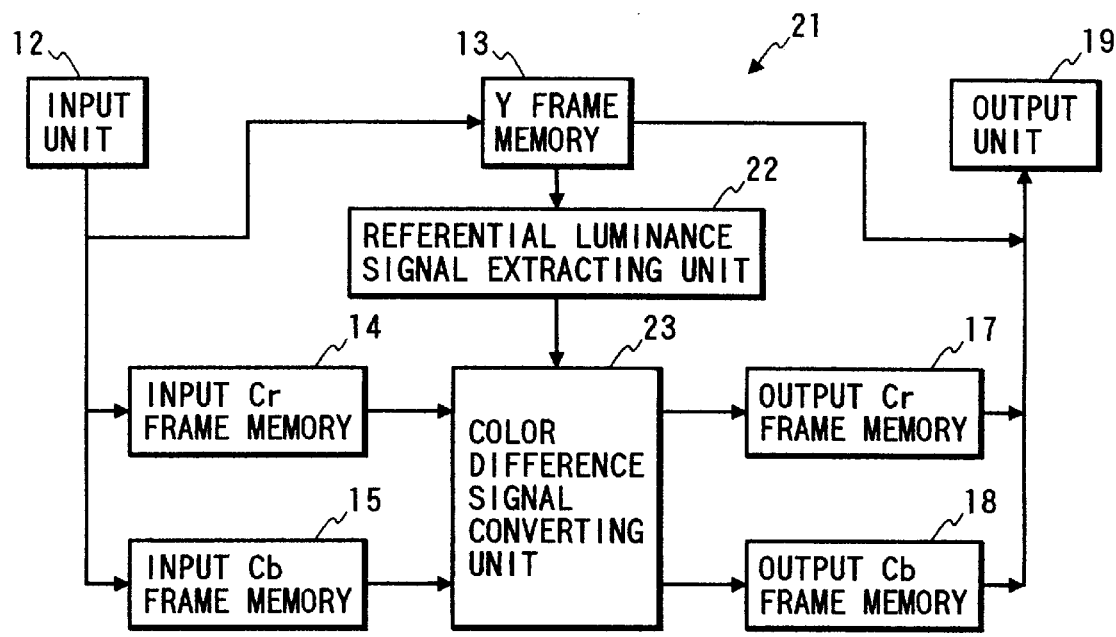
FIG. 14 is a block diagram of a picture signal converting apparatus according to a second embodiment of the present invention.

FIG. 14 is a block diagram of a picture signal converting apparatus according to a second embodiment of the present invention.

As shown in FIG. 14, a picture signal converting apparatus 21 comprises
the input unit 12, the Y frame memory 13, the input Cr frame memory 14, the input Cb frame memory 15,
a referential luminance signal extracting unit 22 for extracting a plurality of luminance signals from the Y frame memory 13 as a plurality of referential luminance signals,
a color difference signal converting unit 23 for converting the first color difference signals Cr and the second color difference signals Cb into first converted color difference signals Cr' and 4:2:0 type second converted color difference signals Cb' for each frame while referring the referential luminance signals,
the output Cr frame memory 17, the output Cb frame memory 18 and the output unit 19.

Figure 15:
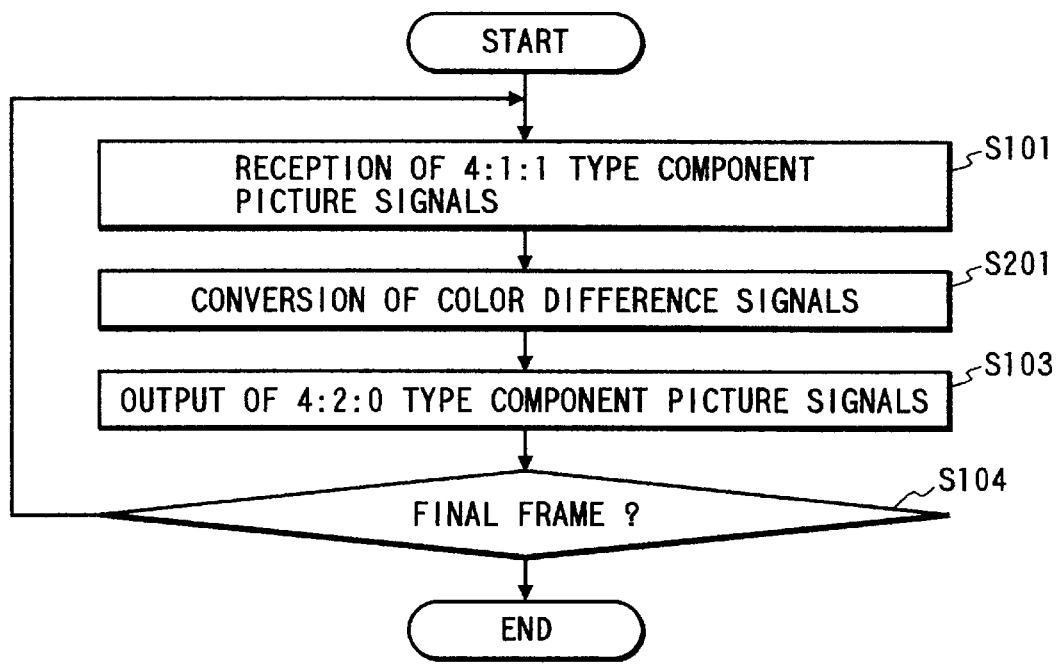
FIG. 15 is a flow chart showing the whole processing performed in the picture signal converting apparatus shown in FIG. 14.

In the above configuration, an operation performed in the picture signal converting apparatus 21 is described in brief with reference to FIG. 15.

As shown in FIG. 15, after the step S101 is performed, a step S201 is performed. In this step, the color difference signals Cr and Cb stored in the input Cr frame memory 14 and the input Cb frame memory 15 are input to the color difference signal converting unit 23 and are converted into a plurality of 4:2:0 type color difference signals Cr' and Cb' while referring a plurality of referential luminance signals Y extracted by the referential luminance signal extracting unit 22 according to a fifth color difference signal converting method or a sixth first color difference signal converting method. Thereafter, the first converted color difference signals Cr' are stored in the output Cr frame memory 17, and the second converted color difference signals Cb' are stored in the output Cb frame memory 18. Thereafter, the steps S103 and S104 are performed in the same manner as in the converting unit 11.

The fifth color difference signal converting method performed in the step S201 according to the second embodiment is described in detail with reference to FIGS. 8A to 8E.

Figure 16A:
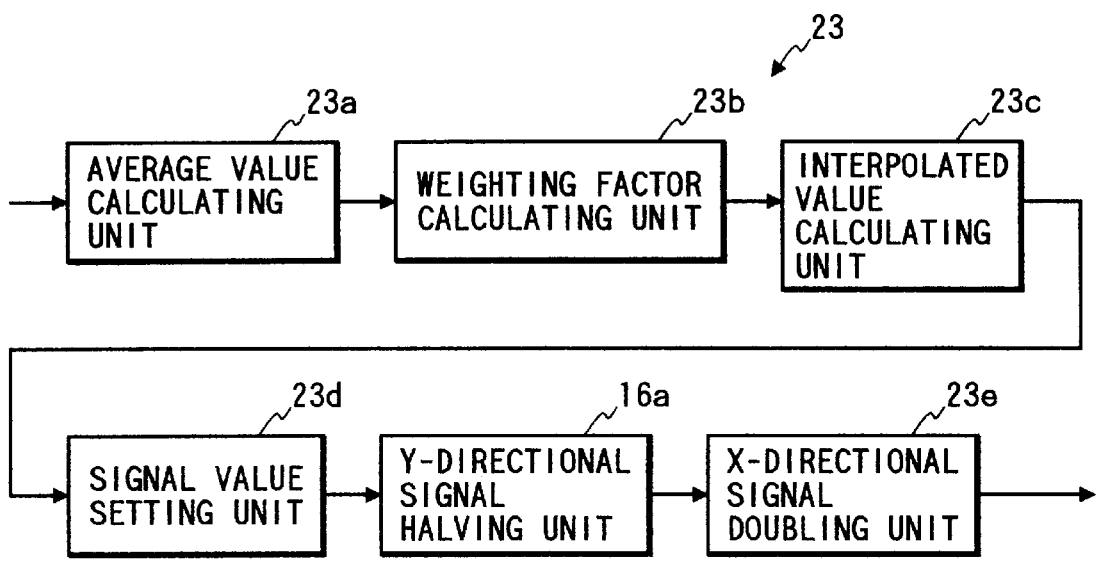
FIG. 16A is a block diagram of a color difference signal converting unit shown in FIG. 14 in a fifth color difference signal converting method.

In the fifth color difference signal converting method, as shown in FIG. 16A, the color difference signal converting unit 23 comprises:
an average value calculating unit 23a for calculating an average of values of two color difference signals Cr (or Cb) of co-ordinates (x,2y) and (x,2y+1) adjacent to each other in the y direction for each pair of color difference signals;
a weighting factor calculating unit 23b for obtaining the referential luminance signals extracted by the referential luminance signal extracting unit 22 as first referential luminance signals on condition that the first referential luminance signals correspond to the color difference signals of co-ordinates (x,2y) and (x+1,2y), calculating a first weighting factor B/2(A+B) and a second weighting factor A/2(A+B) from values of the first referential luminance signals, obtaining the referential luminance signals extracted by the referential luminance signal extracting unit 23 as second referential luminance signals on condition that the second referential luminance signals correspond to the color difference signals of co-ordinates (x,2y+1) and (x+1,2y+1) and calculating a third weighting factor D/2(C+D) and a fourth weighting factor C/2(C+D) from values of the first referential luminance signals;
an interpolated value calculating unit 23c for calculating a first multiplied value by multiplying the value $U^1_{x,2y}$ (or $V^1_{x,2y}$) of the color difference signal of the co-ordinates (x,2y) by the first weighting factor, calculating a second multiplied value by multiplying the value $U^1_{x+1,2y}$ (or $V^1_{x+1,2y}$) of the color difference signal of the co-ordinates (x+1,2y) by the second weighting factor, calculating a third multiplied value by multiplying the value $U^1_{x,2y+1}$ (or $V^1_{x,2y+1}$) of the color difference signal of the co-ordinates (x,2y+1) by the third weighting factor, calculating a fourth multiplied value by multiplying the value $U^1_{x+1,2y+1}$ (or $V^1_{x+1,2y+1}$) of the color difference signal of the co-ordinates (x+1,2y+1) by the fourth weighting factor and calculating an interpolated value from the first, second, third and fourth multiplied values;
a signal value setting unit 23d for setting each average as values of the color difference signals of the co-ordinates (x,2y) and (x,2y+1);
the y-directional signal halving unit 16a; and
an x-directional signal doubling unit 23e for adding a color difference signal to a position between each pair of color difference signals adjacent to each other in an X direction, setting a value of one added color difference signal to the interpolated value for each added color difference signal to double the number of color difference signals in the x direction and outputting the color difference signals as the 4:2:0 type converted color difference signals Cr' (or Cb').

In the above configuration, an average of two values $U^1_{x,2y}$ and $U^1_{x,2y+1}$ (or $V^1_{x,2y}$ and $V^1_{x,2y+1}$) of two color difference signals Cr (or Cb) adjacent to each other in the y direction is calculated in the average value calculating unit 23a and is set as a value $U^2_{2x,y}$ (or $V^2_{2x,y}$) of a 4:2:0 type converted color difference signal Cr' (or Cb') in the signal value setting unit 23d and the y-directional signal halving unit 16a to reduce a resolution of the converted color difference signals Cr' and Cb' in the y direction to half that of the 4:1:1 type color difference signals Cr and Cb. Also, a value $U^2_{2x+1,y}$ (or $V^2_{2x+1,y}$) of a converted color difference signals Cr' (or Cb') adjacent to the converted color difference signal Cr' (or Cb') having the value $U^2_{2x,y}$ (or $V^2_{2x,y}$) in the x direction is calculated in the interpolated value calculating unit 23c and the x-directional signal doubling unit 23e by linearly interpolating weighted values obtained by weighting values of four color difference signals placed at co-ordinates (x,2y), (x+1,2y), (x,2y+1) and (x+1,2y+1) with the weighting factors calculated by the weighting factor calculating unit 23b. The weighting factors are calculated according to a first group of referential luminance signals placed at co-ordinates (4x,2y), (4x+1,2y), (4x+2,2y) and (4x+3,2y) corresponding to the color difference signal at the co-ordinates (x,2y), a second group of referential luminance signals placed at co-ordinates (4(x+1),2y), (4(x+1)+1,2y), (4(x+1)+2,2y) and (4(x+1)+3,2y) corresponding to the color difference signal at the co-ordinates (x+1,2y), a third group of referential luminance signals placed at co-ordinates (4x, 2y+1), (4x+1,2y+1), (4x+2,2y+1) and (4x+3,2y+1) corresponding to the color difference signal at the co-ordinates (x,2y+1) and a fourth group of referential luminance signals placed at co-ordinates (4(x+1),2y+1), (4(x+1)+1,2y+1), (4(x+1)+2,2y+1) and (4(x+1)+3,2y+1) corresponding to the color difference signal at the co-ordinates (x+1,2y+1). Therefore, a resolution of the converted color difference signals Cr' and Cb' is doubled in the x direction. That is, values of converted color difference signals Cr' and Cb' are determined according to a signal conversion equation (5).

$$U^2_{2x,y}=(U^1_{x,2y}+U^1_{x,2y+1})/2$$

$$U^2_{2x+1,y}=U^1_{x,2y}*B/2(A+B)+U^1_{x+1,2y}*A/2(A+B)+U^1_{x,2y+1}*D/2(C+D)+U^1_{x+1,2y+1}*C/2(C+D)$$

$$V^2_{2x,y}=(V^1_{x,2y}+V^1_{x,2y+1})/2$$

$$V^2_{2x+1,y}=V^1_{x,2y}*B/2(A+B)+V^1_{x+1,2y}*A/2(A+B)+V^1_{x,2y+1}*D/2(C+D)+V^1_{x+1,2y+1}*C/2(C+D)$$

$$A=\{(Y_{4x,2y}+Y_{4x+1,2y})-(Y_{4x+2,2y}+Y_{4x+3,2y})\}^2$$

$$B=\{(Y_{4(x+1),2y}+Y_{4(x+1)+1,2y})-(Y_{4x+2,2y}+Y_{4x+3,2y})\}^2$$

$$C=\{(Y_{4x,2y+1}+Y_{4x+1,2y+1})-(Y_{4x+2,2y+1}+Y_{4x+3,2y+1})\}^2$$

$$D=\{(Y_{4(x+1),2y+1}+Y_{4(x+1)+1,2y+1})-(Y_{4x+2,2y+1}+Y_{4x+3,2y+1})\}^2 \quad (5)$$

Here x=0,1,2,3, - - - and y=0,1,2,3, - - - are satisfied.

In the equation (5), as values of particular luminance signals $Y_{4x+2,2y}$ and $Y_{4x+3,2y}$ (or $Y_{4x+2,2y+1}$ and $Y_{4x+3,2y+1}$) corresponding to a particular converted color difference signal $U^2_{2x+1,y}$ or $V^2_{2x+1,y}$ placed at an interpolation position (2x+1,y) approaches values of luminance signals $Y_{4(x+1),2y}$ and $Y_{4(x+1)+1,2y}$ (or $Y_{4(x+1),2y+1}$ and $Y_{4(x+1)+1,2y+1}$) placed on the right side of the particular luminance signals, the influence of a particular color difference signal $U^1_{x+1,2y}$ or $V^1_{x+1,2y}$ (or $U^1_{x+1,2y+1}$ or $V^1_{x+1,2y+1}$) corresponding to the luminance signals $Y_{4(x+1),2y}$ and $Y_{4(x+1)+1,2y}$ (or $Y_{4(x+1),2y+1}$ and $Y_{4(x+1)+1,2y+1}$) on a value of the particular converted color difference signal is increased. In contrast, as values of particular luminance signals $Y_{4x+2,2y}$ and $Y_{4x+3,2y}$ (or $Y_{4x+2,2y+1}$ and $Y_{4x+3,2y+1}$) corresponding to a particular converted color difference signal $U^2_{2x+1,y}$ or $V^2_{2x+1,y}$ placed at an interpolation position (2x+1,y) approaches values of luminance signals $Y_{4x,2y}$ and $Y_{4x+1,2y}$ (or $Y_{4x,2y+1}$ and $Y_{4x+1,2y+1}$) placed on the left side of the particular luminance signals, the influence of a particular color difference signal $U^1_{x,2y}$ or $V^1_{x,2y}$ (or $U^1_{x,2y+1}$ or $V^1_{x,2y+1}$) corresponding to the luminance signals $Y_{4x,2y}$ and $Y_{4x+1,2y}$ (or $Y_{4x,2y+1}$ and $Y_{4x+1,2y+1}$) on a value of the particular converted color difference signal is increased. For example, when the values of the particular luminance signals approaches the values of the luminance signals $Y_{4(x+1),2y}$ and $Y_{4(x+1)+1,2y}$, B<A is satisfied, so that A/2(A+B)>B/2(A+B) is obtained. Therefore, the influence of the color difference signal $U^1_{x+1,2y}$ on the value of particular converted color difference signal $U^2_{2x+1,y}$ is larger than the influence of the color difference signal $U^1_{x,2y}$ on the value of particular converted color difference signal $U^2_{2x+1,y}$. Here, the value A corresponds to a distance between a group of values of the luminance signals $Y_{4x,2y}$ and $Y_{4x+1,2y}$ and a group of values of the luminance signals $Y_{4x+2,2y}$ and $Y_{4x+3,2y}$, and the value B corresponds to a distance between a group of values of the luminance signals $Y_{4(x+1),2y}$ and $Y_{4(x+1)+1,2y}$ and a group of values of the luminance signals $Y_{4x+2,2y}$ and $Y_{4x+3,2y}$.

Therefore, the correlation between luminance information and color information in a natural picture can be considered.

In the equation (5), because any of values of rightmost converted color difference signals is not determined according to the interpolation for each sub-frame, the values are determined according to the extrapolation. For example, a value of one rightmost converted color difference signal is set to a value of a second rightmost converted color difference signal placed on the left side of the rightmost converted color difference signal for each row of each sub-frame.

As an example shown in FIGS. 8A to 8E, in cases where color difference signals Cr and Cb corresponding to luminance signals Y of one sub-frame composed of 8*4 pixels are input to the color difference signal converting unit 23, values of 4:2:0 type converted color difference signals Cr' and Cb' are determined as follows.

$$U^2_{0,0}=(U^1_{0,0}+U^1_{0,1})/2$$

$$U^2_{1,0}=U^1_{0,0}*B_0/2(A_0+B_0)+U^1_{1,0}*A_0/2(A_0+B_0)+U^1_{0,1}*D_0/2(C_0+D_0)+U^1_{1,1}*C_0/2(C_0+D_0)$$

$$U^2_{2,0}=(U^1_{1,0}+U^1_{1,1})/2$$

$$U^2_{0,1}=(U^1_{0,2}+U^1_{0,3})/2$$

$$U^2_{1,1}=U^1_{0,2}*B_1/2(A_1+B_1)+U^1_{1,2}*A_1/2(A_1+B_1)+U^1_{0,3}*D_1/2(C_1+D_1)+U^1_{1,3}*C_1/2(C_1+D_1)$$

$$U^2_{2,1}=(U^1_{1,2}+U^1_{1,3})/2$$

$$V^2_{0,0}=(V^1_{0,0}+V^1_{0,1})/2$$

$$V^2_{1,0}=V^1_{0,0}*B_0/2(A_0+B_0)+V^1_{1,0}*A_0/2(A_0+B_0)+V^1_{0,1}*D_0/2(C_0+D_0)+V^1_{1,1}*C_0/2(C_0+D_0)$$

$$V^2_{2,0}=(V^1_{1,0}+V^1_{1,1})/2$$

$$V^2_{0,1}=(V^1_{0,2}+V^1_{0,3})/2$$

$$V^2_{1,1}=V^1_{0,2}*B_1/2(A_1+B_1)+V^1_{1,2}*A_1/2(A_1+B_1)+V^1_{0,3}*D_1/2(C_1+D_1)+$$

$V^1_{1,3} * C_1/2(C_1+D_1)$ $V^2_{2,1} = (V^1_{1,2} + V^1_{1,3})/2$ $A_0 = \{(Y_{0,0}+Y_{1,0})-(Y_{2,0}+Y_{3,0})\}^2$, $B_0 = \{(Y_{4,0}+Y_{5,0})-(Y_{2,0}+Y_{3,0})\}^2$ $C_0 = \{(Y_{0,1}+Y_{1,1})-(Y_{2,1}+Y_{3,1})\}^2$, $D_0 = \{(Y_{4,1}+Y_{5,1})-(Y_{2,1}+Y_{3,1})\}^2$ $A_1 = \{(Y_{0,2}+Y_{1,2})-(Y_{2,2}+Y_{3,2})\}^2$, $B_1 = \{(Y_{4,2}+Y_{5,2})-(Y_{2,2}+Y_{3,2})\}^2$ $C_1 = \{(Y_{0,3}+Y_{1,3})-(Y_{2,3}+Y_{3,3})\}^2$, $D_1 = \{(Y_{4,3}+Y_{5,3})-(Y_{2,3}+Y_{3,3})\}^2$

Accordingly, because the luminance signals Y are referred in the color difference signal converting unit 23 when the 4:1:1 type component picture signals are directly converted into the 4:2:0 type component picture signals, the correlation between color information and luminance information generally existing in a natural picture as a specific feature can be included in the converted color difference signals, and an image of the natural picture can be reproduced at high definition.

Next, the sixth color difference signal converting method performed in the step S201 according to the second embodiment is described in detail with reference to FIG. 8.

Figure 16B:
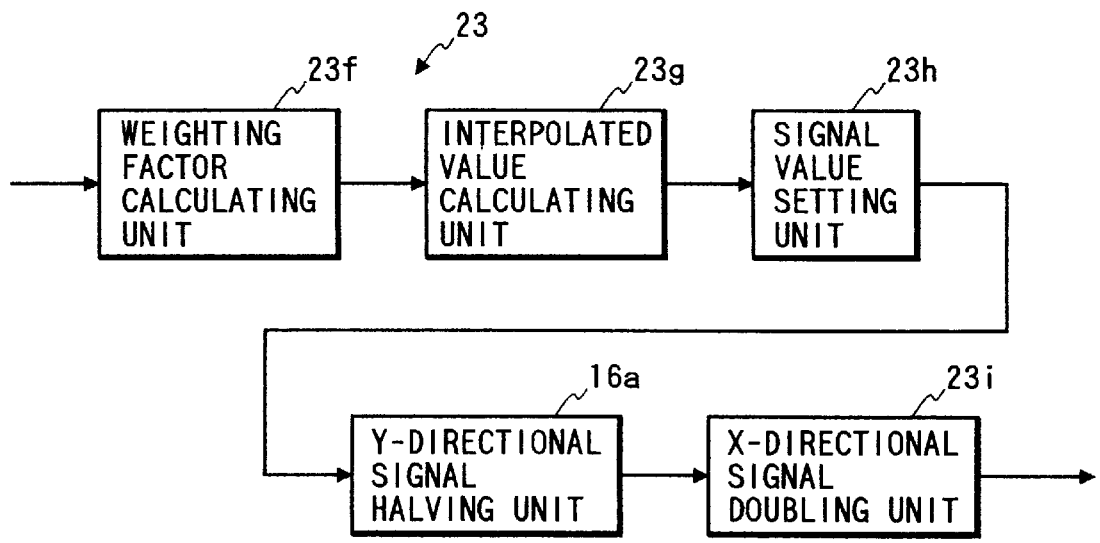
FIG. 16B is a block diagram of a color difference signal converting unit shown in FIG. 14 in a sixth color difference signal converting method.

In the sixth color difference signal converting method, as shown in FIG. 16B, the color difference signal converting unit 23 comprises:

a weighting factor calculating unit 23f for obtaining the referential luminance signals extracted by the referential luminance signal extracting unit 22 as first referential luminance signals on condition that the first referential luminance signals correspond to the color difference signals Cr (or Cb) of co-ordinates (x,2y) and (x+1,2y), calculating a first weighting factor B/2(A+B), a second weighting factor A/2(A+B), a third weighting factor D/2(C+D) and a fourth weighting factor C/2(C+D) from values of the first referential luminance signals, obtaining the referential luminance signals extracted by the referential luminance signal extracting unit 22 as second referential luminance signals on condition that the second referential luminance signals correspond to the color difference signals Cr (or Cb) of co-ordinates (x,2y+1) and (x+1,2y+1) and calculating a fifth weighting factor F/2(F+E) and a sixth weighting factor E/2(E+F), a seventh weighting factor H/2(H+G) and an eighth weighting factor G/2(H+G) from values of the second referential luminance signals;

an interpolated value calculating unit 23g for calculating a first multiplied value by multiplying the value of the color difference signal Cr (or Cb) of the co-ordinates (x,2y) by the first weighting factor, calculating a second multiplied value by multiplying the value of the color difference signal of the co-ordinates (x+1,2y) by the second weighting factor, calculating a third multiplied value by multiplying the value of the color difference signal of the co-ordinates (x,2y+1) by the fifth weighting factor, calculating a fourth multiplied value by multiplying the value of the color difference signal of the co-ordinates (x+1,2y+1) by the sixth weighting factor, calculating a first interpolated value from the first, second, third and fourth multiplied values, calculating a fifth multiplied value by multiplying the value of the color difference signal of the co-ordinates (x,2y) by the third weighting factor, calculating a sixth multiplied value by multiplying the value of the color difference signal of the co-ordinates (x+1,2y) by the fourth weighting factor, calculating a seventh multiplied value by multiplying the value of the color difference signal of the co-ordinates (x,2y+1) by the seventh weighting factor, calculating an eighth multiplied value by multiplying the value of the color difference signal of the co-ordinates (x+1,2y+1) by the eighth weighting factor, calculating a second interpolated value from the fifth, sixth, seventh and eighth multiplied values;

a signal value setting unit 23h for setting the first interpolated value calculated in the interpolated value calculating unit 23g as values of the color difference signals Cr (or Cb) of the co-ordinates (x,2y) and (x,2y+1);

the y-directional signal halving unit 16a for removing color difference signals Cr (or Cb) on every other row from the color difference signals Cr (or Cb), of which the values are set in the signal value setting unit 23h, to halve the number of color difference signals Cr (or Cb) in the y direction; and an x-directional signal doubling unit 23i for adding a color difference signal to a position between each pair of the color difference signals Cr (or Cb) adjacent to each other in the X direction, setting a value of a color difference signal of one added color difference signal to the second interpolated value for each added color difference signal to double the number of color difference signals obtained in the y-directional signal halving unit 23h in the x direction and outputting the color difference signals as the 4:2:0 type converted color difference signals Cr' (or Cb').

In the above configuration, a value $U^2_{2x,y}$ (or $V^2_{2x,y}$) of a converted color difference signal Cr' (or Cb') is set in the signal value setting unit 23h to a first interpolated value calculated from a value $U^1_{x,2y}$ (or $V^1_{x,2y}$) of a color difference signal Cr (or Cb) placed at first coordinates (x,2y), a value $U^1_{x+1,2y}$ (or $V^1_{x+1,2y}$) of a color difference signal of second co-ordinates (x+1,2y) adjacent to the first co-ordinates in the x direction, a value $U^1_{x,2y+1}$ (or $V^1_{x,2y+1}$) of a color difference signal of third co-ordinates (x,2y+1) adjacent to the first co-ordinates in the y direction and a value $U^1_{x+1,2y+1}$ (or $V^1_{x+1,2y+1}$) of a color difference signal of fourth co-ordinates (x+1,2y+1) adjacent to the second co-ordinates in the y direction while multiplying each value of the color difference signal by a weighting factor. The weighting factors respectively indicating an influence of one color difference signal on the converted color difference signal is calculated in the weighting factor calculating unit 23f by referring the referential luminance signals Y. Therefore, a resolution of the converted color difference signals Cr' and Cb' in the y direction is reduced to half that of the color difference signals Cr and Cb. Also, a value $U^2_{2x+1,y}$ (or $V^2_{2x+1,y}$) of a converted color difference signal adjacent to the converted color difference signal of the value $U^2_{2x,y}$ (or $V^2_{2x,y}$) in the x direction is calculated in the x-directional signal doubling unit 23i from the values $U^1_{x,2y}$, $U^1_{x+1,2y}$, $U^1_{x,2y+1}$, $U^1_{x+1,2y+1}$ (or $V^1_{x,2y}$, $V^1_{x+1,2y}$, $V^1_{x,2y+1}$, $V^1_{x+1,2y+1}$) of the color difference signals Cr (or Cb) while multiplying each value of the color difference signal by a weighting factor. Therefore, a resolution of the converted color difference signals Cr' and Cb' in the x direction is doubled. For example, values of converted color difference signals Cr' and Cb' are determined according to a signal conversion equation (6).

$U^2_{2x,y} = U^1_{x,2y} * B/2(A+B) + U^1_{x+1,2y} * A/2(A+B) + U^1_{x,2y+1} * F/2(E+F) + U^1_{x+1,2y+1} * E/2(E+F)$ $U^2_{2x+1,y} = U^1_{x,2y} * D/2(C+D) + U^1_{x+1,2y} * C/2(C+D) + U^1_{x,2y+1} * H/2(G+H) + U^1_{x+1,2y+1} * G/2(G+H)$ $V^2_{2x,y} = V^1_{x,2y} * B/2(A+B) + V^1_{x+1,2y} * A/2(A+B) + V^1_{x,2y+1} * F/2(E+F) + V^1_{x+1,2y+1} * E/2(E+F)$ $V^2_{2x+1,y} = V^1_{x,2y} * D/2(C+D) + V^1_{x+1,2y} * C/2(C+D) + V^1_{x,2y+1} * H/2(G+H) +$ $v^1_{x+1,2y+1} {}^*G/2(G+H)$ $A=\{(Y_{4x,2y}+Y_{4x+1,2y}+Y_{4x+2,2y}+Y_{4x+3,2y})-2(Y_{4x,2y}+Y_{4x+1,2y})\}^2$ $B=\{(Y_{4(x+1),2y}+Y_{4(x+1)+1,2y}+Y_{4(x+1)+2,2y}+Y_{4(x+1)+3,2y})-2(Y_{4x,2y}+Y_{4x+1,2y})\}^2$ $C=\{(Y_{4x,2y}+Y_{4x+1,2y}+Y_{4x+2,2y}+Y_{4x+3,2y})-2(Y_{4x+2,2y}+Y_{4x+3,2y})\}^2$ $D=\{(Y_{4(x+1),2y}+Y_{4(x+1)+1,2y}+Y_{4(x+1)+2,2y}+Y_{4(x+1)+3,2y})-2(Y_{4x+2,2y}+Y_{4x+3,2y})\}^2$ $E=\{(Y_{4x,2y+1}+Y_{4x+1,2y+1}+Y_{4x+2,2y+1}+Y_{4x+3,2y+1})-2(Y_{4x,2y+1}+Y_{4x+1,2y+1})\}^2$ $F=\{(Y_{4(x+1),2y+1}+Y_{4(x+1)+1,2y+1}+Y_{4(x+1)+2,2y+1}+Y_{4(x+1)+3,2y+1})-2(Y_{4x,2y+1}+Y_{4x+1,2y+1})\}^2$ $G=\{(Y_{4x,2y+1}+Y_{4x+1,2y+1}+Y_{4x+2,2y+1}+Y_{4x+3,2y+1})-2(Y_{4x+2,2y+1}+Y_{4x+3,2y+1})\}^2$ $F=\{(Y_{4(x+1),2y+1}+Y_{4(x+1)+1,2y+1}+Y_{4(x+1)+2,2y+1}+Y_{4(x+1)+3,2y+1})-2(Y_{4x+2,2y+1}+Y_{4x+3,2y+1})\}^2$ (6)

Here x=0,1,2,3, - - - and y=0,1,2,3, - - - are satisfied. In the equation (6), it is applicable that the square root of each weighting factor A to F be used as a weighting factor.

In this case, any of values of rightmost converted color difference signals is not determined according to the interpolation for each sub-frame. Also, any of values of second rightmost converted color difference signals placed on the left side of the rightmost converted color difference signals is not determined according to the interpolation for each sub-frame. Therefore, the values of rightmost converted color difference signals and the values of second rightmost converted color difference signals are determined according to the extrapolation. For example, a value of one rightmost converted color difference signal and a value of one second rightmost converted color difference signal are set to a value of a third rightmost converted color difference signal placed on the left side of the second rightmost converted color difference signal for each row of each sub-frame.

As an example shown in FIGS. 8A to 8E, in cases where color difference signals Cr and Cb corresponding to luminance signals Y of one sub-frame composed of 8*4 pixels are input to the color difference signal converting unit 23, values of 4:2:0 type converted color difference signals Cr' and Cb' are determined as follows.

$U^2_{0,0}=U^1_{0,0}{}^*B_0/2(A_0+B_0)+U^1_{1,0}{}^*A_0/2(A_0+B_0)+U^1_{0,1}{}^*F_0/2(E_0+F_0)+U^1_{1,1}{}^*E_0/2(E_0+F_0)$ $U^2_{1,0}=U^1_{0,0}{}^*D_0/2(C_0+D_0)+U^1_{1,0}{}^*C_0/2(C_0+D_0)+U^1_{0,1}{}^*H_0/2(G_0+H_0)+U^1_{1,1}{}^*G_0/2(G_0+H_0)$ $V^2_{0,0}=V^1_{0,0}{}^*B_0/2(A_0+B_0)+V^1_{1,0}{}^*A_0/2(A_0+B_0)+V^1_{0,1}{}^*F_0/2(E_0+F_0)+V^1_{1,1}{}^*E_0/2(E_0+F_0)$ $V^2_{1,0}=V^1_{0,0}{}^*D_0/2(C_0+D_0)+V^1_{1,0}{}^*C_0/2(C_0+D_0)+V^1_{0,1}{}^*H_0/2(G_0+H_0)+V^1_{1,1}{}^*G_0/2(G_0+H_0)$ $A_0=\{(Y_{0,0}+Y_{1,0}+Y_{2,0}+Y_{3,0})-2(Y_{0,0}+Y_{1,0})\}^2$ $B_0=\{(Y_{4,0}+Y_{5,0}+Y_{6,0}+Y_{7,0})-2(Y_{0,0}+Y_{1,0})\}^2$ $C_0=\{(Y_{0,0}+Y_{1,0}+Y_{2,0}+Y_{3,0})-2(Y_{2,0}+Y_{3,0})\}^2$ $D_0=\{(Y_{4,0}+Y_{5,0}+Y_{6,0}+Y_{7,0})-2(Y_{2,0}+Y_{3,0})\}^2$ $E_0=\{(Y_{0,1}+Y_{1,1}+Y_{2,1}+Y_{3,1})-2(Y_{0,1}+Y_{1,1})\}^2$ $F_0=\{(Y_{4,1}+Y_{5,1}+Y_{6,1}+Y_{7,1})-2(Y_{0,1}+Y_{1,1})\}^2$ $G_0=\{(Y_{0,1}+Y_{1,1}+Y_{2,1}+Y_{3,1})-2(Y_{2,1}+Y_{3,1})\}^2$ $H_0=\{(Y_{4,1}+Y_{5,1}+Y_{6,1}+Y_{7,1})-2(Y_{2,1}+Y_{3,1})\}^2$ $U^2_{0,1}=U^1_{0,2}{}^*B_1/2(A_1+B_1)+U^1_{1,2}{}^*A_1/2(A_1+B_1)+U^1_{0,3}{}^*F_1/2(E_1+F_1)+U^1_{1,3}{}^*E_1/2(E_1+F_1)$ $U^2_{1,1}=U^1_{0,2}{}^*D_1/2(C_1+D_1)+U^1_{1,2}{}^*C_1/2(C_1+D_1)+U^1_{0,3}{}^*H_1/2(G_1+H_1)+U^1_{1,3}{}^*G_1/2(G_1+H_1)$ $V^2_{0,1}=V^1_{0,2}{}^*B_1/2(A_1+B_1)+V^1_{1,2}{}^*A_1/2(A_1+B_1)+V^1_{0,3}{}^*F_1/2(E_1+F_1)+V^1_{1,3}{}^*E_1/2(E_1+F_1)$ $V^2_{1,1}=V^1_{0,2}{}^*D_1/2(C_1+D_1)+V^1_{1,2}{}^*C_1/2(C_1+D_1)+V^1_{0,3}{}^*H_1/2(G_1+H_1)+V^1_{1,3}{}^*G_1/2(G_1+H_1)$ $A_1=\{(Y_{0,2}+Y_{1,2}+Y_{2,2}+Y_{3,2})-2(Y_{0,2}+Y_{1,2})\}^2$ $B_1=\{(Y_{4,2}+Y_{5,2}+Y_{6,2}+Y_{7,2})-2(Y_{0,2}+Y_{1,2})\}^2$ $C_1=\{(Y_{0,2}+Y_{1,2}+Y_{2,2}+Y_{3,2})-2(Y_{2,2}+Y_{3,2})\}^2$ $D_1=\{(Y_{4,2}+Y_{5,2}+Y_{6,2}+Y_{7,2})-2(Y_{2,2}+Y_{3,2})\}^2$ $E_1=\{(Y_{0,3}+Y_{1,3}+Y_{2,3}+Y_{3,3})-2(Y_{0,3}+Y_{1,3})\}^2$ $F_1=\{(Y_{4,3}+Y_{5,3}+Y_{6,3}+Y_{7,3})-2(Y_{0,3}+Y_{1,3})\}^2$ $G_1=\{(Y_{0,3}+Y_{1,3}+Y_{2,3}+Y_{3,3})-2(Y_{2,3}+Y_{3,3})\}^2$ $H_1=\{(Y_{4,3}+Y_{5,3}+Y_{6,3}+Y_{7,3})-2(Y_{2,3}+Y_{3,3})\}^2$

Accordingly, because each converted color difference signal is determined according to the interpolation based on four color difference signals and are output from the converting unit 23, even though values of color difference signals input to the converting unit 23 are considerably different from each other, the change of the values of the converted color difference signals can be made smoother that in the fifth color difference signal converting method. Therefore, when a discrete cosine transform (DCT) is performed for the 4:2:0 type converted color difference signals, a compression efficiency can be improved more than that in the fifth color difference signal converting method.

Also, because the luminance signals Y are referred in the color difference signal converting unit 23 when the 4:1:1 type component picture signals are directly converted into the 4:2:0 type component picture signals, the correlation between color information and luminance information generally existing in a natural picture as a specific feature can be included in the converted color difference signals, and an image of the natural picture can be faithfully reproduced at high definition.

Next, actual examples of the color difference signal conversion according to the second embodiment are described with reference to FIGS. 17A to 17E.

FIG. 17A shows a plurality of 4:1:1 type luminance signals Y corresponding to 8*2 pixels, FIG. 17B shows a plurality of 4:1:1 type color difference signals Cr (or Cb) corresponding to the 4:1:1 type luminance signals, FIG. 17C shows a plurality of 4:2:0 type converted color difference signals Cr (or Cb) obtained according to the fifth color difference signal converting method, FIG. 17D shows a plurality of 4:2:0 type converted color difference signals Cr (or Cb) obtained according to the sixth color difference signal converting method, and FIG. 17E shows a plurality of 4:2:0 type converted color difference signals Cr (or Cb) obtained according to the first color difference signal converting method of the first embodiment.

Here, in cases where a value calculated according to one of the signal conversion equations is not an integral number, the value is rounded off to an integral number. Also, in cases where a value of a converted color difference signal is not determined because the value is determined by using a value of a color difference signal not indicated in FIG. 17B, the value is indicated by a sign "-" in FIG. 17C and 17D.

In cases where 4:2:2 type component picture signals indicating a picture are input to a digital video apparatus to record the picture in the digital video apparatus by converting 4:2:2 type color difference signals into 4:1:1 type color difference signals compressed in the DV compression format and the 4:1:1 color difference signals are converted into 4:2:0 type color difference signals compressed according to MPEG1 or MPEG2, 4:2:2 type color difference signals of co-ordinates (0,y), (1,y), (2,y) and (3,y) correspond to luminance signals having values 200 for Y co-ordinates (0,y) and (1,y), 100 for Y co-ordinates (2,y) and (3,y), 100 for Y co-ordinates (4,y) and (5,y) and 100 for Y co-ordinates (6,y) and (7,y), color difference signals of the 4:1:1 color difference signals of co-ordinates (0,y) and (1,y) correspond to luminance signals having values 200 for Y co-ordinates (0,y) and (1,y) and 100 for Y co-ordinates (4,y) and (5,y). Therefore, because values of the 4:1:1 color difference signals shown in FIG. 17B vary as values of the luminance signals vary, in cases where the correlation between color information and luminance information generally existing in a natural picture is considered, it is preferable that values of the 4:2:0 type converted color difference signal of co-ordinates (0,0) and (1,0) be different from each other.

As shown in FIG. 17(E), values of converted color difference signals Cr (or Cb) of co-ordinates (0,0) and (0,1) are the same as each other in the first color difference signal converting method of the first embodiment. In contrast, as shown in FIG. 17(c), values of the converted color difference signals Cr (or Cb) of co-ordinates (0,0) and (0,1) are different from each other in the fifth color difference signal converting method. Therefore, a natural picture can be faithfully reproduced in the fifth color difference signal converting method as compared with that in the first color difference signal converting method.

Also, as shown in FIGS. 17(c) and 17(d), the difference of the values of the converted color difference signals Cr (or Cb) of co-ordinates (0,0) and (0,1) according to the sixth color difference signal converting method is smaller than that according to the fifth color difference signal converting method. Therefore, because color information of the converted color difference signals is concentrated in lower frequency portions, a compression efficiency in an orthogonal conversion such as DCT can be improved.

Accordingly, in cases where the picture signal converting apparatus 21 and one of the fifth and sixth color difference signal converting methods are used, the 4:1:1 type component picture signals can be directly converted into the 4:2:0 type component picture signals.

Also, because the luminance signals are referred to determine the 4:2:0 type converted color difference signals Cr' and Cb', the correlation between color information and luminance information generally existing in a natural picture can be included in the converted color difference signals, and an image of the natural picture can be faithfully reproduced at high definition.

Third Embodiment

In this embodiment, a picture signal converting apparatus, in which an orthogonal-converted digital compressed picture signal compressed in a DVC format is converted into an orthogonal-converted digital compressed picture signal compressed in an MPEG2 format with motion compensation, is described.

Figure 18:
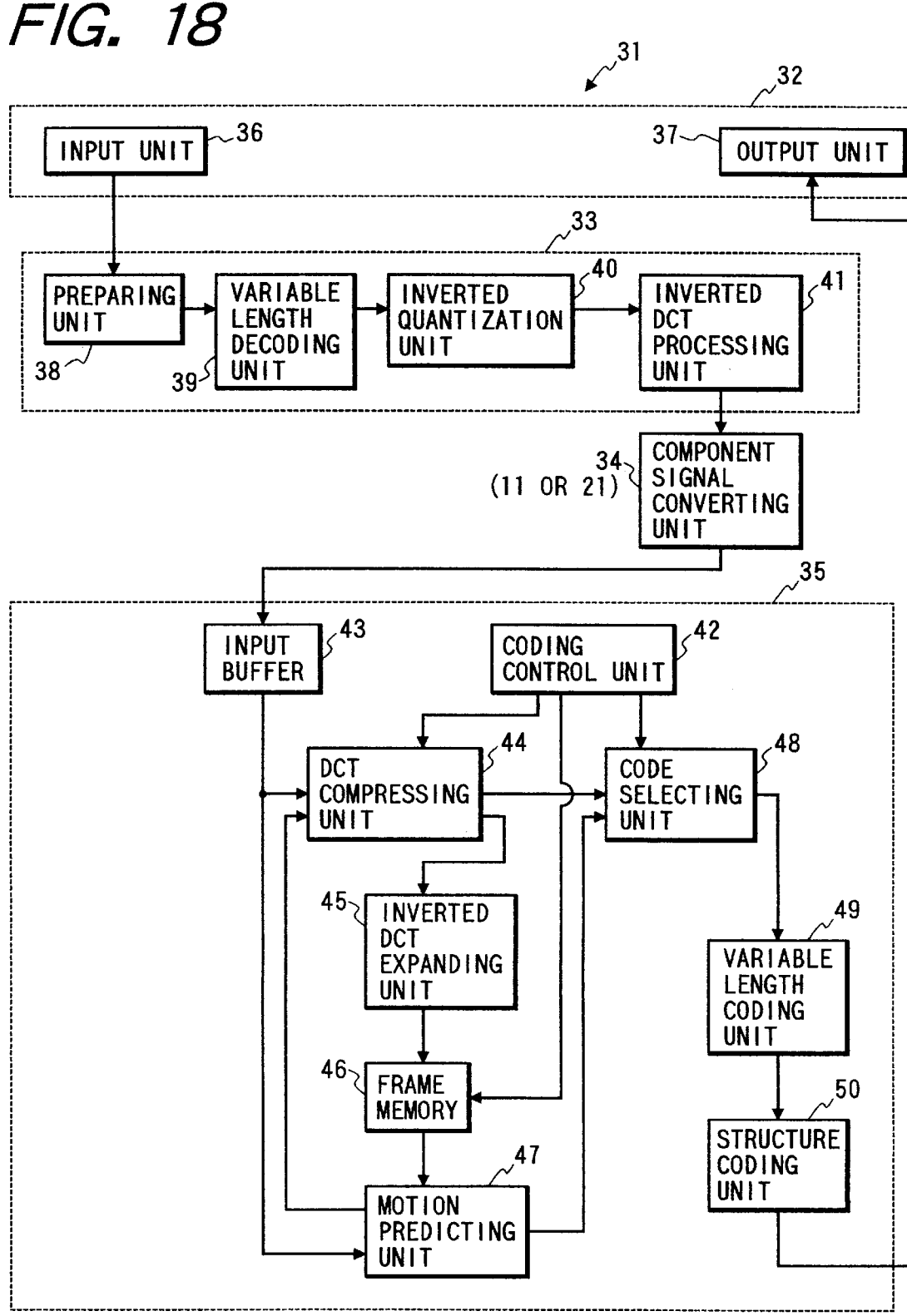
FIG. 18 is a block diagram of a picture signal converting apparatus according to a third embodiment of the present invention.

FIG. 18 is a block diagram of a picture signal converting apparatus according to a third embodiment of the present invention.

As shown in FIG. 18, a picture signal converting apparatus 31 comprises an input-output unit 32 for receiving an orthogonal-converted digital compressed picture signal compressed in a DVC format for each of pixels of a frame and outputting an orthogonal-converted digital compressed picture signal compressed in an MPEG2 format with motion compensation for each of pixels of a frame, a picture signal decoding unit 33 for decoding the compressed picture signals received in the input-output unit 32 to produce non-compressed 4:1:1 type component picture signals, a component picture signal converting unit 34 for directly converting the non-compressed 4:1:1 type component picture signals into non-compressed 4:2:0 type component picture signals, and a picture signal coding unit 35 for coding the non-compressed 4:2:0 type component picture signals to produce the compressed picture signal compressed in the MPEG2 format with motion compensation.

The input-output unit 32 comprises an input unit 36 for receiving the digital compressed picture signals compressed in the DVC format, and an output unit 37 for outputting the digital compressed picture signals compressed in the MPEG2 format with motion compensation.

The picture signal decoding unit 33 comprises a preparing unit 38 for deshuffling the digital compressed picture signals shuffled in the compression according to the DVC format, a variable length decoding unit 39 for performing a variable length decoding for the digital compressed picture signals deshuffled in the preparing unit 38 to produce a plurality of quantized values of DCT coefficients, an inverted quantization unit 40 for performing an inverted quantization for the quantized values of the DCT coefficients to produce the DCT coefficients, and an inverted DCT processing unit 41 for performing an inverted DCT processing for the DCT coefficients to produce the non-compressed 4:1:1 type component picture signals.

The picture signal coding unit 35 comprises a coding control unit 42 for specifying a picture type such as an I-picture, a P-picture or a B-picture for a current frame planned to be encoded in the coding unit 35, an input buffer 43 for storing the non-compressed 4:2:0 type component picture signals of the current frame, a DCT compressing unit 44 for performing a DCT processing for the non-compressed 4:2:0 type component picture signals to obtain a plurality of DCT coefficients of picture signals and quantizing the DCT coefficients by dividing each of the DCT coefficients by a value of a quantized table to obtain a plurality of quantized values of picture signals, an inverted DCT expanding unit 45 for performing an inverted quantization for the quantized values of picture signals to produce DCT coefficients of picture signals, performing an inverted DCT processing for the DCT coefficients obtained in the DCT compressing unit 44 to reproduce the non-compressed 4:2:0 type component picture signals, a frame memory 46 for storing the non-compressed 4:2:0 type component picture signals reproduced in the inverted DCT expanding unit 45 as picture signals of a referential frame, a relationship between the referential frame and the current frame being specified by the coding control unit 42, and picture signals newly stored in the input buffer 43 being set as picture signals of a current frame newly defined, a motion predicting unit 47 for predicting the motion of a picture of the current frame by calculating a motion vector according to the non-compressed 4:2:0 type component picture signals of the referential frame stored in the frame memory 46 and the non-compressed 4:2:0 type component picture signals of the current frame stored in the input buffer 43 for each macroblock of the current frame and calculating an inter-frame difference according to the difference between the non-compressed 4:2:0 type component picture signals of the current frame and non-compressed 4:2:0 type component picture signals of a corresponding macroblock of the referential frame specified by the motion vector for each macroblock, a coding selecting unit 48 for selecting a coding method using the motion vectors or a coding method using no motion vector under the control of the coding control unit 42, selecting the quantized values of picture signals transmitted from the DCT compressing unit 44 as macroblock information in cases where the I-picture is selected by the coding control unit 42 and selecting the motion vectors and the inter-frame differences transmitted from the motion predicting unit 47 as macroblock information in cases where the B-picture or the P-picture is selected by the coding control unit 42, a variable length coding unit 49 for performing a variable length coding for the macroblock information selected by the coding selecting unit 48 to produce pieces of variable length coded data, and a structure coding unit 50 for producing the digital compressed picture signals compressed in the MPEG2 format with motion compensation from the variable length coded data.

The picture signal converting apparatus 11 or 21 according to the first or second embodiment is used as the component picture signal converting unit 34.

Figure 19:
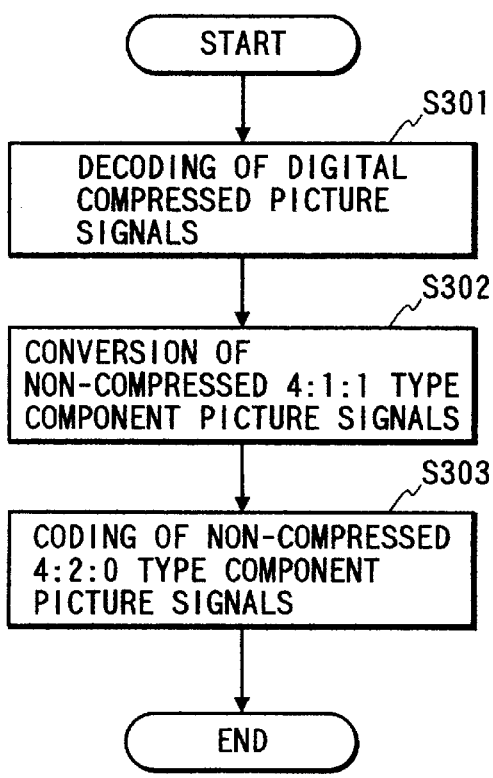
FIG. 19 shows the whole procedure performed in the picture signal converting apparatus shown in FIG. 18.

In the above configuration, an operation of the picture signal converting apparatus 31 is described with reference to FIG. 19. FIG. 19 shows the whole procedure performed in the picture signal converting apparatus 31.

In a step S301, input-output unit 32 for receiving digital compressed picture signals compressed in a DVC format are received in the input unit 36 and are decoded in the picture signal decoding unit 33 to produce non-compressed 4:1:1 type component picture signals.

In a step S302, the non-compressed 4:1:1 type component picture signals are directly converted into non-compressed 4:2:0 type component picture signals in the component picture signal converting unit 34.

In a step S303, the non-compressed 4:2:0 type component picture signals are coded to compressed picture signals compressed in the MPEG2 format with motion compensation, and the compressed picture signals are output from the outputting unit 37.

In this case, it is preferred that the operations in the steps S301 to S303 be performed in parallel to each other. That is, non-compressed 4:1:1 type component picture signals obtained in the step S301 are directly converted into non-compressed 4:2:0 type component picture signals in the step S302 before all non-compressed 4:1:1 type component picture signals are not obtained in the step S301, and non-compressed 4:2:0 type component picture signals obtained in the step S302 are coded in the step S303 before all non-compressed 4:2:0 type component picture signals are not obtained in the step S302.

Next, the decoding processing in the step S301 is described in detail.

A method for obtaining digital compressed picture signals compressed in the DVC format from 4:1:1 type component picture signals is initially described.

To obtain digital picture signals compressed in the DVC format from non-compressed 4:1:1 type component picture signals, the DCT processing is performed for each block (8*8 pixels) of 4:1:1 type component picture signals to obtain a DCT block of DCT coefficients from each block, the DCT coefficients of each DCT block are quantized to obtain a block of quantized values from each DCT block, the quantized values of each block are coded to a block of variable-length codes, and the variable-length codes of the blocks are recorded as digital compressed picture signals compressed in the DVC format.

Also, a macroblock is composed of four DCT blocks of DCT coefficients corresponding to luminance signals Y and two DCT blocks of DCT coefficients corresponding to color difference signals Cr and Cb, a superblock is composed of a plurality of macroblocks, and one frame in the DVC format is composed of a plurality of superblocks. Also, a shuffling processing is performed for the digital compressed picture signals to change original recording positions of the macroblocks or the superblocks in one frame to other recording positions, so that the digital compressed picture signals compressed in the DVC format are obtained.

Figure 20:
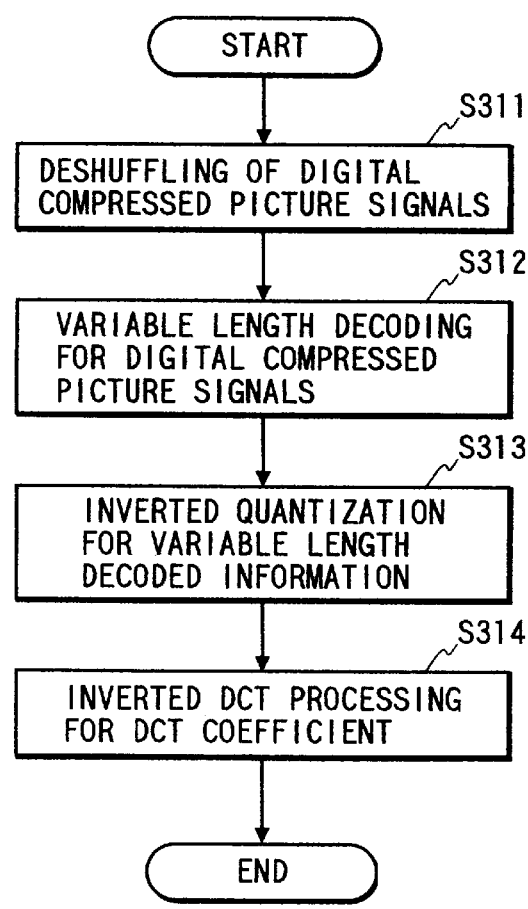
FIG. 20 is a flow chart of a decoding processing performed in the picture signal converting apparatus shown in FIG. 18.

FIG. 20 is a flow chart of the decoding processing performed in the step S301.

In a step S311, the digital compressed picture signals shuffled in the DVC format are deshuffled in the preparing unit 38, so that information of the macroblocks are arranged in the original positions for each frame.

In a step S312, a variable length decoding is performed for the digital compressed picture signals in the variable length decoding unit 39, so that the digital compressed picture signals are converted into variable length decoded information indicating a plurality of quantized values of DCT coefficients.

In a step S313, an inverted quantization is performed for the variable length decoded information in the inverted quantization unit 40, so that the DCT coefficients are obtained.

In a step S314, an inverted DCT processing is performed for the DCT coefficients in the inverted DCT processing unit 41 to obtain pixel values of pixels for each frame. Therefore, the non-compressed 4:1:1 type component picture signals having the pixel values are produced.

Next, the 4:2:0 type component picture signals coding processing performed in the step S303 is described in detail.

Figure 21:
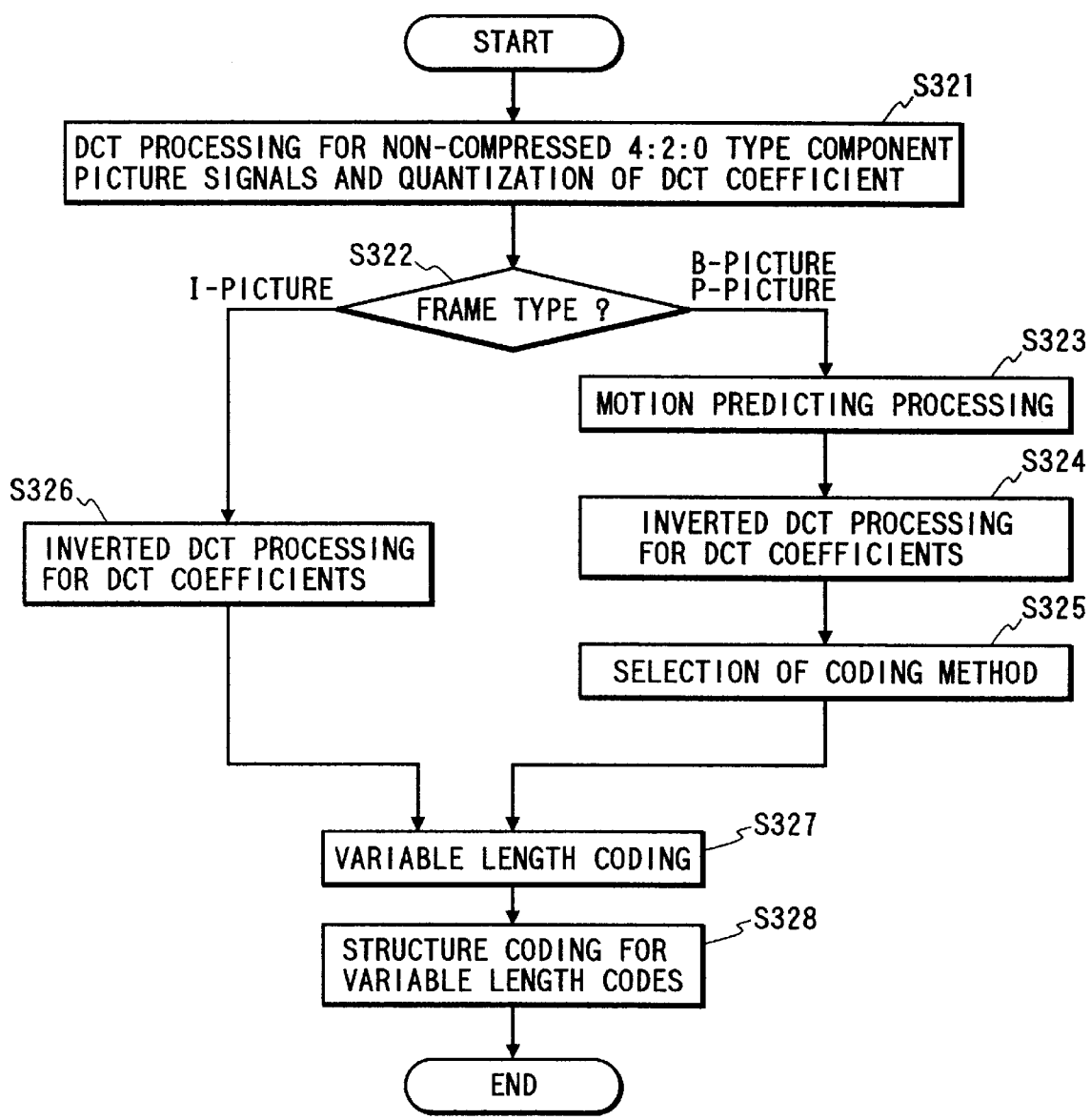
FIG. 21 is a flow chart of a picture signals coding processing performed in the picture signal converting apparatus shown in FIG. 18.

FIG. 21 is a flow chart of the picture signals coding processing performed in the step S303.

In a step S321, a DCT processing is performed in the DCT compressing unit 44 for the non-compressed 4:2:0 type component picture signals obtained from the input buffer 43 to obtain a plurality of DCT coefficients of picture signals, and the DCT coefficients are quantized to obtain a plurality of quantized values of picture signals.

In a step S322, the coding control unit 42 selects a picture type (an I-picture, a P-picture or a B-picture) for the current frame processed in the DCT compressing unit 44. Here, an I-picture is predicted by encoding quantized values of DCT coefficients for the current frame without referring any other frame, a P-picture is predicted by referring component picture signals of a frame preceding to the frame of the P-picture, and a B-picture is predicted by referring component picture signals of a frame preceding to the frame of the B-picture and component picture signals of a frame succeeding to the frame of the B-picture.

In cases where a P-picture or a B-picture is selected for the current frame by the coding control unit 42, the procedure proceeds to a step S323. In the step S323, a motion predicting processing is performed, so that the motion of a picture drawn in one macroblock is predicted in the motion predicting unit 47 for each macroblock of the current frame according to the non-compressed 4:2:0 type component picture signals of the referential frame already stored in the frame memory 46 and the non-compressed 4:2:0 type component picture signals of the current frame stored in the input buffer 43. That is, in cases where the same particular picture is drawn in a remarked macroblock of the current frame and a particular macroblock of the referential frame, a motion vector indicating a positional difference between the remarked macroblock of the current frame and the particular macroblock of the referential frame is calculated for each macroblock of the current frame. Here, the referential frame is a frame preceding to the current frame in case of the P-picture, and the referential frame is a frame preceding to the current frame or a frame succeeding to the current frame in case of the B-picture.

Also, inter-frame difference information indicating a difference between a group of pixel values at the remarked macroblock of the current frame and a group of pixel values at the particular macroblock of the referential frame is calculated for each macroblock of the current frame. Thereafter, the DCT processing and the quantization are performed for the inter-frame difference information in the DCT compressing unit 44, and the motion vectors and the difference information DCT-processed and quantized (or the motion vectors and the difference information not DCT-processed or quantized) are transmitted to the coding selecting unit 48.

In a step S324, an inverted quantization is performed in the inverted DCT expanding unit 45 for the quantized values of picture signals obtained in the DCT compressing unit 44 to produce DCT coefficients of picture signals, a DCT processing is performed for the DCT coefficients to reproduce the non-compressed 4:2:0 type component picture signals, and the non-compressed 4:2:0 type component picture signals are stored in the frame memory 46 as picture signals of the referential frame.

In a step S325, the coding selecting unit 48 selects either a coding method using the motion vectors or a coding method using no motion vector under the control of the coding control unit 42. In cases where a coding method using the motion vectors is selected, macroblock information (motion vectors and inter-frame difference information DCT-processed and quantized) produced in the motion predicting unit 47 is transmitted to the variable length coding unit 49 for each macroblock. In contrast, in cases where a coding method using no motion vector is selected, macroblock information (the quantized values of the picture signals of one macroblock) produced in the DCT compressing unit 44 are transmitted to the variable length coding unit 49 for each macroblock.

In contrast, in the step S322, in cases where an I-picture is selected for the current frame by the coding control unit 42, the quantized values of picture signals obtained in the DCT compressing unit 44 are transmitted to the variable length coding unit 49 through the coding selecting unit 48 as macroblock information for each macroblock. Also, the quantized values of picture signals are transmitted to the inverted DCT expanding unit 45, and the procedure proceeds to a step S326.

In the step S326, an inverted quantization and a DCT processing are performed in the inverted DCT expanding unit 45 for the quantized values of picture signals obtained in the DCT compressing unit 44 to reproduce the non-compressed 4:2:0 type component picture signals in the same manner in the step S324, and the non-compressed 4:2:0 type component picture signals are stored in the frame memory 46 as picture signals of the referential frame. Thereafter, the procedure proceeds to a step S327.

In the step S327, a variable length coding is performed in the variable length coding unit 49 for the macroblock information transmitted from the coding selecting unit 48.

In a step S328, a structure coding is performed in the structure coding unit 50 to add a header required for MPEG data to variable length codes obtained in the variable length coding unit 49, so that the digital compressed picture signals compressed in the MPEG2 format with motion compensation are produced.

Accordingly, even though a user uses a plurality of digital compressed picture signals compressed in the DVC format in his computer C1 and the user desires to provide the digital compressed picture signals for another computer C2, the digital compressed picture signals compressed in the DVC format can be easily converted into a plurality of digital compressed picture signals compressed in the MPEG2 format with motion compensation, and the digital compressed picture signals compressed in the MPEG2 format can be rapidly transmitted to the computer C2 through a network.

Next, the calculation of a motion vector obtained in the motion predicting processing of the step S323 is described in detail.

In the well-known calculation of the motion vectors, current pixel values at a macroblock of a current frame are compared with values of referential pixels placed at each of all macroblocks of a referential frame, errors respectively indicating the difference between one current pixel value and one corresponding referential pixel value are calculated for each macroblock of the referential frame, an average of the errors is calculated as an average error for each macroblock of the referential frame, a particular macroblock of the referential frame corresponding to a particular average error smallest in the average errors is selected, and a positional difference between the macroblock of the current frame and the particular macroblock of the referential frame is calculated as a motion vector indicating a motion of a picture for each macroblock of the current frame. That is, one motion vector for one macroblock of the current frame designates the particular macroblock of the referential frame.

In this embodiment of the present invention, a motion vector calculating method, in which a group of motion vectors is calculated for each of a plurality of hierarchy pictures obtained by gradually lowering the resolution of an original picture, is described.

In this calculating method, a low resolution picture is obtained by reducing the number of pixels in an original picture to half, and another low resolution picture is repeatedly obtained by reducing the number of pixels in a previously obtained low resolution picture to half. Therefore, a group of low resolution pictures in which the resolution is gradually lowered is made for each frame. In this specification, a set of the original picture and the low resolution pictures for the current frame is called a group of current hierarchy pictures (or simply called a group of hierarchy pictures), and a set of the original picture and the low resolution pictures for the referential frame is called a group of referential hierarchy pictures (or simply called a group of hierarchy pictures).

Thereafter, an intermediate motion vector is repeatedly calculated from one current hierarchy picture and one referential hierarchy picture of the same resolution while changing the current and referential hierarchy pictures to those of higher resolution. In this repeated calculations, the intermediate motion vector is set as a rough motion vector for each calculation of the intermediate motion vector, and a plurality of macroblocks placed in the neighborhood of a particular macroblock of the referential frame designated by the rough motion vector are set as candidates for another particular macroblock of the referential frame designated by a next intermediate motion vector. Therefore, when a motion vector is finally calculated from the current and referential hierarchy pictures (or original pictures) corresponding to the highest resolution, the motion vector precisely indicating the motion of the original picture can be obtained.

Figure 22:
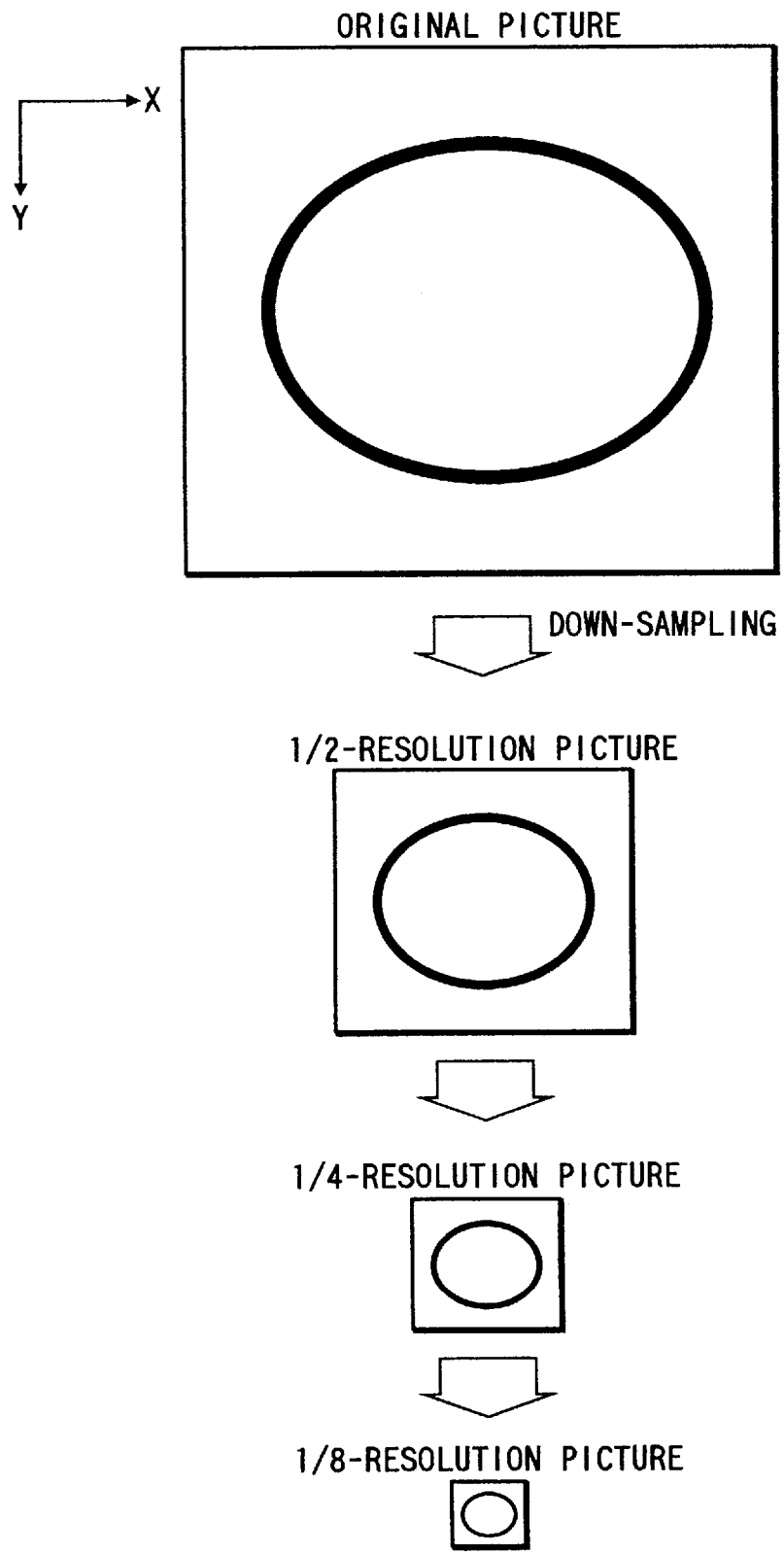
FIG. 22 shows an example of a plurality of hierarchy pictures used in a motion prediction.

A producing method of a plurality of hierarchy pictures is described with reference to FIG. 22. FIG. 22 shows an example of a plurality of hierarchy pictures.

As shown in FIG. 22, a down-sampling (or a pixel decimating processing) is performed for an original picture to remove every other pixel in the x direction from pixels of the original picture and remove every other pixel in the y direction from the pixels, so that a ½-resolution picture in which the resolution is reduced to half that of the original picture is produced as a hierarchy picture. Also, a down-sampling is performed for the ½-resolution picture to produce a ¼-resolution picture in which the resolution is reduced to a quarter that of the original picture as a hierarchy picture. Therefore, in cases where this down-sampling is repeatedly performed for a picture produced just before the down-sampling, a plurality of hierarchy pictures are produced. In this down-sampling, spacial frequency bands in the x and y directions are set to half by using low pass filters, and every other pixel is removed from the pixels of each picture.

Accordingly, in cases where a large object is drawn in a natural picture, the motion of the large object is first calculated as a rough motion vector, and the motion of the large object is more precisely determined each time a motion vector is calculated from a pair of hierarchy pictures corresponding to a higher resolution while using a rough motion vector calculated just before the calculation of the motion vector, so that the motion of the large object can be precisely calculated. Accordingly, a compression efficiency in the MPEG coding can be heightened, and a reproduced picture quality can be improved.

Figure 23:
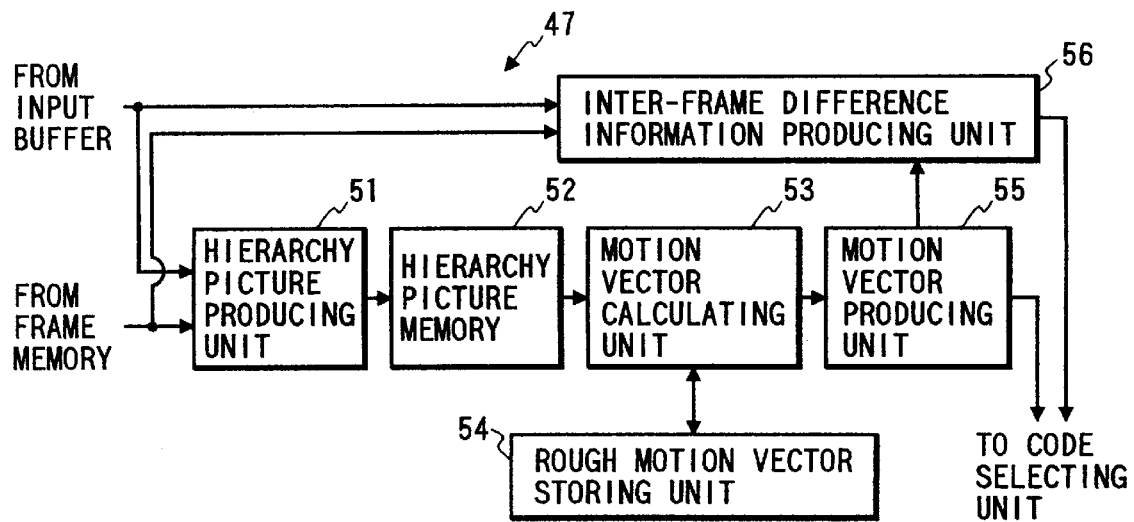
FIG. 23 is a block diagram of a motion predicting unit shown in FIG. 18.

To perform the motion vector calculating method using a plurality of hierarchy pictures, as shown in FIG. 23, the motion predicting unit 47 comprises a hierarchy picture producing unit 51 for producing a plurality of current hierarchy pictures from a current original picture of the current frame indicated by the picture signals stored in the input buffer 43 and producing a plurality of referential hierarchy pictures from a referential original picture of the referential frame indicated by the picture signals stored in the frame memory 46, a hierarchy picture memory 52 for storing the current hierarchy pictures and the referential hierarchy pictures, a motion vector calculating unit 53 for repeatedly calculating an intermediate motion vector from one current hierarchy picture, one referential hierarchy picture and a rough motion vector obtained just before the calculation of the motion vector while the resolution in the current and referential hierarchy pictures is heightened step-by-step, a rough motion vector storing unit 54 for storing the intermediate motion vector as the rough motion vector used for the calculation of a next intermediate motion vector in the calculating unit 53 each time the intermediate motion vector is calculated in the motion vector calculating unit 53, a motion vector producing unit 55 for producing a motion vector from current and referential hierarchy pictures of the highest resolution and the intermediate motion vector finally calculated in the motion vector calculating unit 53 from current and referential hierarchy pictures of the second highest resolution and outputting the motion vector to the coding selecting unit 48, and an inter-frame difference information producing unit 56 for producing an inter-frame difference information indicating a difference between a group of pixel values of one macroblock of the current frame and a group of pixel values of one macroblock of the referential frame corresponding to the motion vector produced in the motion vector producing unit 55.

Figure 24:
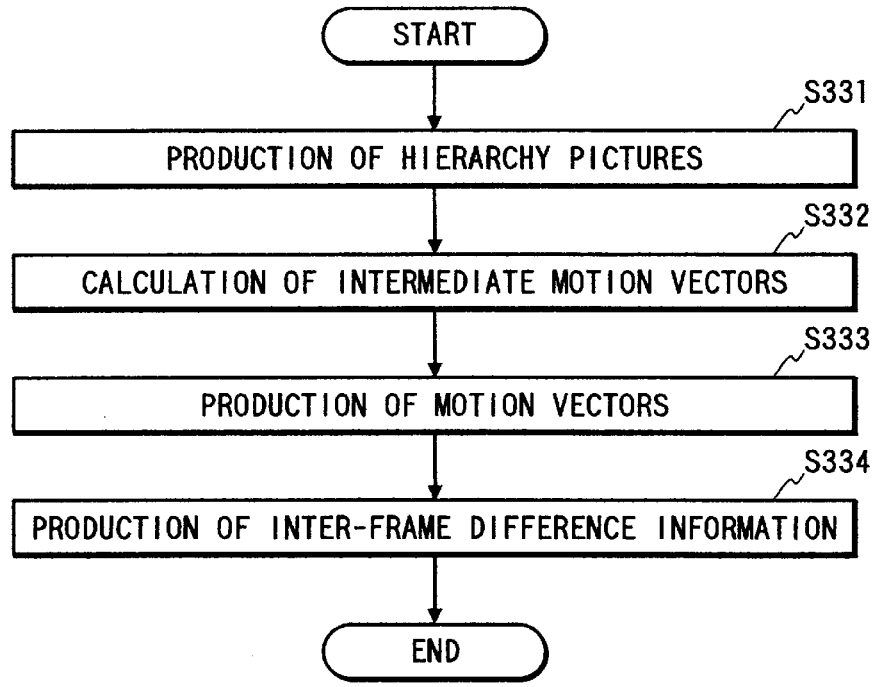
FIG. 24 is a flow chart showing a motion vector calculating method using a plurality of hierarchy pictures.

In the above configuration of the motion predicting unit 47, the motion vector calculating method using a plurality of hierarchy pictures is described with reference to a flow chart shown in FIG. 24.

In a step S331, a plurality of current hierarchy pictures and a plurality of referential hierarchy pictures are produced from the picture signals stored in the input buffer 43 and the picture signals stored in the frame memory 46 in the hierarchy picture producing unit 51. For example, as shown in FIG. 22, the hierarchy pictures of each frame are composed of an original picture, a ½-resolution picture, ¼-resolution picture and ⅛-resolution picture. Thereafter, the hierarchy pictures are stored in the hierarchy picture memory 52.

Figure 25A:
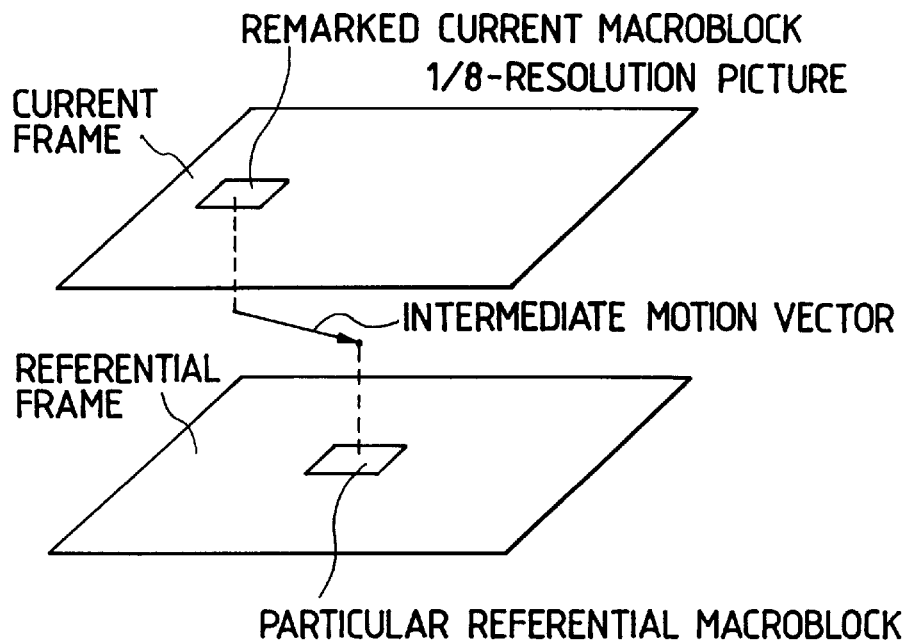
FIGS. 25A and 25B show the motion vector calculating method.

In a step S332, an intermediate motion vector is repeatedly calculated in the motion vector calculating unit 53. That is, the pixels of the ⅛-resolution picture of the current frame are divided into a plurality of current macroblocks respectively composed of 256 pixels (16*16). Also, a plurality of referential macroblocks are produced from the ⅛-resolution picture of the referential frame in the same manner. Thereafter, as shown in FIG. 25A, current pixel values at a remarked current macroblock are compared with referential pixel values at each of all referential macroblocks, errors respectively indicating the difference between one current pixel value and one corresponding referential pixel value are calculated for each referential macroblock, an average of the errors is calculated as an average error for each referential macroblock, a particular referential macroblock corresponding to a particular average error smallest in the average errors is selected, and a positional difference between the remarked current macroblock and the particular referential macroblock is calculated as an intermediate motion vector. That is, the intermediate motion vector for the remarked current macroblock of the current frame designates the particular referential macroblock of the referential frame, and the intermediate motion vector is obtained for each current macroblock. Thereafter, the intermediate motion vector is stored in the rough motion vector storing unit 54 as a rough motion vector for each current macroblock.

Figure 25B:
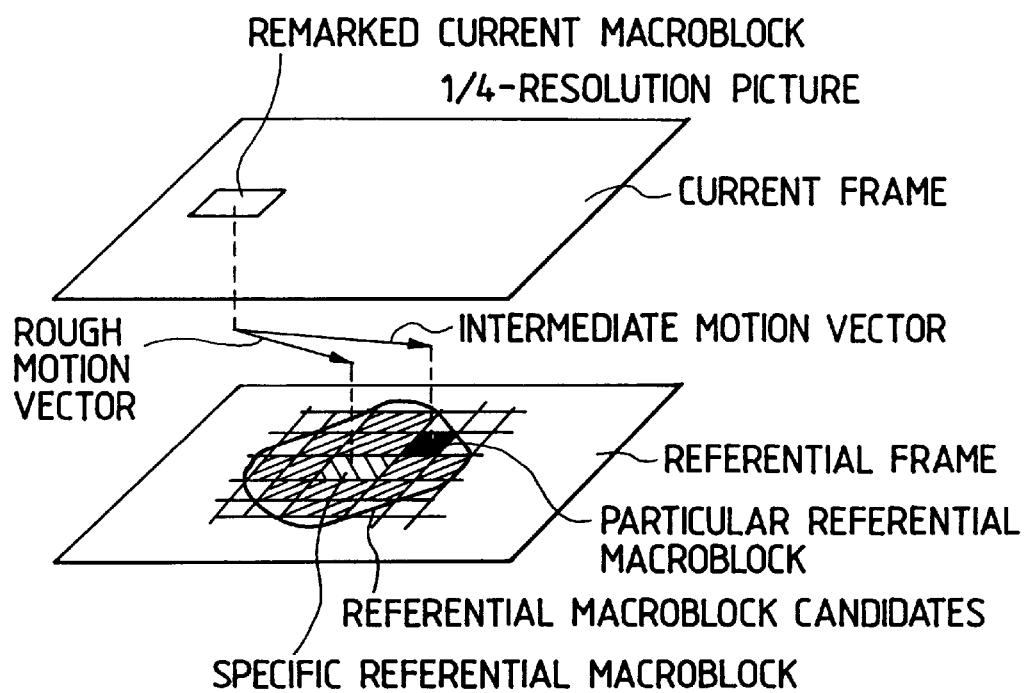

Thereafter, as shown in FIG. 25B, a plurality of current macroblocks and a plurality of referential macroblocks are produced from the ¼-resolution picture of the current frame and the ¼-resolution picture of the referential frame in the same manner, a rough motion vector corresponding to a remarked current macroblock is obtained from the storing unit 54, a specific referential macroblock specified by the rough motion vector is extracted from the referential macroblocks, a plurality of referential macroblock candidates composed of the specific referential macroblock and a plurality of referential macroblocks placed in the neighborhood of the specific referential macroblock are specified, and current pixel values at the remarked current macroblock are compared with values of referential pixels placed at each of the referential macroblock candidates. Thereafter, an average error is calculated for each referential macroblock candidate, a particular referential macroblock corresponding to the smallest average error is selected, and an intermediate motion vector indicating a motion of a picture from the particular referential macroblock to the remarked current macroblock is calculated. Thereafter, the intermediate motion vector is stored in the rough motion vector storing unit 54 as a rough motion vector for each current macroblock.

Thereafter, intermediate motion vectors are calculated for each current macroblock corresponding to the ½-resolution pictures in the same manner as those corresponding to the ¼-resolution pictures.

In a step S333, a motion vector is finally produced in the motion vector producing unit 55 for each current macroblock of the current frame while using the rough motion vector corresponding to the ½-resolution pictures.

In a step S334, an inter-frame difference information indicating a difference between a group of pixel values of one current macroblock and a group of pixel values of one referential macroblock specified by the motion vector corresponding to the current macroblock is produced in the inter-frame difference information producing unit 56.

For example, in cases where a large object is drawn in a natural picture, the motion of the large object is first calculated as an intermediate motion vector, and the motion of the large object is more precisely determined each time the intermediate motion vector is calculated from a pair of hierarchy pictures corresponding to a higher resolution while using a rough motion vector calculated just before the calculation of the intermediate motion vector. Therefore, a motion vector indicating the motion of the large object can be precisely calculated, and a compression efficiency in the MPEG coding can be heightened, and a reproduced picture quality can be improved.

Accordingly, even though a large object is dynamically moved in a moving picture, because the precision of an intermediate motion vector roughly indicating the motion of the large object is gradually heightened while the intermediate motion vector is recalculated, a motion vector faithfully expressing a natural motion of the large object can be finally obtained. Therefore, the digital compressed picture signals compressed in the DVC format can be precisely converted into the digital compressed picture signals compressed in the MPEG2 format with motion compensation, and a picture indicated by the picture signals compressed in the MPEG2 format with motion compensation can be reproduced with high picture quality.

Also, because a rough motion vector calculated in a previous stage is used for the calculation of a next intermediate motion vector, a calculation volume required for the motion vector calculating method using a plurality of hierarchy pictures can be considerably reduced.

In this embodiment, the motion vector calculating method peculiar to the present invention is used. However, it is applicable that a well-known motion vector calculating method be used to convert the digital compressed picture signals compressed in the DVC format into the digital compressed picture signals compressed in the MPEG2 format with motion compensation.

Fourth Embodiment

In a picture signal converting apparatus according to this embodiment, an orthogonal-converted digital compressed picture signal compressed in a DVC format is converted into an orthogonal-converted digital compressed picture signal compressed in an MPEG2 format with motion compensation while DCT coefficients of luminance signals of the DVC format are used for the production of the digital compressed picture signals of the MPEG2 format.

Figure 26:
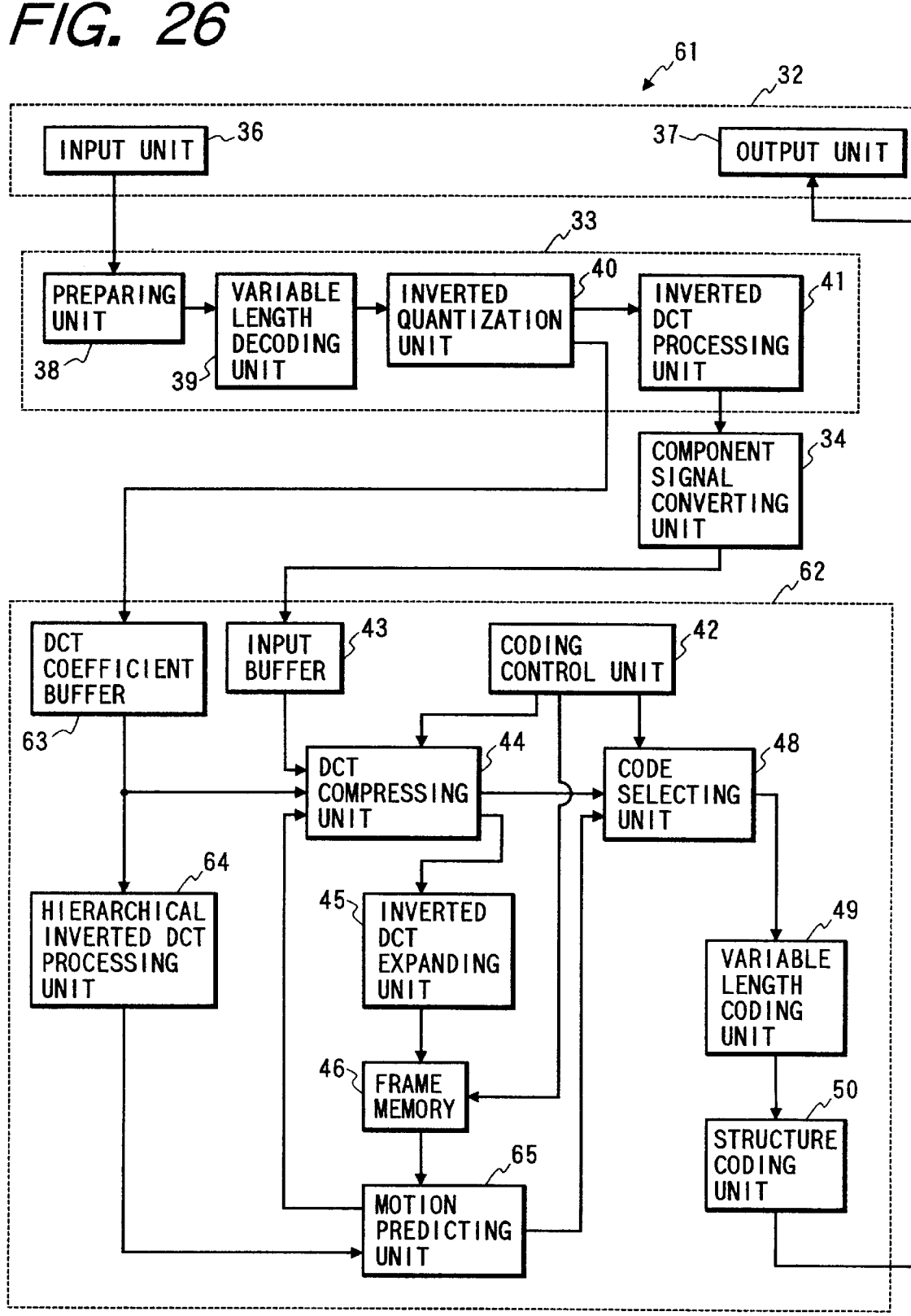
FIG. 26 is a block diagram of a picture signal converting apparatus according to a fourth embodiment.

FIG. 26 is a block diagram of a picture signal converting apparatus according to a fourth embodiment.

As shown in FIG. 26, a picture signal converting apparatus 61 comprises
the input-output unit 32, the picture signal decoding unit 33, the component picture signal converting unit 34, and
a picture signal coding unit 62 for coding the non-compressed 4:2:0 type component picture signals to produce the compressed picture signal compressed in the MPEG2 format with motion compensation while using DCT coefficients of luminance signals of the DVC format for the production of the digital compressed picture signals of the MPEG2 format.

The picture signal coding unit 62 comprises the coding control unit 42, the input buffer 43, the DCT compressing unit 44, the inverted DCT expanding unit 45, the frame memory 46,
a DCT coefficient buffer 63 for storing a plurality of DCT coefficients of luminance signals obtained in the inverted quantization unit 40,
a hierarchical inverted DCT processing unit 64 for performing a hierarchical inverted DCT processing for the DCT coefficients of luminance signals to produce a plurality of hierarchy pictures of the current frame respectively indicated by non-compressed 4:2:0 type component picture signals,
a motion predicting unit 65 for predicting the motion of a picture (or a motion vector) according to the non-compressed 4:2:0 type component picture signals of the referential frame stored in the frame memory 46 and the hierarchy pictures produced in the hierarchical inverted DCT processing unit 64 for each macroblock and calculating an inter-frame difference from the difference between the non-compressed 4:2:0 type component picture signals of one macroblock of the current frame and the non-compressed 4:2:0 type component picture signals of a corresponding macroblock of the referential frame indicated by the motion vector for each macroblock of the current frame,
the coding selecting unit 48, the variable length coding unit 49, and the structure coding unit 50.

Figure 27:
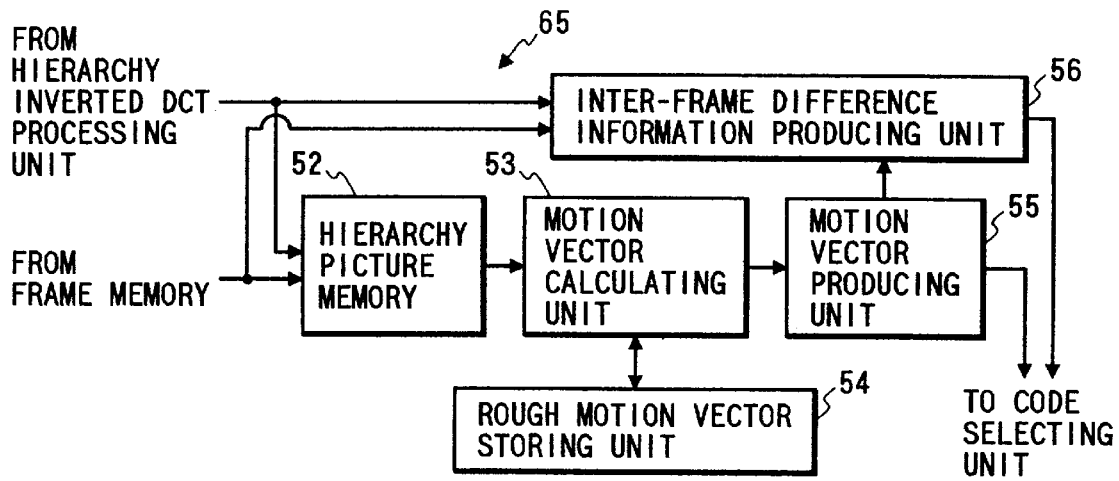
FIG. 27 is a block diagram of a motion predicting unit shown in FIG. 26.

As shown in FIG. 27, the motion predicting unit 65 comprises
the hierarchy picture memory 52 for storing the current hierarchy pictures and the referential hierarchy pictures produced in the hierarchical inverted DCT processing unit 64, the motion vector calculating unit 53, the rough motion vector storing unit 54, the motion vector producing unit 55, and the inter-frame difference information producing unit 56.

In the above configuration, an operation of the picture signal converting apparatus 61 is described.

In this apparatus 61, a plurality of DCT coefficients expressing a plurality of luminance signals of non-compressed 4:1:1 type component picture signals are transmitted to the picture signal coding unit 62, and a plurality of hierarchy pictures are directly produced from the DCT coefficients in the hierarchical inverted DCT processing unit 64. Therefore, any down-sampling required in the third embodiment to produce a plurality of hierarchy pictures is not required, so that the conversion of digital compressed picture signals compressed in the DVC format into digital compressed picture signals compressed in the MPEG2 format with motion compensation can be performed at a shortened processing time.

Figure 28:
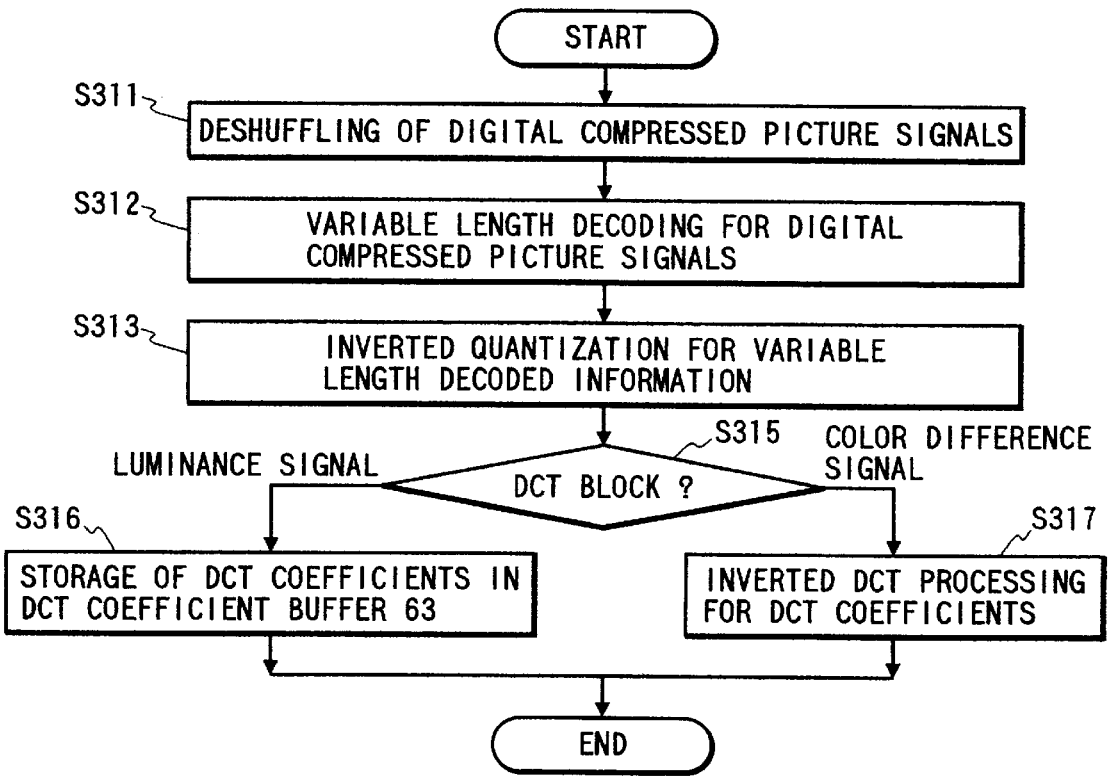
FIG. 28 is a flow chart showing a picture signal decoding (or expanding) processing performed in a picture signal decoding unit shown in FIG. 26.

The whole processing in the apparatus 61 is almost the same as that of the third embodiment shown in FIG. 19. That is, a picture signal decoding processing for the DVC format in the step S301 and a picture signal compressing processing for the MPEG format in the step S303 are different from those in the third embodiment. FIG. 28 is a flow chart showing a picture signal decoding (or expanding) processing performed in the picture signal decoding unit 33.

As shown in FIG. 28, after the steps S311 to S313 are performed in the same manner as in the third embodiment, it is judged in the inverted quantization unit 40 in a step S315 whether or not a DCT block processed in the unit 40 to produce a plurality of DCT coefficients corresponds to luminance signals. In cases where the DCT block corresponds to luminance signals, DCT coefficients of luminance signals included in the DCT block are stored in the DCT coefficient buffer 63 in a step S316. In contrast, in cases where the DCT block corresponds to color difference signals Cr (or Cb), the procedure proceeds to a step S317, an inverted DCT processing is performed in the inverted DCT processing unit 41 to produce non-compressed 4:1:1 type color difference signals Cr (or Cb) from DCT coefficients of color difference signals included in the DCT block by calculating pixel values of pixels from the DCT coefficients. Thereafter, the non-compressed 4:1:1 type color difference signals are directly converted into the non-compressed 4:2:0 type color difference signals in the component picture signal converting unit 34 and are stored in the input buffer 43. In this case, any DCT block of DCT coefficients of luminance signals is not processed in the inverted DCT processing unit 41, and any non-compressed luminance signal is not processed in the component picture signal converting unit 34.

Figure 29:
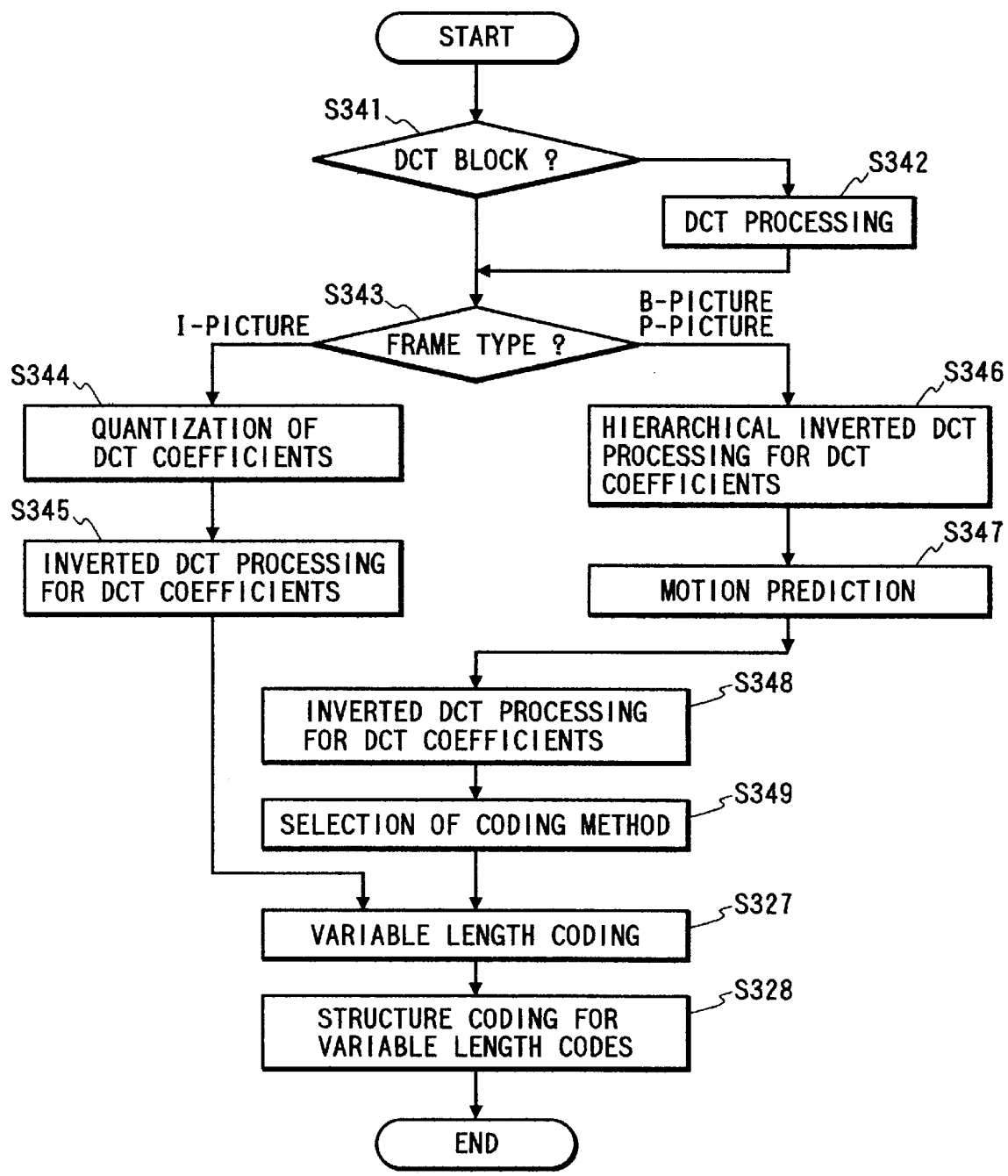
FIG. 29 is a flow chart showing a picture signal compressing processing performed in a picture signal coding unit shown in FIG. 26.

FIG. 29 is a flow chart showing a picture signal compressing processing performed in the picture signal coding unit 62.

In a step S341, because the DCT coefficients of luminance signals stored in the DCT coefficient buffer 63 and the non-compressed 4:2:0 type color difference signals stored in the input buffer 43 are input to the DCT compressing unit 44, it is judged in the DCT compressing unit 44 whether or not data input to the DCT compressing unit 44 is a DCT block of DCT coefficients of luminance signals. In cases where non-compressed 4:2:0 type color difference signals transmitted from the input buffer 43 are input to the DCT compressing unit 44, a DCT processing is performed for the non-compressed 4:2:0 type color difference signals in a step S342 to produce DCT coefficients of color difference signals. In contrast, in cases where DCT coefficients of luminance signals transmitted from the DCT coefficient buffer 63 are input to the DCT compressing unit 44, any DCT processing is not performed.

Therefore, in cases where the steps S341 and S342 are repeated, DCT coefficients of 4:2:0 type component picture signals of the current frame are prepared in the DCT compressing unit 44.

In a step S343, the coding control unit 42 selects a frame type (a frame of an I-picture, a frame of a P-picture or a frame of a B-picture) for the current frame.

In cases where an I-picture is selected for the current frame by the coding control unit 42, any motion prediction is not required, and the procedure proceeds to a step S344. In the step S344, the DCT coefficients of the picture signals (the DCT coefficients of the color difference signals and the DCT coefficients of the luminance signals) of the current frame are quantized in the DCT compressing unit 44, and the quantized values of the current frame are transmitted to the variable length coding unit 49 through the coding selecting unit 48 as macroblock information for each macroblock. Also, the quantized values of the current frame are transmitted to the inverted DCT expanding unit 45.

In a step S345, an inverted quantization is performed in the inverted DCT expanding unit 45 for the quantized values of picture signals obtained in the DCT compressing unit 44 to produce DCT coefficients of picture signals, a DCT processing is performed for the DCT coefficients to reproduce the non-compressed 4:2:0 type component picture signals, and the non-compressed 4:2:0 type component picture signals are stored in the frame memory 46 as picture signals of the referential frame.

In contrast, in cases where a P-picture or a B-picture is selected for the current frame by the coding control unit 42, the procedure proceeds to a step S346. In the step S346, a hierarchical inverted DCT processing described later in detail is performed in the hierarchical inverted DCT processing unit 64 for the DCT coefficients of luminance signals stored in the DCT coefficient buffer 63 to produce a plurality of hierarchy pictures of the current frame, and the hierarchy pictures are stored in the hierarchy picture memory 52 of the motion predicting unit 65.

In a step S347, a motion prediction is performed in the motion predicting unit 65 according to the luminance signals of the referential frame stored in the frame memory 46 and the hierarchy pictures of the current frame stored in the hierarchy picture memory 52, so that a motion vector and inter-frame difference information are obtained for each macroblock. In this motion prediction, each of the hierarchy pictures is compared with an original picture of the referential frame. Thereafter, the motion vectors and the inter-frame difference information (or the inter-frame difference information DCT-processed and quantized in the DCT compressing unit 44) are transmitted to the coding selecting unit 48.

In a step S348, an inverted DCT processing is performed in the inverted DCT expanding unit 45 for the DCT coefficients of the picture signals of the current frame obtained in the DCT compressing unit 44 to reproduce the non-compressed 4:2:0 type component picture signals, and the non-compressed 4:2:0 type component picture signals are stored in the frame memory 46 as picture signals of the referential frame.

In a step S349, the coding selecting unit 48 selects either a coding method using the motion vectors or a coding method using no motion vector under the control of the coding control unit 42. In cases where a coding method using the motion vectors is selected, the motion vectors and the inter-frame difference information produced in the motion predicting unit 65 are transmitted to the variable length coding unit 49 as macroblock information for each macroblock. In contrast, in cases where a coding method using no motion vector is selected, the quantized values of the picture signals produced in the DCT compressing unit 44 are transmitted to the variable length coding unit 49 as macroblock information for each macroblock.

Thereafter, the steps S327 and S328 are performed in the same manner as in the third embodiment.

Therefore, the digital compressed picture signals compressed in the DVC format can be converted into the digital compressed picture signals compressed in the MPEG2 format with motion compensation while the DCT coefficients of the luminance signals of the DVC format are used to predict the motion of a picture in each frame.

The hierarchical inverted DCT processing performed in the step S346 is described in detail with reference to FIGS. 30A to 30D.

In brief, DCT coefficients of picture signals (or luminance signals in this embodiment) in the DVC format are composed of various components ranging from a low frequency component to a high frequency component. An inverted DCT processing is repeatedly performed for a group of DCT coefficients while adding higher frequency components to the group of DCT coefficients step-by-step, and a plurality of hierarchy pictures having different resolutions are produced.

FIGS. 30A to 30D respectively show a DCT block composed of a plurality of DCT coefficients arranged in a matrix of rows and columns and a hierarchy picture obtained by performing an inverted DCT processing for a group of DCT coefficients selected from the DCT block.

Figure 30A:
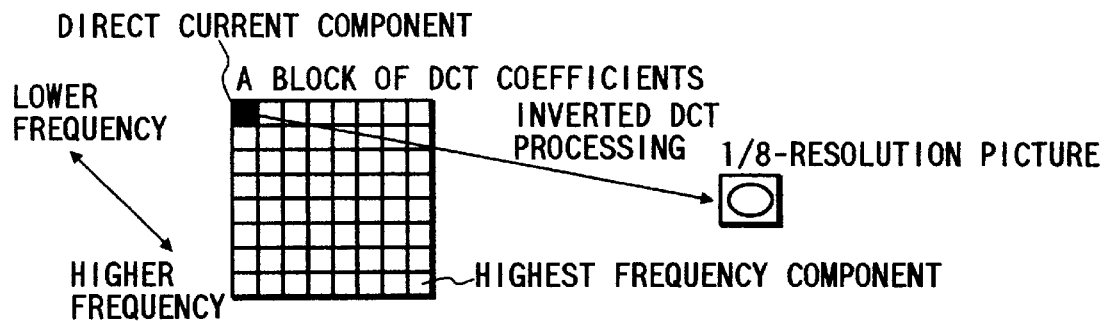
FIGS. 30A to 30D show a hierarchical inverted DCT processing performed in the picture signal converting apparatus shown in FIG. 26.

As shown in FIG. 30A, in a first stage, a direct current component (or the lowest frequency component) arranged on the top left side of a DCT block is selected, an inverted DCT processing is performed for the direct current component to obtain a value of a luminance signal corresponding to the direct current component, and a ⅛-resolution picture composed of the luminance signal is, for example, produced.

Figure 30B:
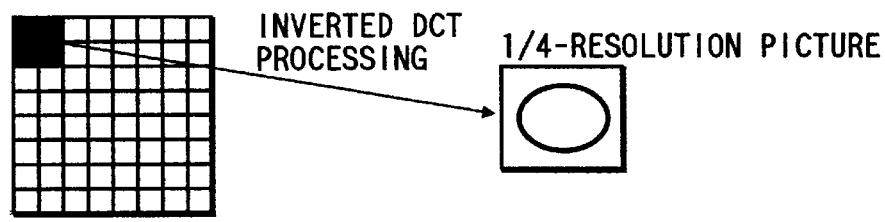
Figure 30C:
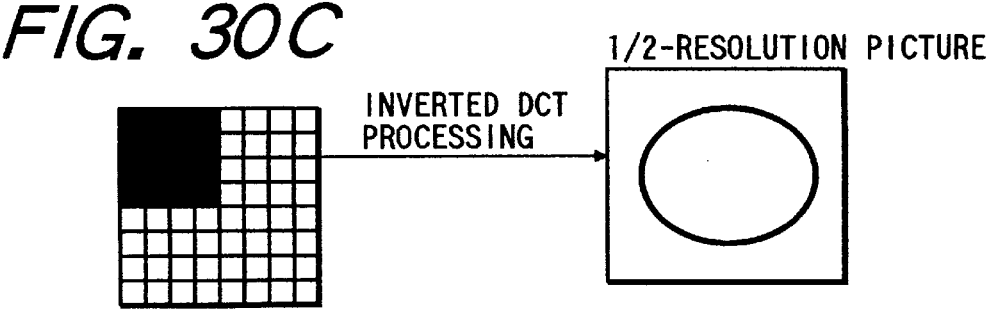
Figure 30D:
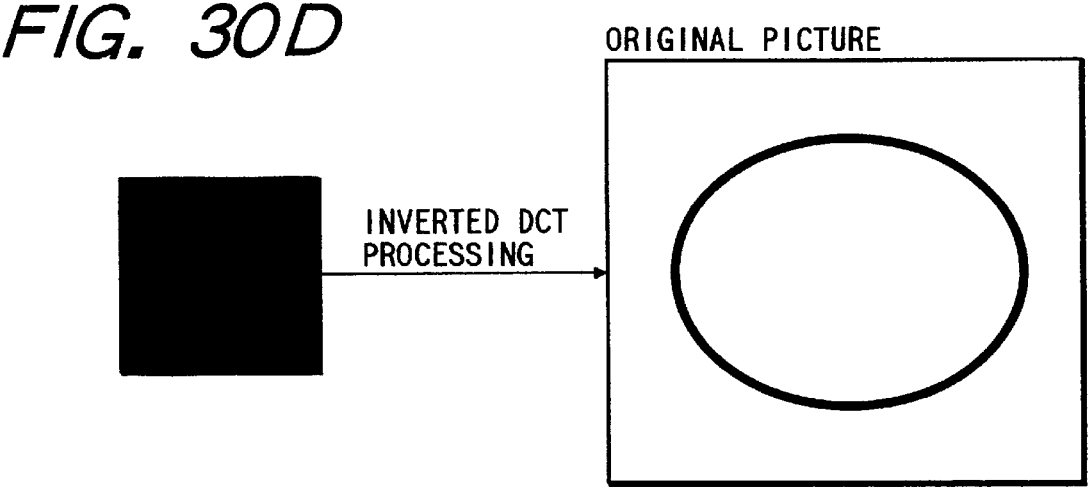

As shown in FIG. 30B, in a second stage, four lower components arranged on the upper left side of the DCT block are selected, an inverted DCT processing is performed for the four lower components to obtain values of luminance signals corresponding to the lower components, and a ¼-resolution picture composed of the luminance signals is produced. Also, as shown in FIG. 30C, in a third stage, sixteen lower components arranged on the upper left side of the DCT block are selected, and a ½-resolution picture is produced. Also, as shown in FIG. 30D, in a final stage, all components of the DCT block are selected, and an original picture is produced. Therefore, a plurality of hierarchy pictures composed of the ⅛-resolution picture, the ¼-resolution picture, ½-resolution picture and the original picture are obtained.

Figure 31:
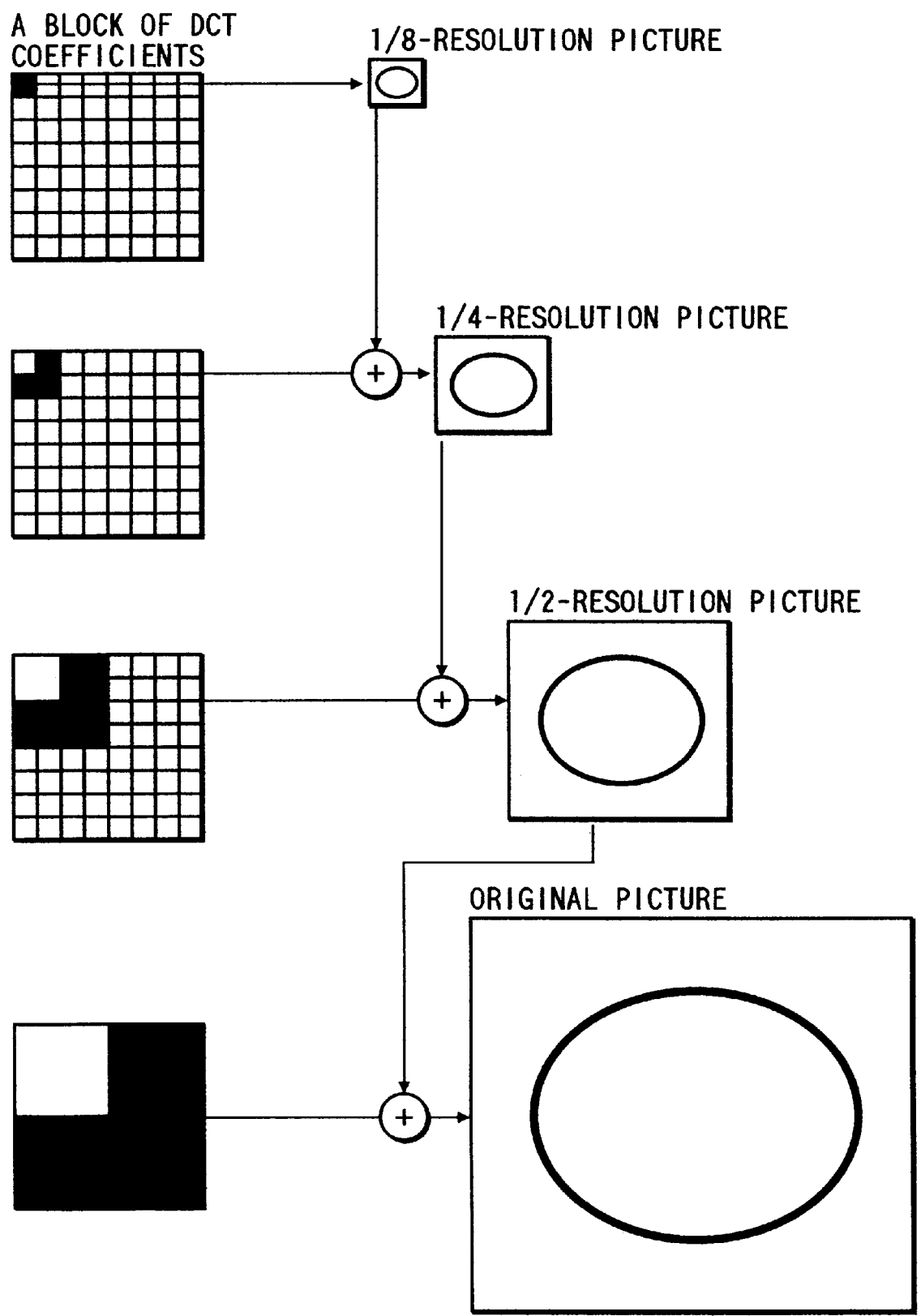
FIG. 31 shows another hierarchical inverted DCT processing performed in the picture signal converting apparatus shown in FIG. 26.

In this hierarchical inverted DCT processing, each inverted DCT processing is independent of the other processing. However, as shown in FIG. 31, it is applicable that a hierarchy picture obtained in a stage be used for a next stage. That is, in the second stage, three lower components not including the direct current component are selected from the upper left side of the DCT block, and the ¼-resolution picture is produced by combining the ⅛-resolution picture obtained in the first stage and a picture obtained from the three lower components. Also, in the third stage, twelve lower components not including a group of four components corresponding to the ¼-resolution picture are selected from the upper left side of the DCT block, and the ½-resolution picture is produced by combining the ¼-resolution picture and a picture obtained from the twelve lower components. Also, in the final stage, all components other than the sixteen components corresponding to the ½-resolution picture are selected, and the original picture is produced by adding the ½-resolution picture.

Therefore, in this hierarchical inverted DCT processing shown in FIG. 31, a calculation volume can be reduced.

Accordingly, because the DCT coefficients of the luminance signals of the DVC format are used as the DCT coefficients of the luminance signals of the MPEG2 format by directly transmitting the DCT coefficients of the luminance signals obtained in the inverted quantization unit 40 to the picture coding unit 62 as the DCT coefficients of the luminance signals of the MPEG2 format without passing the inverted DCT processing unit 41 and the component signal converting unit 34, the processing for the conversion of the DCT coefficients of the luminance signals of the DVC format into the DCT coefficients of the luminance signals of the MPEG2 format is not required. Therefore, the calculation volume required for the conversion of the digital compressed picture signals compressed in the DVC format into the digital compressed picture signals compressed in the MPEG2 format with motion compensation can be reduced.

Also, because the calculation volume required for the production of the hierarchy pictures in the hierarchical inverted DCT processing unit 64 is almost the same as that required in the inverted DCT processing unit 41 in which the inverted DCT processing is performed for the DCT coefficients of the luminance signals of the DVC format in the third embodiment, even though the hierarchy pictures is produced, the increase of the calculation volume can be disregarded.

In this embodiment, because any of the DCT coefficients of the luminance signals of the DVC format is not transmitted to the inverted DCT processing unit 41, the component picture signal converting unit 34 does not function as the picture signal converting apparatus 21. However, in cases where the DCT coefficients of the luminance signals of the DVC format are transmitted to both the DCT coefficient buffer 63 and the inverted DCT processing unit 41, the component picture signal converting unit 34 can function as the picture signal converting apparatus 21.

Fifth Embodiment

In a picture signal converting apparatus according to this embodiment, an orthogonal-converted digital compressed picture signal compressed in a DVC format is converted into an orthogonal-converted digital compressed picture signal compressed in an MPEG2 format with motion compensation while reducing the calculation volume required for the detection of motion vectors.

Figure 32:
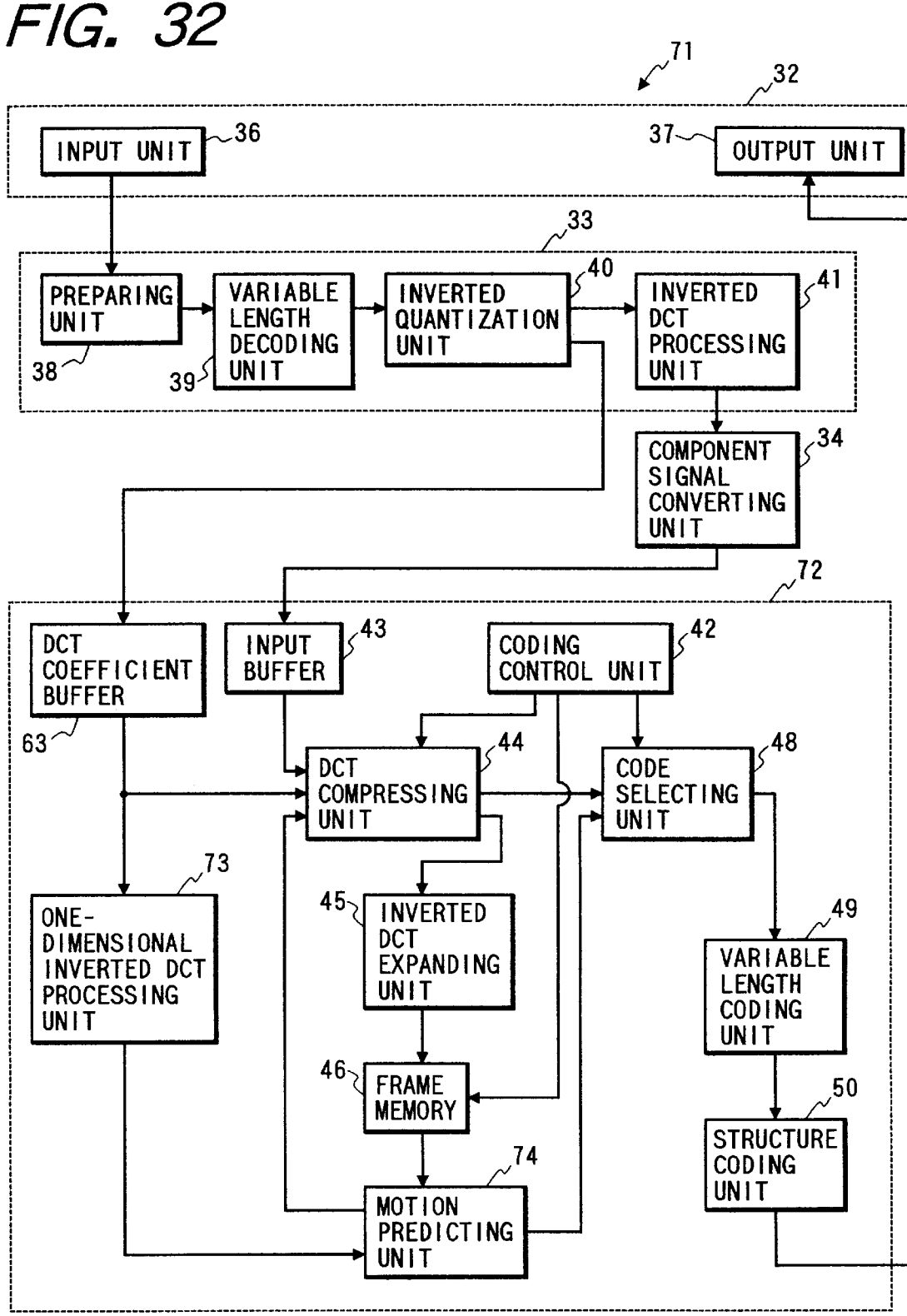
FIG. 32 is a block diagram of a picture signal converting apparatus according to a fifth embodiment.

FIG. 32 is a block diagram of a picture signal converting apparatus according to a fifth embodiment.

As shown in FIG. 32, a picture signal converting apparatus 71 comprises the input-output unit 32, the picture signal decoding unit 33, the component picture signal converting unit 34, and a picture signal coding unit 72 for coding the non-compressed 4:2:0 type component picture signals to produce the compressed picture signal compressed in the MPEG2 format with motion compensation while reducing the calculation volume required for the detection of motion vectors.

The picture signal coding unit 72 comprises the coding control unit 42, the input buffer 43, the DCT compressing unit 44, the inverted DCT expanding unit 45, the frame memory 46, the DCT coefficient buffer 63, a one-dimensional inverted DCT processing unit 73 for extracting a first group of DCT coefficients arranged in a row from the DCT coefficients of luminance signals stored in the DCT coefficient buffer 63, extracting a second group of DCT coefficients arranged in a column from the DCT coefficients of luminance signals stored in the DCT coefficient buffer 63, performing a one-dimensional inverted DCT processing for the first group of DCT coefficients of luminance signals and the second group of DCT coefficients of luminance signals to obtain one dimensional information (x-directional information and y-directional information), a motion predicting unit 74 for predicting the motion of a picture (or a motion vector) according to the non-compressed 4:2:0 type component picture signals of the referential frame stored in the frame memory 46, the non-compressed 4:2:0 type component picture signals of the current frame stored in the input buffer 43 for each macroblock and the one dimensional information obtained in the one-dimensional inverted DCT processing unit 73 and calculating an inter-frame difference according to the motion vectors and the difference between the non-compressed 4:2:0 type component picture signals of the referential frame and the non-compressed 4:2:0 type component picture signals of the current frame for each macroblock, the coding selecting unit 48, the variable length coding unit 49, and the structure coding unit 50.

Figure 33:
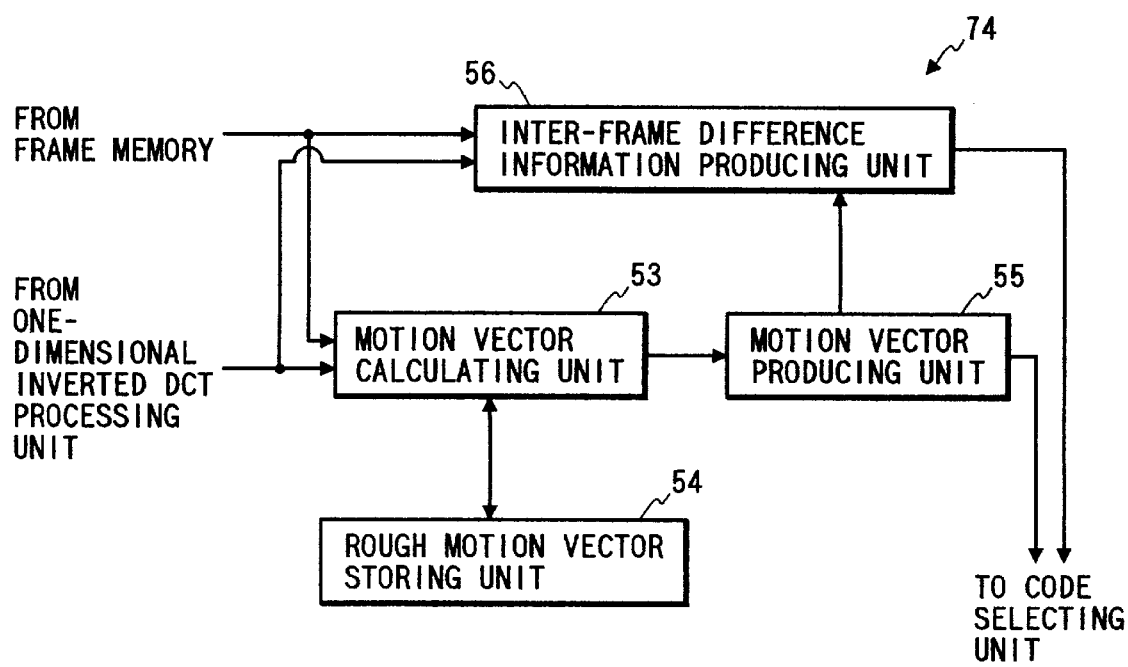
FIG. 33 is a block diagram of a motion predicting unit shown in FIG. 32.

As shown in FIG. 33, the motion predicting unit 74 comprises the motion vector calculating unit 53, the rough motion vector storing unit 54, the motion vector producing unit 55, and the inter-frame difference information producing unit 56.

Figure 34:
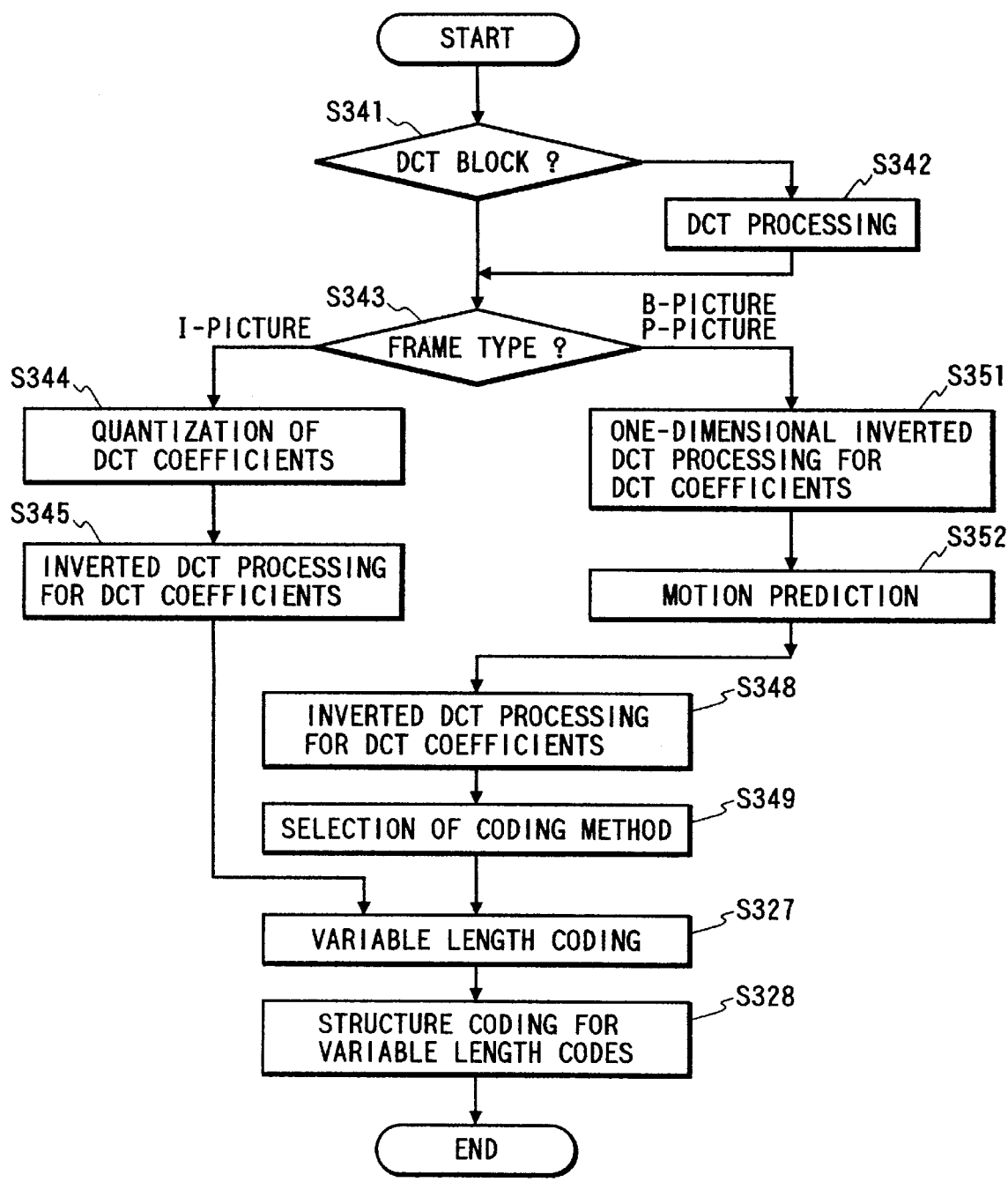
FIG. 34 is a flow chart showing a picture signal compressing processing performed in a picture signal decoding unit shown in FIG. 26.

The whole processing in the apparatus 71 is almost the same as those of the third and fourth embodiments shown in FIG. 19. That is, the steps S301 and S302 are performed in the apparatus 71 in the same manner as in the fourth embodiment, and a picture signal compressing processing in the step S303 is different from that in the fourth embodiment. FIG. 34 is a flow chart showing a picture signal compressing processing performed in the picture signal decoding unit 72.

As shown in FIG. 34, after the steps S341 to S342 are performed in the same manner as in the fourth embodiment, the coding control unit 42 selects a frame type for the current frame processed in the DCT compressing unit 44 in the step S343.

In cases where an I-picture is selected by the coding control unit 42, the DCT coefficients of the picture signals (the DCT coefficients of the color difference signals and the DCT coefficients of the luminance signals read out from the DCT coefficient buffer 63) of the current frame are quantized in the DCT compressing unit 44 in the step S344, and the quantized values of the current frame are transmitted to the variable length coding unit 49 through the coding selecting unit 48. Also, in the step S345, an inverted quantization is performed in the inverted DCT expanding unit 45 for the quantized values of picture signals obtained in the DCT compressing unit 44 to produce DCT coefficients of picture signals, a DCT processing is performed for the DCT coefficients to reproduce the non-compressed 4:2:0 type component picture signals, and the non-compressed 4:2:0 type component picture signals are stored in the frame memory 46 as picture signals of the referential frame.

In contrast, in cases where a P-picture or a B-picture is selected by the coding control unit 42 in the step S343, the procedure proceeds to a step S351. In the step S351, a one-dimensional inverted DCT processing described later in detail is performed in the one-dimensional inverted DCT processing unit 73 for the DCT coefficients of luminance signals stored in the DCT coefficient buffer 63 to produce one-dimensional information of the current frame, and the one-dimensional information is transmitted to the motion predicting unit 74.

In a step S352, a motion prediction is performed in the motion predicting unit 74 according to luminance signals of the referential frame stored in the frame memory 46 and the one-dimensional information of the current frame, so that motion vectors and inter-frame difference information of pixel values are obtained. Thereafter, the motion vectors and the inter-frame difference information DCT-processed and quantized in the DCT compressing unit 44 are transmitted to the coding selecting unit 48.

Thereafter, the steps S348 and S349 and the steps S327 and S328 are performed in the same manner as in the fourth embodiment.

Next, the one-dimensional inverted DCT processing performed in the step S351 and the motion prediction performed in the step S352 are described in detail with reference to FIG. 35.

Figure 35:
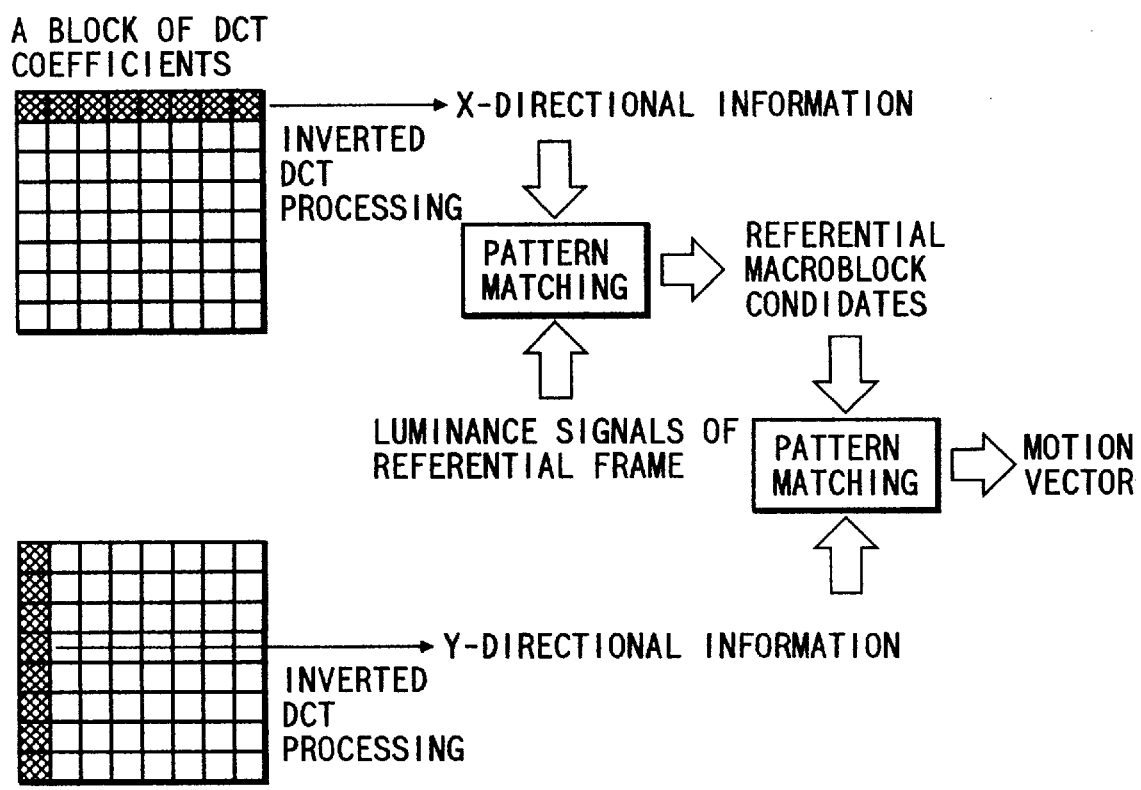
FIG. 35 shows a one-dimensional inverted DCT processing and a motion prediction performed in a picture signal decoding unit shown in FIG. 26.

FIG. 35 shows the one-dimensional inverted DCT processing and the motion prediction performed in the one-dimensional inverted DCT processing unit 73 and the motion predicting unit 74.

As shown in FIG. 35, a plurality of DCT coefficients are arranged in each DCT block in a matrix of rows and columns. In the one-dimensional inverted DCT processing performed in the one-dimensional inverted DCT processing unit 73, an x-directional group of DCT coefficients arranged in series in the x direction (or lateral direction) and a y-directional group of DCT coefficients arranged in series in the y direction (or longitudinal direction) are selected from each DCT block, an inverted DCT processing is performed for the x-directional group of DCT coefficients and the y-directional group of DCT coefficients, and values of eight non-compressed luminance signals arranged in the x direction and values of eight non-compressed luminance signals arranged in the y direction are obtained. In this case, the values of eight non-compressed luminance signals arranged in the x direction are called x-directional information for one DCT block, the values of eight non-compressed luminance signals arranged in the y direction are called y-directional information for one DCT block, and one-dimensional information for one DCT block is composed of the x-directional information and the y-directional information. Thereafter, because one macroblock is composed of 2*2 DCT blocks, x-directional information (values of 2*16 luminance signals) for one macroblock is produced by combining four pieces of x-directional information corresponding to 2*2 DCT blocks, and y-directional information (values of 16*2 luminance signals) for one macroblock is produced by combining four pieces of y-directional information corresponding to 2*2 DCT blocks. Thereafter, pieces of x-directional information corresponding to one frame and pieces of y-directional information corresponding to one frame are produced by repeating the production of the x-directional information and y-directional information for the macroblock.

Figure 36:
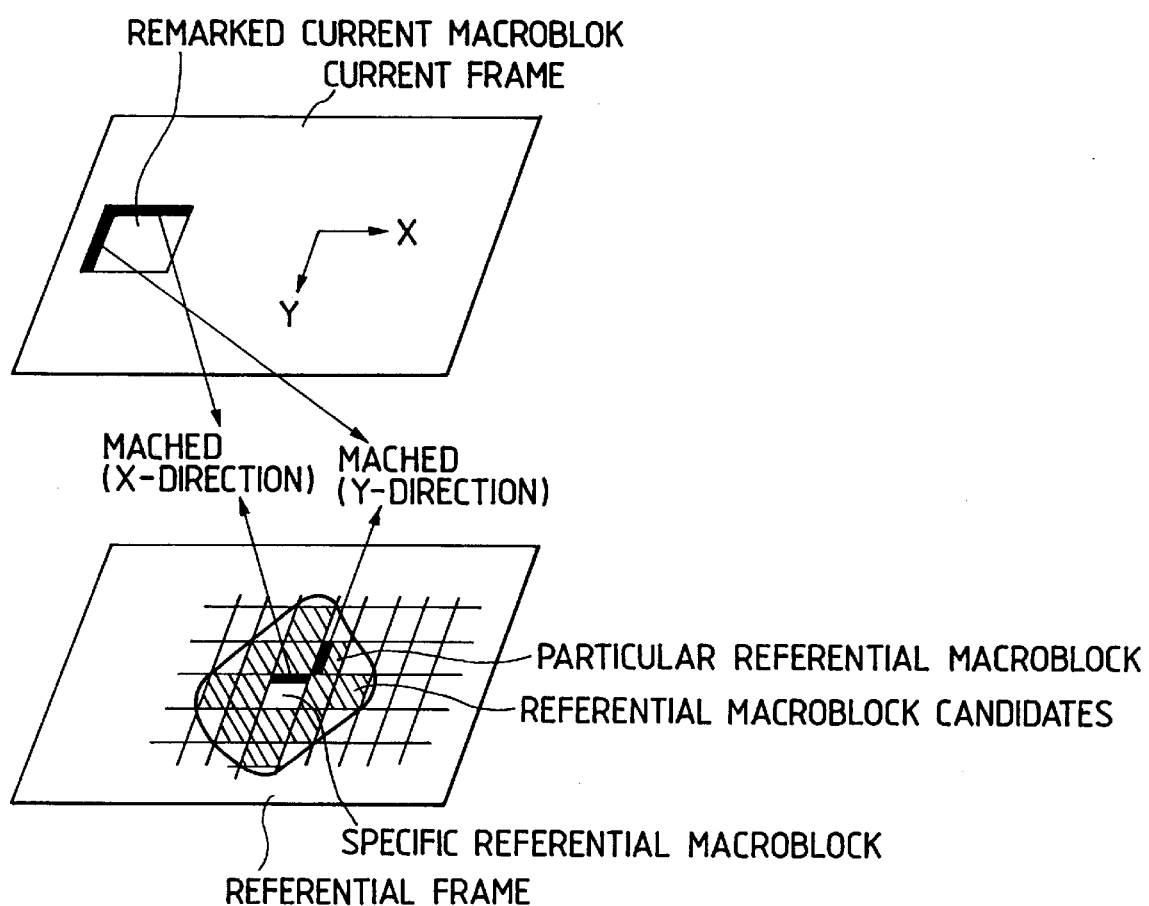
FIG. 36 shows the detection of a motion vector in the one-dimensional inverted DCT processing.

Thereafter, the motion prediction is performed in motion predicting unit 74. In detail, as shown in FIG. 36, a matching between a patten of the x-directional information for one current macroblock corresponding to a remarked current frame and a patten of values of 2*16 luminance signals of each referential macroblock of the referential frame extracted from the frame memory 46 is performed, and a specific referential macroblock of the referential frame is determined in the same manner as in the third embodiment on condition that an average error for the specific referential macroblock is minimum among those for the referential macroblocks of the referential frame. Thereafter, a plurality of referential macroblock candidates composed of the specific referential macroblock and a plurality of referential macroblocks placed in the neighborhood of the specific referential macroblock are specified, a matching between a patten of the y-directional information for the remarked current macroblock and a patten of values of 16*2 luminance signals of each referential macroblock candidate of the referential frame is performed, a particular referential macroblock of the referential frame is determined in the same manner as in the third embodiment on condition that an average error for the particular referential macroblock is minimum among those for the referential macroblock candidates of the referential frame, and a vector connecting the remarked current macroblock and the particular referential macroblock is determined as a motion vector of the remarked current macroblock. Therefore, a plurality of motion vectors of the macroblocks of the current frame are obtained for performing the motion prediction for each macroblock of the current frame.

Accordingly, because the number of values used for the calculation in each macroblock is 32 (2*16) though the number of values in each macroblock is 256 (16*16), the calculation volume in the motion prediction can be considerably reduced. Also, because the calculation for the y-directional information is performed for only the specific referential macroblocks after the calculation for the x-directional information, the calculation volume in the motion prediction required for the y-directional information is not so much. Therefore, the calculation volume in the motion prediction can be reduced to almost 1/8 as compared with that in the third embodiment.

In this embodiment, any hierarchy picture used in the third embodiment is not used. However, it is applicable that a plurality of hierarchy pictures for the current frame and a plurality of hierarchy pictures for the referential frame be used. In this case, the one-dimensional inverted DCT processing is performed for each hierarchy picture of the current frame, a matching between a patten of x-directional information for one hierarchy picture of one current macroblock and a patten of values of 2*16 luminance signals of each referential macroblock of one hierarchy picture of the referential frame is performed, and a matching between a patten of y-directional information for one hierarchy picture of one current macroblock and a patten of values of 16*2 luminance signals of each referential macroblock candidate of one hierarchy picture of the referential frame is performed.

Sixth Embodiment

In this embodiment, any component signal converting unit used in the third to fifth embodiments is not used, but the arrangement of DCT coefficients of 4:1:1 type color difference signals obtained in a picture decoding processing as intermediate information is changed to convert a compression format of digital picture signals.

Figure 37:
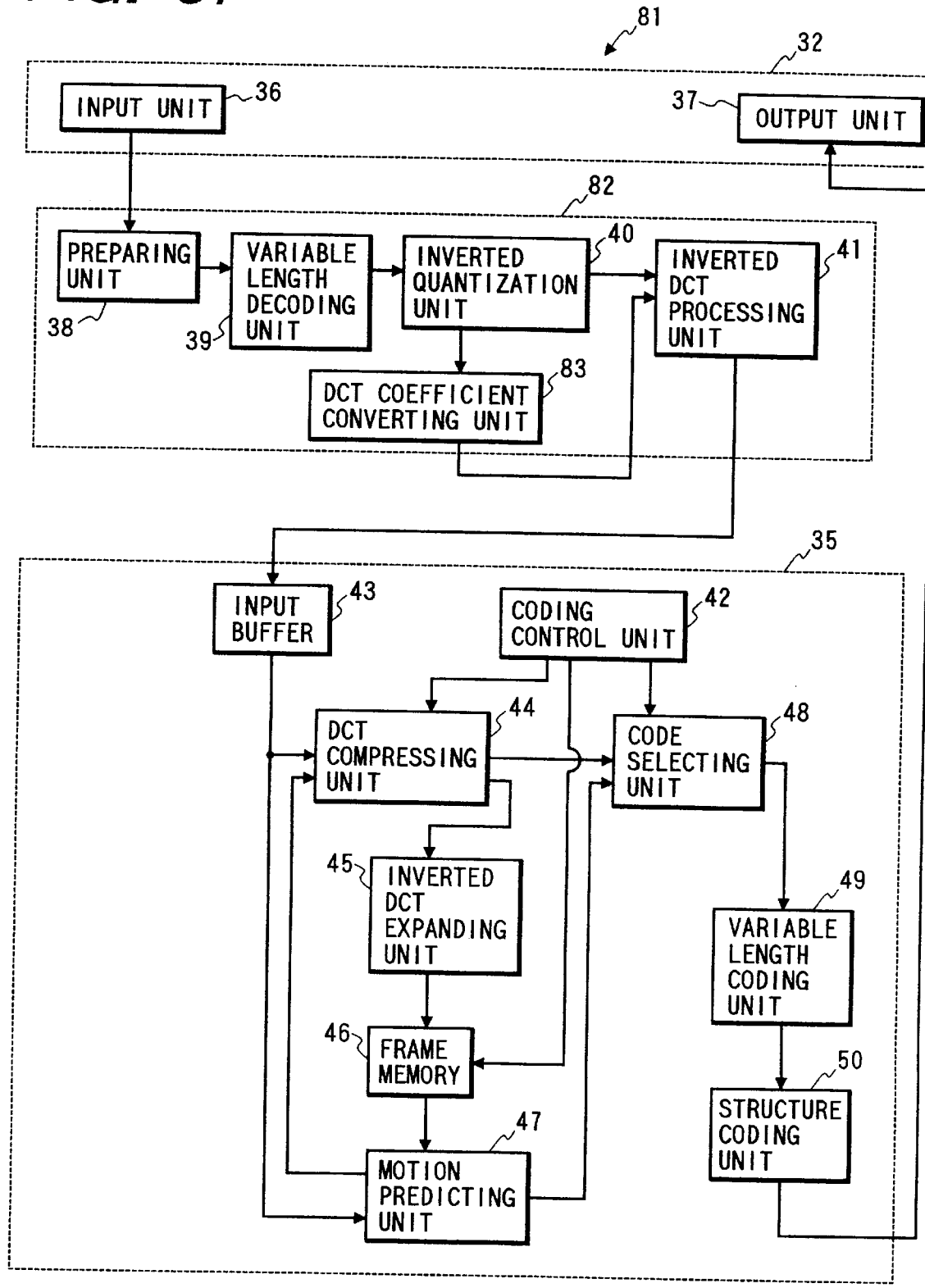
FIG. 37 is a block diagram of a picture signal converting apparatus according to a seventh embodiment.

FIG. 37 is a block diagram of a picture signal converting apparatus according to a sixth embodiment.

As shown in FIG. 37, a picture signal converting apparatus 81 comprises
the input-output unit 32,
a picture signal decoding unit 82 for decoding the compressed picture signals of the DVC format received in the input-output unit 32 to produce non-compressed 4:2:0 type component picture signals, and
the picture signal coding unit 35.

The picture signal decoding unit 82 comprises the preparing unit 38, the variable length decoding unit 39, the inverted quantization unit 40,
a DCT coefficient converting unit 83 for extracting DCT coefficients of 4:1:1 type color difference signals from the DCT coefficients of 4:1:1 type component picture signals obtained in the inverted quantization unit 40 and converting the DCT coefficients of 4:1:1 type color difference signals to DCT coefficients of 4:2:0 type color difference signals by changing the arrangement of the DCT coefficients of 4:1:1 type color difference signals, and
an inverted DCT processing unit 84 for performing an inverted DCT processing for the DCT coefficients of luminance signals obtained in the inverted quantization unit 40 and the DCT coefficients of 4:2:0 type color difference signals obtained in the DCT coefficient converting unit 83 to produce the non-compressed 4:2:0 type component picture signals.

In the above configuration, an operation of the picture signal converting apparatus 81 is described.

In this apparatus 81, because lower frequency components placed on an upper left side in a block of DCT coefficients of color difference signals indicates color difference information, a half portion of the DCT coefficients of 4:1:1 type color difference signals placed on a lower side (or higher frequency side) is removed to halve a resolution of the DCT coefficients in a y direction (or longitudinal direction), and a plurality of specific DCT coefficients set to 0 are added on a right side (or higher frequency side) of the remaining DCT coefficients to double a resolution of the DCT coefficients in an x direction (or lateral direction). Therefore, DCT coefficients of 4:2:0 type color difference signals are obtained from the DCT coefficients of 4:1:1 type color difference signals in the DCT coefficient converting unit 83, and non-compressed 4:2:0 type component picture signals are produced from the DCT coefficients of 4:2:0 type color difference signals.

FIG. 38 is a flow chart showing the whole processing performed in the apparatus 81.

In a step S401, the compressed picture signals of the DVC format received in the input-output unit 32 is decoded and inversely quantized to DCT coefficients of 4:1:1 type color difference signals in the picture signal decoding unit 82, and non-compressed 4:2:0 type component picture signals are produced by converting the DCT coefficients of 4:1:1 type color difference signals into DCT coefficients of 4:2:0 type color difference signals and performing an inverted DCT processing for the DCT coefficients of 4:2:0 type color difference signals. Thereafter, in the step S303, the non-compressed 4:2:0 type component picture signals are coded to digital picture signals compressed in the MPEG1 format or MPEG2 format.

FIG. 39 is a flow chart showing a picture decoding processing (step S401) performed in the picture signal decoding unit 82.

As shown in FIG. 39, after the steps S311, S312 and S313 are performed in the same manner as in the third embodiment, the procedure proceeds to a step S411. In the step S411, a DCT coefficient converting processing is performed in the DCT coefficient converting unit 83 for DCT coefficients of 4:1:1 type color difference signals obtained in the inverted quantization unit 40, so that DCT coefficients of 4:2:0 type color difference signals, in which a resolution in the y direction is halved and a resolution in the x direction is doubled as compared with those in the DCT coefficients of 4:1:1 type color difference signals, are produced.

In a step S412, an inverted DCT processing is performed in the inverted DCT processing unit 84 for the DCT coefficients of 4:2:0 type color difference signals obtained in the DCT coefficient converting unit 83 and DCT coefficients of luminance signals obtained in the inverted quantization unit 40. Therefore, values of non-compressed 4:2:0 type color differential signals are obtained from the DCT coefficients of 4:2:0 type color difference signals, and values of non-compressed luminance signals are obtained from the DCT coefficients of luminance signals. The values of the non-compressed 4:2:0 type color differential signals and the values of the non-compressed luminance signals are transmitted to the input buffer 43 as values of non-compressed 4:2:0 type component picture signals.

The DCT coefficient converting processing is described in detail. FIG. 40 shows a component type conversion from 4:1:1 type to 4:2:0 type in the DCT coefficient converting processing and the inverted DCT processing for DCT coefficients of 4:2:0 type color difference signals.

As shown in FIG. 40, a DCT block of 4:1:1 type color difference signals is composed of 8*8 DCT coefficients of 8*8 color difference signals. Because color difference information of color difference signals is mainly included in lower frequency components placed on an upper left side of the DCT block, a group of 8*4 DCT coefficients placed on the upper side of the DCT block is extracted from the DCT block to halve a resolution of DCT coefficients in the y direction, and 8*4 DCT coefficients of which values are set to 0 are added on the right side of the group of 8*4 DCT coefficients to produce a deformed DCT block of 16*4 DCT coefficients. Therefore, a resolution of DCT coefficients in the x direction is doubled in the deformed DCT block. Thereafter, when the inverted DCT processing is performed for the deformed DCT block of 16*4 DCT coefficients, values of 16*4 non-compressed color difference signals are obtained as 4:2:0 type color difference signals.

Accordingly, because a group of DCT coefficients of 4:1:1 type color difference signals is converted into a group of DCT coefficients of 4:2:0 type color difference signals, even though the color component signal converting unit 34 used in the third to fifth embodiments is not used, the digital picture signals compressed in the DVC format can be converted to the digital picture signals compressed in the MPEG1 format or MPEG2 format.

Also, when a component type conversion from 4:1:1 type to 4:2:0 type is performed in the DCT coefficient converting processing, because color difference information of color difference signals is mainly included in lower frequency components of the DCT block and a group of 8*4 DCT coefficients placed on the upper side of the DCT block is extracted from the DCT block of 8*8 DCT coefficients, color difference information included in the 8*8 DCT coefficients can be almost included in the group of 8*4 DCT coefficients. Therefore, the change of colors in a picture reproduced from the 4:2:0 type component picture signals is smooth, the colors are not changed unnaturally, and a picture having a high color quality can be reproduced.

Also, because the right half portion of the deformed DCT block of 16*4 DCT coefficients has no relation to color difference information, even though 8*4 DCT coefficients set to 0 are added on the right side of the group of 8*4 DCT coefficients to produce the deformed DCT block of 16*4 DCT coefficients, an adverse influence of the 8*4 DCT coefficients set to 0 on a reproduced picture is inconspicuous, and any viewer does not feel an unnatural color change in a reproduced picture.

Figure 41:
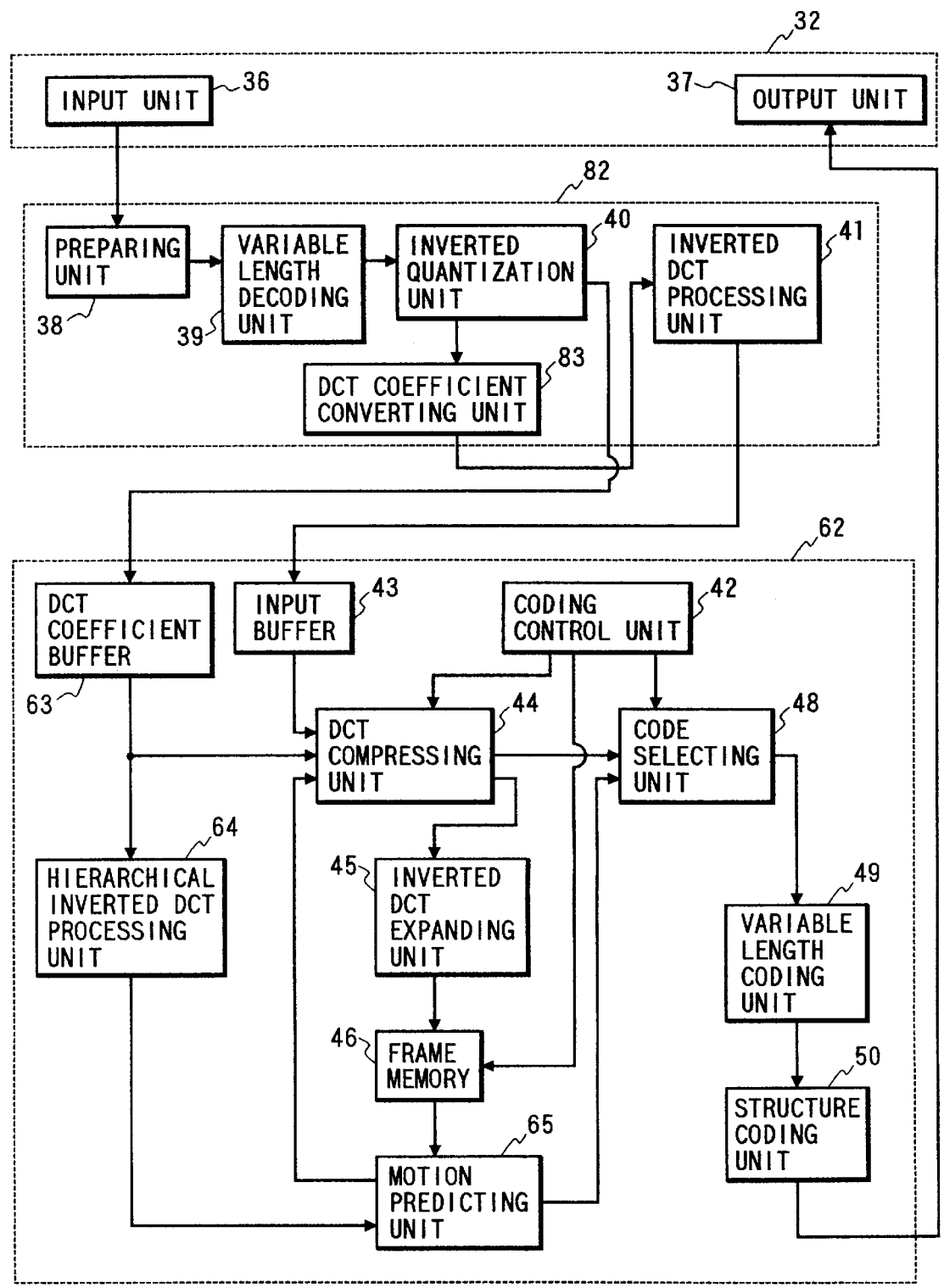
FIG. 41 is a block diagram of a picture signal converting apparatus according to a modification of the seventh embodiment.
Figure 42:
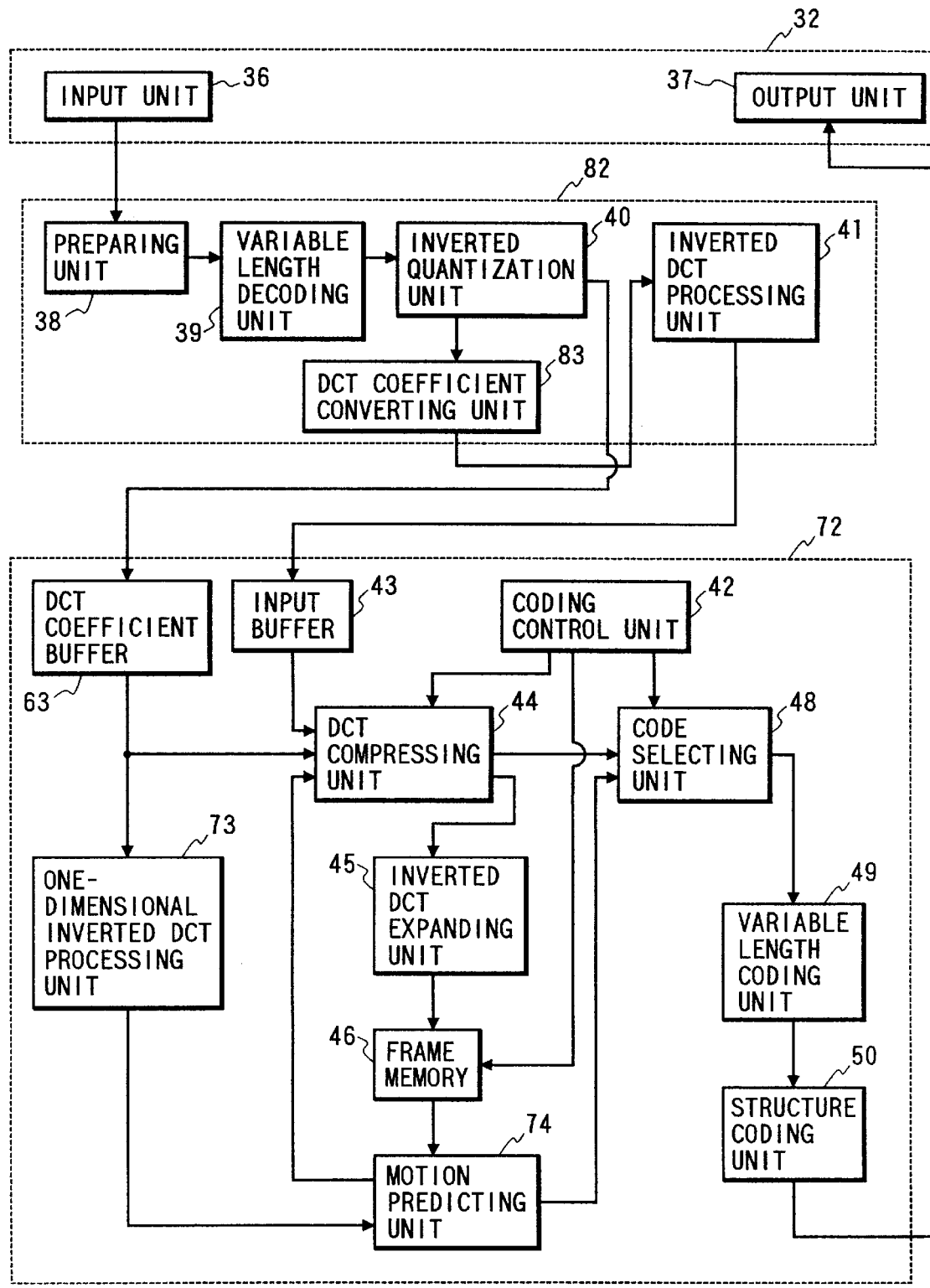
FIG. 42 is a block diagram of a picture signal converting apparatus according to another modification of the seventh embodiment.

In this embodiment, the picture coding unit 35 is the same as that in the third embodiment. However, it is applicable that the picture coding unit 62 used in the fourth embodiment be used in place of the picture coding unit 35 (refer to FIG. 41) or the picture coding unit 72 used in the fifth embodiment be used in place of the picture coding unit 35 (refer to FIG. 42).

Seventh Embodiment

In this embodiment, a multi-format picture providing client-server system, in which a digital picture signal compressed in a particular format (such as a DVC format, an MPEG1 format or an MPEG2 format) requested by a client is provided for the client, is described.

Figure 43:
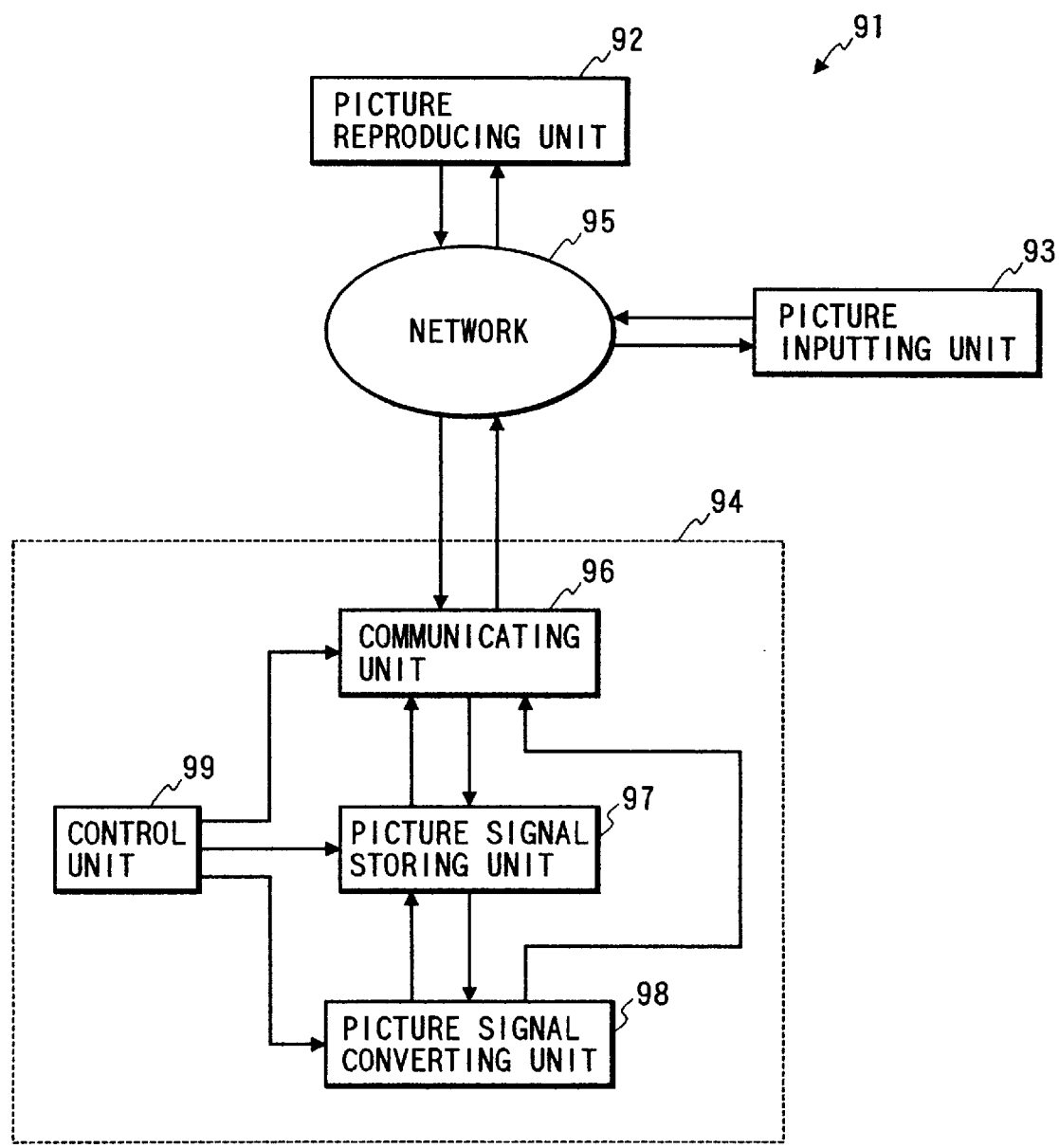
FIG. 43 is a block diagram of a multi-format picture providing system according to a sixth embodiment.

FIG. 43 is a block diagram of a multi-format picture providing system according to a seventh embodiment.

As shown in FIG. 43, a multi-format picture providing system 81 comprises
a picture reproducing terminal 92 made of a client computer for outputting a picture output request indicating the reception of a plurality of digital picture signals compressed in a particular format such as a DVC format, an MPEG1 format or an MPEG2 format, receiving the digital picture signals compressed in the particular format and reproducing a digital picture according to the digital picture signals,
a picture inputting unit 93 for receiving a plurality of digital picture signals compressed in the CVC format, outputting a picture input request indicating the output of digital picture signals compressed in the CVC format and outputting the digital picture signals compressed in the CVC format,
a picture providing unit 94 of a server for receiving the digital picture signals compressed in the CVC format from the picture inputting unit 93 when the picture input request is received and outputting the digital picture signals compressed in the particular format to the picture reproducing terminal 92 when the picture output request is received, and
a network 95 for connecting the picture reproducing terminal 92, the picture inputting unit 93 and the picture providing unit 94 by transmitting information such as the picture output request, the digital picture signals of the particular format, the picture input request and the digital picture signals of the particular format.

The picture providing unit 94 comprises
a communicating unit 96 for communicating with the picture reproducing terminal 92 and the picture inputting unit 93 through the network 95,
a picture signal storing unit 97 for storing the digital picture signals of the CVC format received through the communicating unit 96 and storing the digital picture signals compressed in the particular format,
a picture signal converting unit 98, realized by the picture signal converting apparatus 31, 61, 71 or 81, for converting the CVC format of the picture signals stored in the picture signal storing unit 97 to the particular format requested by the picture reproducing terminal 92 through the communicating unit 96, and
a control unit 99 for controlling the operations performed in the communicating unit 96, the picture signal storing unit 97 and the picture signal converting unit 98.

In the above configuration, an operation of the multi-format picture providing system 91 is described with reference to FIGS. 44A, 44B, 45A and 45B.

Figure 44A:
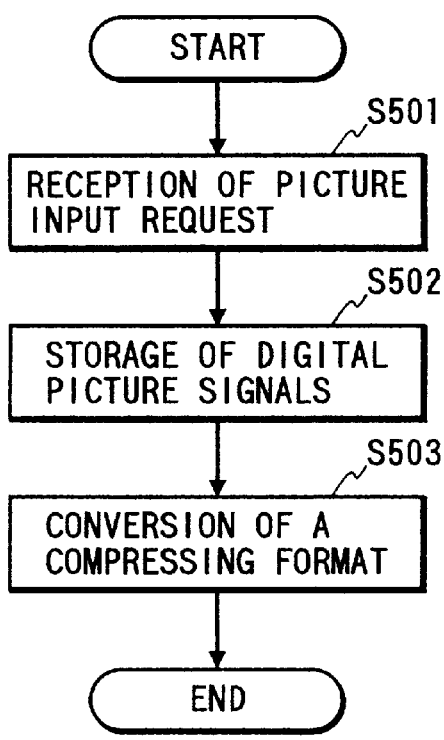
FIG. 44A is a flow chart showing a picture inputting processing performed in a picture providing unit shown in FIG. 43.
Figure 44B:
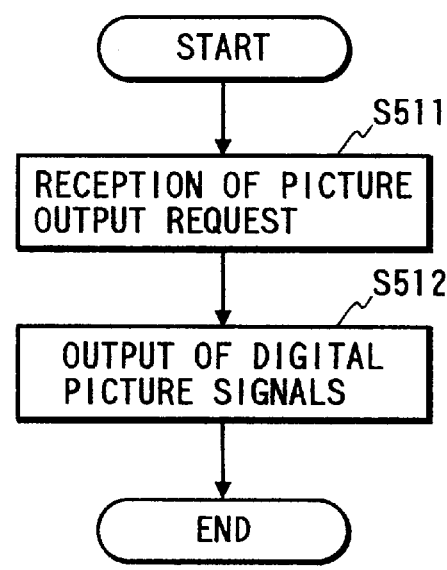
FIG. 44B is a flow chart showing a picture outputting processing performed in the picture providing unit.
Figure 45A:
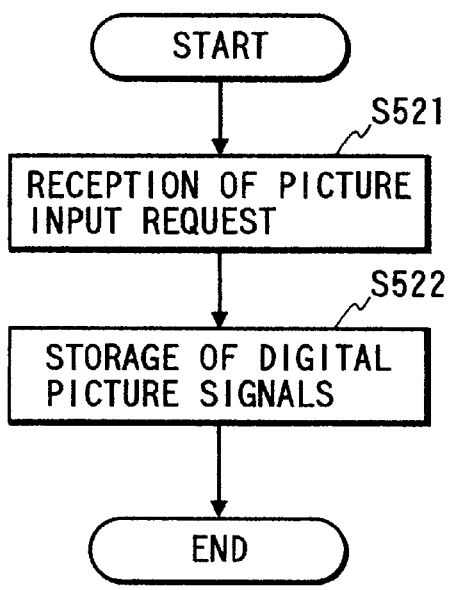
FIG. 45A is a flow chart showing another picture inputting processing performed in the picture providing unit in cases where a picture signal converting processing is performed at a speed higher than a real time speed.
Figure 45B:
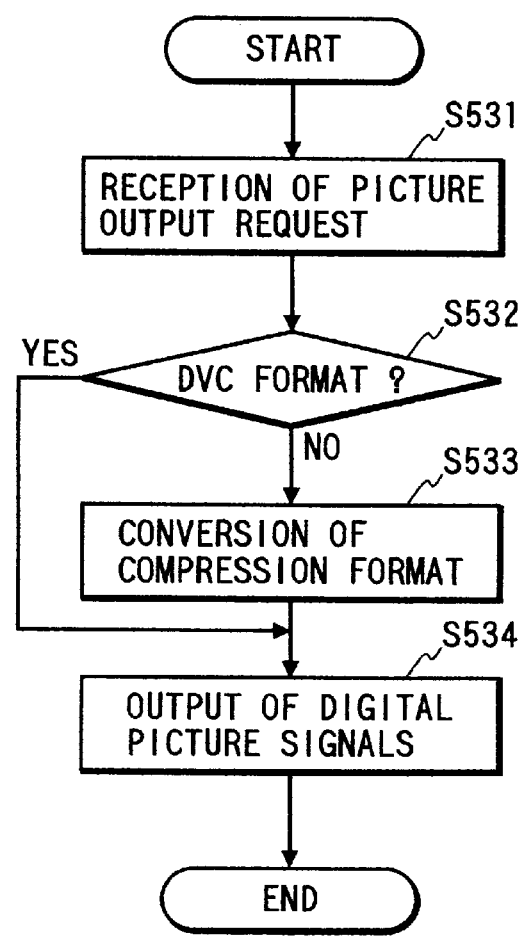
FIG. 45B is a flow chart showing another picture outputting processing performed in the picture providing unit in cases where a picture signal converting processing is performed at a speed higher than a real time speed.

FIG. 44A is a flow chart showing a picture inputting processing performed in the picture providing unit 94, FIG. 44B is a flow chart showing a picture outputting processing performed in the picture providing unit 94, FIG. 45A is a flow chart showing a picture inputting processing performed in the picture providing unit 94 in cases where a picture signal converting processing is performed at a speed higher than a real time speed, and FIG. 45B is a flow chart showing a picture outputting processing performed in the picture providing unit 94 in cases where a picture signal converting processing is performed at a speed higher than a real time speed.

A picture inputting processing is described. As shown in FIG. 44A, in a step S501, when the control unit 99 receives a picture input request from the picture input unit 93 through the communicating unit 96, the control unit 99 transmits an input enabling signal to the picture input unit 93. In a step S502, a plurality of digital picture signals compressed in the DVC format input from the picture input unit 93 through the communicating unit 96 are stored in the picture signal storing unit 97. In a step S503, the control unit 99 instructs the picture signal converting unit 98 to convert a compression format of the digital picture signals, and the picture signal converting unit 98 reads out the digital pictures stored in the picture signal storing unit 97 and converts the DVC format of the signals into the MPEG1 format and the MPEG2 format. Thereafter, the digital picture signals compressed in the MPEG1 format and the digital picture signals compressed in the MPEG2 format are stored in the picture signal storing unit 97. Therefore, the digital picture signals compressed in the DVC format, the digital picture signals compressed in the MPEG1 format and the digital picture signals compressed in the MPEG2 format are stored in the picture signal storing unit 97.

A picture outputting processing is described. As shown in FIG. 44B, in a step S511, when the control unit 99 receives a picture output request from the picture reproducing terminal 92 through the communicating unit 96, the control unit 99 transmits an output enabling signal to the picture reproducing terminal 92. In a step S512, the digital picture signals compressed in a particular format (for example, the DVC format, the MPEG1 format or the MPEG2 format), which is indicated by the picture output request, are read out from the picture storing unit 97 and are output to the picture reproducing terminal 92 through the communicating unit 96.

Accordingly, even though digital picture signals compressed in a specific format such as the DVC format are input to the picture providing unit 94 and the picture reproducing terminal 92 requests digital picture signals compressed in a particular format from the picture providing unit 94, because the picture signal converting unit 98 converts the digital picture signals compressed in the specific format into the digital picture signals compressed in the particular format, the picture providing unit 94 can provide the digital picture signals compressed in the particular format for the picture reproducing terminal 92.

Also, in cases where a picture signal converting processing is performed at a speed higher than a real time speed, a picture inputting processing shown in FIG. 45A is described.

In a step S521, when the control unit 99 receives a picture input request from the picture input unit 93 through the communicating unit 96, the control unit 99 transmits an input enabling signal to the picture input unit 93. In a step S522, a plurality of digital picture signals compressed in the DVC format are input from the picture input unit 93 through the communicating unit 96 and are stored in the picture signal storing unit 97. Thereafter, a picture outputting processing shown in FIG. 45B is performed as follows.

In a step S531, when the control unit 99 receives a picture output request from the picture reproducing terminal 92 through the communicating unit 96, the control unit 99 transmits an output enabling signal to the picture reproducing terminal 92. In a step S532, it is judged in the control unit 99 whether or not a particular compression format indicated by the picture output request is the DVC format. In cases where the particular compression format indicated by the picture output request is the DVC format, the digital picture signals stored in the picture signal storing unit 97 are output to the picture reproducing unit 92 through the communicating unit 96 in a step S534. Also, in cases where the particular compression format indicated by the picture output request is not the DVC format, the procedure proceeds to a step S533. In the step S533, the control unit 99 instructs the picture signal converting unit 98 to convert a compression format of the digital picture signals into the particular compression format, and the picture signal converting unit 98 reads out the digital pictures stored in the picture signal storing unit 97 and converts the DVC format of the signals into the particular format such as the MPEG1 format or the MPEG2 format. Thereafter, the digital picture signals compressed in the particular compression format are output to the picture reproducing unit 92 in the step S534.

Accordingly, even though a compression format of the digital picture signals stored in the picture storing unit 97 is not the particular compression format indicated by the picture output request, because a compression format of the digital picture signals stored in the picture storing unit 97 is converted into the particular compression format at a real time in the picture signal converting unit 98, the digital picture signals, of which a compression format is the particular compression format indicated by the picture output request, can be immediately output to the picture reproducing terminal 92.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A picture signal converting apparatus comprising:
receiving means for receiving a digital picture signal of a 4:1:1 color component type for each of pixels of a frame, the digital picture signals being arranged in a matrix of rows and columns;
color difference signal converting means for directly converting color difference signals of the digital picture signals received by the receiving means into converted color difference signals of converted digital picture signals of a 4:2:0 color component type by removing color difference signals on every other row from the color difference signals of the digital picture signals to halve the number of color difference signals in a y direction, adding a color difference signal to a position between each pair of color difference signals adjacent to each other in an x direction to double the number of color difference signals in the x direction and setting the color difference signals, of which the number is halved in the y direction and is doubled in the x direction, as the converted color difference signals of the 4:2:0 color component type, and setting values of the converted color difference signals of the 4:2:0 color component type according to values of the color difference signals of the digital picture signals received by the receiving means; and
outputting means for combining luminance signals of the digital picture signals received by the receiving means and the converted color difference signals of the converted digital picture signals of the 4:2:0 color component type obtained by the color difference signal converting means for each pixel of the frame to produce digital picture signals of the 4:2:0 color component type and outputting the digital picture signals of the 4:2:0 color component type.

2. A picture signal converting apparatus according to claim 1 in which the color difference signals of the digital picture signals of the 4:1:1 color component type received by the receiving means are placed at co-ordinates (x,y) of an X-Y co-ordinate system, the color difference signal converting means comprises:
y-directional signal halving means for removing color difference signals on every other row from the color difference signals of the digital picture signals to halve the number of color difference signals in the y direction; and x-directional signal doubling means for adding a color difference signal to a position between each pair of color difference signals which are obtained by the y-directional signal halving means and are adjacent to each other in an X direction, setting a value of one added color difference signal to a value of one color difference signal adjacent to the added color difference signal in the x direction for each added color difference signal to double the number of color difference signals obtained by the y-directional signal halving means in the x direction and outputting the color difference signals as the converted color difference signals of the 4:2:0 color component type.

3. A picture signal converting apparatus according to claim 1 in which the color difference signals of the digital picture signals of the 4:1:1 color component type received by the receiving means are placed at co-ordinates (x,y) of an X-Y co-ordinate system, the color difference signal converting means comprises:

signal value setting means for setting values of two color difference signals of co-ordinates (x,2y) and (x,2y+1) (or (x,2y+1) and (x,2y+2)) adjacent to each other in the y direction to an average of values of the color difference signals of the co-ordinates (x,2y) and (x,2y+1) (or (x,2y+1) and (x,2y+2)) for each pair of color difference signals of co-ordinates (x,2y) and (x,2y+1) (or (x,2y+1) and (x,2y+2));

y-directional signal halving means for removing color difference signals on every other row from the color difference signals, of which the values are set by the signal value setting means, to halve the number of color difference signals in the y direction; and x-directional signal doubling means for adding a color difference signal to a position between each pair of color difference signals which are obtained by the y-directional signal halving means and are adjacent to each other in an X direction, setting a value of one added color difference signal to a value of a color difference signal adjacent to the added color difference signal in the x direction for each added color difference signal to double the number of color difference signals obtained by the y-directional signal halving means in the x direction and outputting the color difference signals as the converted color difference signals of the 4:2:0 color component type.

4. A picture signal converting apparatus according to claim 1 in which the color difference signals of the digital picture signals of the 4:1:1 color component type received by the receiving means are placed at co-ordinates (x,y) of an X-Y co-ordinate system, the color difference signal converting means comprises:

signal value setting means for setting values of two color difference signals of co-ordinates (x,2y) and (x,2y+1) (or (x,2y+1) and (x,2y+2)) adjacent to each other in the y direction to an average of values of the color difference signals of the co-ordinates (x,2y) and (x,2y+1) (or (x,2y+1) and (x,2y+2)) for each pair of color difference signals of co-ordinates (x,2y) and (x,2y+1) (or (x,2y+1) and (x,2y+2));

y-directional signal halving means for removing color difference signals on every other row from the color difference signals, of which the values are set by the signal value setting means, to halve the number of color difference signals in the y direction; and x-directional signal doubling means for adding a color difference signal to a position between each pair of color difference signals which are obtained by the y-directional signal halving means and are adjacent to each other in an X direction, setting a value of one added color difference signal to an interpolated value of the values of the color difference signals placed on both sides of the added color difference signal in the x direction for each added color difference signal to double the number of color difference signals obtained by the y-directional signal halving means in the x direction and outputting the color difference signals as the converted color difference signals of the 4:2:0 color component type.

5. A picture signal converting apparatus according to claim 4 in which the interpolated value of the values of the color difference signals set by the x-directional signal doubling means is an average of the values of the color difference signals.

6. A picture signal converting apparatus according to claim 1 in which the color difference signals of the digital picture signals of the 4:1:1 color component type received by the receiving means are placed at co-ordinates (x,y) of an X-Y co-ordinate system, the color difference signal converting means comprises:

average value calculating means for calculating a first average of values of two color difference signals placed at co-ordinates (x,2y) and (x,2y+1) (or (x,2y+1) and (x,2y+2)) adjacent to each other in the y direction and a second average of values of two color difference signals placed at co-ordinates (x+1,2y) and (x+1,2y+1) (or (x+1,2y+1) and (x+1,2y+2)) adjacent to each other in the y direction for each group of color difference signals of the co-ordinates (x,2y), (x,2y+1), (x+1,2y) and (x+1,2y+1) (or (x,2y+1), (x,2y+2), (x+1,2y+1) and (x+1,2y+2));

interpolated value calculating means for calculating a first interpolated value obtained by weighting the first and second averages calculated by the average value calculating means at a first weighting ratio and a second interpolated value obtained by weighting the first and second averages at a second weighting ratio for each pair of first and second averages;

signal value setting means for setting the first interpolated value calculated by the interpolated value calculating means as values of the color difference signals of the co-ordinates (x,2y) and (x,2y+1) (or (x,2y+1) and (x,2y+2));

y-directional signal halving means for removing color difference signals on every other row from the color difference signals, of which the values are set by the signal value setting means, to halve the number of color difference signals in the y direction; and x-directional signal doubling means for adding a color difference signal to a position between each pair of color difference signals adjacent to each other in an X direction, setting a value of one added color difference signal to the second interpolated value calculated by the interpolated value calculating means for each added color difference signal to double the number of color difference signals obtained by the y-directional signal halving means in the x direction and outputting the color difference signals as the converted color difference signals of the 4:2:0 color component type.

7. A picture signal converting apparatus according to claim 1, further comprising:

luminance signal storing means for storing a plurality of luminance signals of the digital picture signals received by the receiving means, pixels of the luminance signals being placed at co-ordinates (x,y) of an X-Y luminance co-ordinate system; and referential luminance signal extracting means for extracting a plurality of luminance signals corresponding to the color difference signals directly converted by the color difference signal converting means from the luminance signal storing means as a plurality of referential luminance signals, values of the converted color difference signals obtained by the color difference signal converting means being determined according to values of the referential luminance signals.

8. A picture signal converting apparatus according to claim 6 in which the color difference signals of the digital picture signals of the 4:1:1 color component type received by the receiving means are placed at co-ordinates (x,y) of an X-Y co-ordinate system, the color difference signal converting means comprises:

average value calculating means for calculating an average of values of two color difference signals placed at co-ordinates (x,2y) and (x,2y+1) adjacent to each other in the y direction for each pair of color difference signals;

weighting factor calculating means for obtaining the referential luminance signals extracted by the referential luminance signal extracting means as first referential luminance signals on condition that the first referential luminance signals correspond to the color difference signals of co-ordinates (x,2y) and (x+1,2y), calculating a first weighting factor and a second weighting factor from values of the first referential luminance signals, obtaining the referential luminance signals extracted by the referential luminance signal extracting means as second referential luminance signals on condition that the second referential luminance signals correspond to the color difference signals of co-ordinates (x,2y+1) and (x+1,2y+1) and calculating a third weighting factor and a fourth weighting factor from values of the second referential luminance signals;

interpolated value calculating means for calculating a first multiplied value by multiplying the value of the color difference signal of the co-ordinates (x,2y) by the first weighting factor obtained by the weighting factor calculating means, calculating a second multiplied value by multiplying the value of the color difference signal of the co-ordinates (x+1,2y) by the second weighting factor obtained by the weighting factor calculating means, calculating a third multiplied value by multiplying the value of the color difference signal of the co-ordinates (x,2y+1) by the third weighting factor obtained by the weighting factor calculating means, calculating a fourth multiplied value by multiplying the value of the color difference signal of the co-ordinates (x+1,2y+1) by the fourth weighting factor obtained by the weighting factor calculating means and calculating an interpolated value from the first, second, third and fourth multiplied values;

signal value setting means for setting each average calculated by the average value calculating means as values of the color difference signals of the co-ordinates (x,2y) and (x,2y+1);

y-directional signal halving means for removing color difference signals on every other row from the color difference signals, of which the values are set by the signal value setting means, to halve the number of color difference signals in the y direction; and x-directional signal doubling means for adding a color difference signal to a position between each pair of color difference signals adjacent to each other in an X direction, setting a value of one added color difference signal to the interpolated value calculated by the interpolated value calculating means for each added color difference signal to double the number of color difference signals obtained by the y-directional signal halving means in the x direction and outputting the color difference signals as the converted color difference signals of the 4:2:0 color component type.

9. A picture signal converting apparatus according to claim 6 in which the color difference signals of the digital picture signals of the 4:1:1 color component type received by the receiving means are placed at co-ordinates (x,y) of an X-Y co-ordinate system, the color difference signal converting means comprises:

weighting factor calculating means for obtaining the referential luminance signals extracted by the referential luminance signal extracting means as first referential luminance signals on condition that the first referential luminance signals correspond to the color difference signals of co-ordinates (x,2y) and (x+1,2y), calculating a first weighting factor, a second weighting factor, a third weighting factor and a fourth weighting factor from values of the first referential luminance signals, obtaining the referential luminance signals extracted by the referential luminance signal extracting means as second referential luminance signals on condition that the second referential luminance signals correspond to the color difference signals of co-ordinates (x,2y+1) and (x+1,2y+1) and calculating a fifth weighting factor and a sixth weighting factor, a seventh weighting factor and an eighth weighting factor from values of the second referential luminance signals;

interpolated value calculating means for calculating a first multiplied value by multiplying the value of the color difference signal of the co-ordinates (x,2y) by the first weighting factor obtained by the weighting factor calculating means, calculating a second multiplied value by multiplying the value of the color difference signal of the co-ordinates (x+1,2y) by the second weighting factor obtained by the weighting factor calculating means, calculating a third multiplied value by multiplying the value of the color difference signal of the co-ordinates (x,2y+1) by the fifth weighting factor obtained by the weighting factor calculating means, calculating a fourth multiplied value by multiplying the value of the color difference signal of the co-ordinates (x+1,2y+1) by the sixth weighting factor obtained by the weighting factor calculating means, calculating a first interpolated value from the first, second, third and fourth multiplied values, calculating a fifth multiplied value by multiplying the value of the color difference signal of the co-ordinates (x,2y) by the third weighting factor obtained by the weighting factor calculating means, calculating a sixth multiplied value by multiplying the value of the color difference signal of the co-ordinates (x+1,2y) by the fourth weighting factor obtained by the weighting factor calculating means, calculating a seventh multiplied value by multiplying the value of the color difference signal of the co-ordinates (x,2y+1) by the seventh weighting factor obtained by the weighting factor calculating means, calculating an eighth multiplied value by multiplying the value of the color difference signal of the co-ordinates (x+1,2y+1) by the eighth weighting factor obtained by the weighting factor calculating means, calculating a second interpolated value from the fifth, sixth, seventh and eighth multiplied values;

signal value setting means for setting the first interpolated value calculated by the interpolated value calculating means as values of the color difference signals of the co-ordinates (x,2y) and (x,2y+1);

y-directional signal halving means for removing color difference signals on every other row from the color difference signals, of which the values are set by the signal value setting means, to halve the number of color difference signals in the y direction; and x-directional signal doubling means for adding a color difference signal to a position between each pair of color difference signals which are obtained by the y-directional signal halving means and are adjacent to each other in an X direction, setting a value of one added color difference signal to the second interpolated value calculated by the interpolated value calculating means for each added color difference signal to double the number color difference signals obtained by the y-directional signal halving means in the x direction and outputting the color difference signals as the converted color difference signals of the 4:2:0 color component type.

10. A picture signal converting method, comprising the steps of:

receiving a digital picture signal of a 4:1:1 color component type for each of pixels of a frame;

extracting color difference signals placed at co-ordinates (x,y) of an X-Y co-ordinate system (x=0,1,2,3, - - -, and y=0,1,2,3, - - - ) from the digital picture signals;

halving the number of color difference signals in a y direction by removing color difference signals placed at co-ordinates (x,2y) of even-numbered y values or co-ordinates (x,2y+1) of odd-numbered y values;

doubling the number of color difference signals in an x direction by adding a color difference signal to a position between each pair of color difference signals adjacent to each other in the X direction;

setting a value of one added color difference signal to a value of one color difference signal adjacent to the added color difference signal in the x direction for each added color difference signal to produce converted color difference signals of a 4:2:0 color component type from the color difference signals in which the number of converted color difference signals is halved in the y direction as compared with the number of color difference signals and the number of converted color difference signal is doubled in the x direction as compared with the number of color difference signals;

combining the converted color difference signals and luminance signals of the digital picture signals to produce digital picture signals of the 4:2:0 color component type; and outputting the digital picture signals of the 4:2:0 color component type.

11. A picture signal converting method, comprising the steps of:

receiving a digital picture signal of a 4:1:1 color component type for each of pixels of a frame;

extracting color difference signals placed at co-ordinates (x,y) of an X-Y co-ordinate system (x=0,1,2,3, - - -, and y=0,1,2,3, - - - ) from the digital picture signals;

calculating an average of values of two color difference signals of co-ordinates (x,2y) and (x,2y+1) (or (x,2y+1) and (x,2y+2)) adjacent to each other in a y direction for each pair of color difference signals;

setting each average as values of the color difference signals of the co-ordinates (x,2y) and (x,2y+1) (or (x,2y+1) and (x,2y+2));

halving the number of color difference signals in the y direction by removing color difference signals placed at co-ordinates (x,2y) of even-numbered y values or co-ordinates (x,2y+1) of odd-numbered y values;

doubling the number of color difference signals in an x direction by adding a color difference signal to a position between each pair of color difference signals adjacent to each other in the X direction;

setting a value of one added color difference signal to a value of one color difference signal adjacent to the added color difference signal in the x direction for each added color difference signal to produce converted color difference signals of a 4:2:0 color component type from the color difference signals in which the number of converted color difference signals is halved in the y direction as compared with the number of color difference signals and the number of converted color difference signal is doubled in the x direction as compared with the number of color difference signals;

combining the converted color difference signals and luminance signals of the digital picture signals to produce digital picture signals of the 4:2:0 color component type; and outputting the digital picture signals of the 4:2:0 color component type.

12. A picture signal converting method, comprising the steps of:

receiving a digital picture signal of a 4:1:1 color component type for each of pixels of a frame;

extracting color difference signals placed at co-ordinates (x,y) of an X-Y co-ordinate system (x=0,1,2,3, - - -, and y=0,1,2,3, - - - ) from the digital picture signals;

calculating an average of values of two color difference signals of co-ordinates (x,2y) and (x,2y+1) (or (x,2y+1) and (x,2y+2)) adjacent to each other in a y direction for each pair of color difference signals;

setting each average as values of the color difference signals of the co-ordinates (x,2y) and (x,2y+1) (or (x,2y+1) and (x,2y+2));

halving the number of color difference signals in the y direction by removing color difference signals placed at co-ordinates (x,2y) of even-numbered y values or co-ordinates (x,2y+1) of odd-numbered y values;

adding a color difference signal to a position between each pair of color difference signals adjacent to each other in an X direction to double the number of color difference signals in the x direction;

setting a value of one added color difference signal to an interpolated value of the values of the color difference signals placed on both sides of the added color difference signal in the x direction for each added color difference signal to produce converted color difference signals of a 4:2:0 color component type from the color difference signals in which the number of converted color difference signals is halved in the y direction as compared with the number of color difference signals and the number of converted color difference signal is doubled in the x direction as compared with the number of color difference signals;

combining the converted color difference signals and luminance signals of the digital picture signals to produce digital picture signals of the 4:2:0 color component type; and outputting the digital picture signals of the 4:2:0 color component type.

13. A picture signal converting method, comprising the steps of:

receiving a digital picture signal of a 4:1:1 color component type for each of pixels of a frame;

extracting color difference signals placed at co-ordinates (x,y) of an X-Y co-ordinate system (x=0,1,2,3, - - - , and y=0,1,2,3, - - - ) from the digital picture signals;

calculating a first average of values of two color difference signals of co-ordinates (x,2y) and (x,2y+1) (or (x,2y+1) and (x,2y+2)) adjacent to each other in a y direction and a second average of values of two color difference signals of co-ordinates (x+1,2y) and (x+1,2y+1) (or (x+1,2y+1) and (x+1,2y+2)) adjacent to each other in the y direction for each group of color difference signals of the co-ordinates (x,2y), (x,2y+1), (x+1,2y) and (x+1,2y+1) (or (x,2y+1), (x,2y+2), (x+1,2y+1) and (x+1,2y+2));

calculating a first interpolated value obtained by weighting the first and second averages at a first weighting ratio and a second interpolated value obtained by weighting the first and second averages at a second weighting ratio for each pair of first and second averages;

setting the first interpolated value as values of the color difference signals of the co-ordinates (x,2y) and (x,2y+1) (or (x,2y+1) and (x,2y+2));

halving the number of color difference signals in the y direction by removing color difference signals placed at co-ordinates (x,2y) of even-numbered y values or co-ordinates (x,2y+1) of odd-numbered y values;

adding a color difference signal to a position between each pair of color difference signals adjacent to each other in an X direction to double the number of color difference signals in the x direction;

setting a value of one added color difference signal to the second interpolated value for each added color difference signal to produce converted color difference signals of a 4:2:0 color component type from the color difference signals in which the number of converted color difference signals is halved in the y direction as compared with the number of color difference signals and the number of converted color difference signal is doubled in the x direction as compared with the number of color difference signals;

combining the converted color difference signals and luminance signals of the digital picture signals to produce digital picture signals of the 4:2:0 color component type; and outputting the digital picture signals of the 4:2:0 color component type.

14. A picture signal converting method, comprising the steps of:

receiving a digital picture signal of a 4:1:1 color component type for each of pixels of a frame;

extracting color difference signals placed at co-ordinates (x,y) of an X-Y co-ordinate system (x=0,1,2,3, - - - , and y=0,1,2,3, - - - ) from the digital picture signals;

calculating an average of values of two color difference signals of co-ordinates (x,2y) and (x,2y+1) adjacent to each other in the y direction for each pair of color difference signals;

extracting luminance signals placed at co-ordinates (x,y) of an X-Y luminance co-ordinate system from the digital picture signals as first referential luminance signals on condition that the first referential luminance signals correspond to the color difference signals of co-ordinates (x,2y) and (x+1,2y);

calculating a first weighting factor and a second weighting factor from values of the first referential luminance signals;

extracting other luminance signals of the X-Y luminance co-ordinate system from the digital picture signals as second referential luminance signals on condition that the second referential luminance signals correspond to the color difference signals of co-ordinates (x,2y+l) and (x+1,2y+1);

calculating a third weighting factor and a fourth weighting factor from values of the second referential luminance signals;

calculating a first multiplied value by multiplying the value of the color difference signal of the co-ordinates (x,2y) by the first weighting factor, calculating a second multiplied value by multiplying the value of the color difference signal of the co-ordinates (x+1,2y) by the second weighting factor, calculating a third multiplied value by multiplying the value of the color difference signal of the co-ordinates (x,2y+l) by the third weighting factor, calculating a fourth multiplied value by multiplying the value of the color difference signal of the co-ordinates (x+1,2y+1) by the fourth weighting factor and calculating an interpolated value from the first, second, third and fourth multiplied values;

setting each average as values of the color difference signals of the co-ordinates (x,2y) and (x,2y+1);

halving the number of color difference signals in the y direction by removing color difference signals placed at co-ordinates (x,2y) of even-numbered y values or co-ordinates (x,2y+l) of odd-numbered y values;

adding a color difference signal to a position between each pair of color difference signals adjacent to each other in an X direction to double the number of color difference signals in the x direction;

setting a value of one added color difference signal to the interpolated value for each added color difference signal to produce converted color difference signals of a 4:2:0 color component type from the color difference signals in which the number of converted color difference signals is halved in the y direction as compared with the number of color difference signals and the number of converted color difference signal is doubled in the x direction as compared with the number of color difference signals;

combining the converted color difference signals and luminance signals of the digital picture signals to produce digital picture signals of the 4:2:0 color component type; and outputting the digital picture signals of the 4:2:0 color component type.

15. A picture signal converting method, comprising the steps of:

receiving a digital picture signal of a 4:1:1 color component type for each of pixels of a frame;

extracting color difference signals placed at co-ordinates (x,y) of an X-Y co-ordinate system (x=0,1,2,3, - - -, and y=0,1,2,3, - - -) from the digital picture signals;

extracting luminance signals placed at co-ordinates (x,y) of an X-Y luminance co-ordinate system from the digital picture signals as first referential luminance signals on condition that the first referential luminance signals correspond to the color difference signals of co-ordinates (x,2y) and (x+1,2y);

calculating a first weighting factor, a second weighting factor, a third weighting factor and a fourth weighting factor from values of the first referential luminance signals;

extracting other luminance signals from the digital picture signals as second referential luminance signals on condition that the second referential luminance signals correspond to the color difference signals of co-ordinates (x,2y+1) and (x+1,2y+1);

calculating a fifth weighting factor and a sixth weighting factor, a seventh weighting factor and an eighth weighting factor from values of the second referential luminance signals;

calculating a first multiplied value by multiplying the value of the color difference signal of the co-ordinates (x,2y) by the first weighting factor;

calculating a second multiplied value by multiplying the value of the color difference signal of the co-ordinates (x+1,2y) by the second weighting factor;

calculating a third multiplied value by multiplying the value of the color difference signal of the co-ordinates (x,2y+1) by the fifth weighting factor;

calculating a fourth multiplied value by multiplying the value of the color difference signal of the co-ordinates (x+1,2y+1) by the sixth weighting factor;

calculating a first interpolated value from the first, second, third and fourth multiplied values;

calculating a fifth multiplied value by multiplying the value of the color difference signal of the co-ordinates (x,2y) by the third weighting factor;

calculating a sixth multiplied value by multiplying the value of the color difference signal of the co-ordinates (x+1,2y) by the fourth weighting factor;

calculating a seventh multiplied value by multiplying the value of the color difference signal of the co-ordinates (x,2y+1) by the seventh weighting factor;

calculating an eighth multiplied value by multiplying the value of the color difference signal of the co-ordinates (x+1,2y+1) by the eighth weighting factor;

calculating a second interpolated value from the fifth, sixth, seventh and eighth multiplied values;

setting the first interpolated value as values of the color difference signals of the co-ordinates (x,2y) and (x,2y+1);

halving the number of color difference signals in the y direction by removing color difference signals placed at co-ordinates (x,2y) of even-numbered y values or co-ordinates (x,2y+1) of odd-numbered y values;

adding a color difference signal to a position between each pair of color difference signals adjacent to each other in an X direction to double the number of color difference signals in the x direction;

setting a value of one added color difference signal to the second interpolated value for each added color difference signal to produce converted color difference signals of a 4:2:0 color component type from the color difference signals in which the number of converted color difference signals is halved in the y direction as compared with the number of color difference signals and the number of converted color difference signal is doubled in the x direction as compared with the number of color difference signals;

combining the converted color difference signals and luminance signals of the digital picture signals to produce digital picture signals of the 4:2:0 color component type; and outputting the digital picture signals of the 4:2:0 color component type.

16. A picture signal converting apparatus comprising:

receiving means for receiving a digital picture signal compressed in a first format for each of pixels of a frame;

picture decoding means for decoding the digital picture signals received by the receiving means to produce a plurality of non-compressed picture signals of a 4:1:1 color component type, the non-compressed picture signals being arranged in a matrix of rows and columns;

component signal converting means for directly converting color difference signals of the non-compressed picture signals obtained by the picture decoding means into converted color difference signals of a 4:2:0 color component type by removing color difference signals on every other row from the color difference signals of the non-compressed picture signals to halve the number of color difference signals in a y direction and adding a color difference signal to a position between each pair of color difference signals adjacent to each other in an x direction to double the number of color difference signals in the x direction, setting values of the converted color difference signals of the 4:2:0 color component type according to values of the color difference signals of the non-compressed picture signals obtained by the picture decoding means and combining luminance signals of the non-compressed picture signals obtained by the picture decoding means and the converted color difference signals of the 4:2:0 color component type obtained by the color difference signal converting means for each pixel of the frame to produce non-compressed picture signals of the 4:2:0 color component type;

picture coding means for coding the non-compressed picture signals of the 4:2:0 color component type obtained by the component signal converting means to produce a plurality of digital picture signals compressed in a second format different from the first format; and output means for outputting the digital picture signals compressed in the second format obtained by the picture coding means.

17. A picture signal converting apparatus according to claim 16 in which the first format of the digital picture signals received by the receiving means is a DVC format, the digital picture signals compressed in the DVC format being obtained by performing a discrete cosine transform (DCT) processing for each block of non-compressed picture signals of a 4:1:1 color component type to obtain a block of DCT coefficients from each block of non-compressed picture signals, quantizing each block of DCT coefficients to obtain a block of quantized values from each block of DCT coefficients, coding each block of quantized values to obtain a block of variable-length codes from each block of quantized values and recording each block of variable-length codes as the digital picture signals compressed in the DVC format, and the second format of the digital picture signals obtained by the picture coding means is a moving picture experts group (MPEG) format in which a time-redundancy between frames is reduced by performing a motion compensation, a space-redundancy in each frame is reduced by performing a discrete cosine transform and a code volume is reduced by performing a variable length coding.

18. A picture signal converting apparatus according to claim 16 in which the picture decoding means comprises preparing means for deshuffling the digital picture signals to rearrange the digital picture signals;

variable-length decoding means for performing a variable-length decoding for the digital picture signals deshuffled by the preparing means to produce a plurality of quantized values;

inverted quantization means for performing an inverted quantization for the quantized values produced by the variable-length decoding means to produce a plurality of blocks of discrete cosine transform (DCT) coefficients of the non-compressed picture signals of the 4:1:1 color component type; and inverted DCT processing means for performing an inverted DCT processing for each block of DCT coefficients produced by the inverted quantization means to produce a plurality of blocks of non-compressed picture signals of the 4:1:1 color component type, and the picture coding means comprises an input buffer for storing the non-compressed picture signals of the 4:2:0 color component type produced by the component signal converting means as picture signals of a current frame frame by frame, the non-compressed picture signals being classified into a plurality of blocks of non-compressed picture signals respectively corresponding to a block of the current frame;

DCT compressing means for performing a discrete cosine transform (DCT) processing for each block of non-compressed picture signals stored in the input buffer to obtain a plurality of blocks of discrete cosine transform (DCT) coefficients and quantizing the DCT coefficients to obtain a plurality of blocks of quantized values;

inverted DCT expanding means for performing an inverted DCT processing for the blocks of DCT coefficients obtained by the DCT compressing means to reproduce the blocks of non-compressed picture signals of the 4:2:0 color component type;

frame picture storing means for storing each block of non-compressed picture signals of the 4:2:0 color component type reproduced by the inverted DCT expanding means as picture signals of a block of a referential frame, other non-compressed picture signals of the 4:2:0 color component type corresponding to a frame succeeding to the referential frame being stored in the input buffer;

motion predicting means for calculating a motion vector indicating the motion of a picture according to one block of non-compressed picture signals of the current frame stored in the input buffer and the non-compressed picture signals of the 4:2:0 color component type of the referential frame stored in the frame picture storing means for each block of the current frame and calculating an inter-frame difference between one block of non-compressed picture signals of the current frame and a corresponding block of non-compressed picture signals of the referential frame indicated by the motion vector for each block of the current frame;

coding selecting means for selecting a type of coding performed for the quantized values of the current frame obtained by the DCT compressing means;

variable length coding means for performing a variable length coding for the quantized values obtained by the DCT compressing means according to the coding type selected by the coding selecting means, the motion vectors and the inter-frame differences calculated by the motion predicting means to produce pieces of variable length coded data; and structure coding means for producing the digital picture signals compressed in the second format from the variable length coded data obtained by the variable length coding means.

19. A picture signal converting apparatus according to claim 16 in which the picture coding means comprises an input buffer for storing the non-compressed picture signals of the 4:2:0 color component type produced by the component signal converting means as picture signals of a current frame frame by frame, the non-compressed picture signals being classified into a plurality of blocks of non-compressed picture signals respectively corresponding to a block of the current frame;

DCT compressing means for performing a discrete cosine transform (DCT) processing for each block of non-compressed picture signals stored in the input buffer to obtain a plurality of blocks of discrete cosine transform (DCT) coefficients and quantizing the DCT coefficients to obtain a plurality of blocks of quantized values;

inverted DCT expanding means for performing an inverted DCT processing for the blocks of DCT coefficients obtained by the DCT compressing means to reproduce the blocks of non-compressed picture signals of the 4:2:0 color component type;

frame picture storing means for storing each block of non-compressed picture signals of the 4:2:0 color component type reproduced by the inverted DCT expanding means as picture signals of a block of a referential frame, other non-compressed picture signals of the 4:2:0 color component type corresponding to a frame succeeding to the referential frame being stored in the input buffer;

motion predicting means for calculating a motion vector indicating the motion of a picture according to one block of non-compressed picture signals of the current frame stored in the input buffer and the non-compressed picture signals of the 4:2:0 color component type of the referential frame stored in the frame picture storing means for each block of the current frame and calculating an inter-frame difference between one block of non-compressed picture signals of the current frame and a corresponding block of non-compressed picture signals of the referential frame indicated by the motion vector for each block of the current frame; and coding means for coding the quantized values obtained by the DCT compressing means by using the motion vectors and the inter-frame differences calculated by the motion predicting means to produce the digital picture signals compressed in the second format, the motion predicting means comprises hierarchy picture producing means for producing a plurality of current hierarchy pictures of different resolutions from a current original picture of each block of the current frame indicated by one block of non-compressed picture signals stored in the input buffer and producing a plurality of referential hierarchy pictures from a referential original picture of each block of the referential frame indicated by one block of non-compressed picture signals stored in the frame picture storing means, a current hierarchy picture of the highest resolution being the current original picture, a current hierarchy picture of a resolution lower than that of a specific current hierarchy picture being obtained each time every other pixel is removed in an x direction from pixels of the specific current original picture and every other pixel is removed in a y direction from pixels of the specific current original picture, a referential hierarchy picture of the highest resolution being the referential original picture, and a referential hierarchy picture of a resolution lower than that of a specific referential hierarchy picture being obtained each time every other pixel is removed in an x direction from pixels of the specific referential original picture and every other pixel is removed in a y direction from pixels of the specific referential original picture;

motion vector producing means for repeatedly calculating an intermediate motion vector from one current hierarchy picture and one referential hierarchy picture produced by the hierarchy picture producing means and a rough motion vector calculated just before the calculation of the intermediate motion vector while changing the current and referential hierarchy pictures to other current and referential hierarchy pictures of higher resolution for each calculation of the intermediate motion vector and setting the intermediate motion vector as the rough motion vector for each calculation of the intermediate motion vector, and finally calculating the motion vector from the current and referential hierarchy pictures of the highest resolution, the motion vector being calculated for each block of the current frame, the motion vector for a block of the current frame indicating a block of the referential frame, and the rough motion vector indicating candidates for a particular block of the referential frame indicated by the intermediate motion vector; and inter-frame difference information producing means for producing inter-frame difference information indicating the inter-frame difference between a group of pixel values of one block of the current frame and a group of pixel values of a corresponding block of the referential frame indicated by the motion vector produced by the motion vector producing means for each block of the current frame.

20. A picture signal converting apparatus according to claim 16 in which the picture decoding means comprises variable-length decoding means for performing a variable-length decoding for the digital picture signals to produce a plurality of quantized values;

inverted quantization means for performing an inverted quantization for the quantized values produced by the variable-length decoding means to produce a plurality of blocks of discrete cosine transform (DCT) coefficients of the non-compressed picture signals of the 4:1:1 color component type, the DCT coefficients of the non-compressed picture signals being classified into DCT coefficients of non-compressed luminance signals and DCT coefficients of non-compressed color difference signals; and inverted DCT processing means for performing an inverted DCT processing for each block of DCT coefficients of non-compressed color difference signals produced by the inverted quantization means to produce a plurality of blocks of non-compressed color difference signals of the 4:1:1 color component type, a plurality of blocks of non-compressed color difference signals of the 4:2:0 color component type being produced from the blocks of non-compressed color difference signals of the 4:1:1 color component type by the component signal converting means, the picture coding means comprises an input buffer for storing the non-compressed picture signals of the 4:2:0 color component type produced by the component signal converting means as picture signals of a current frame frame by frame, the non-compressed picture signals being classified into a plurality of blocks of non-compressed picture signals respectively corresponding to a block of the current frame;

a DCT coefficient buffer for storing a block of DCT coefficients of luminance signals extracted from each block of DCT coefficients of the non-compressed picture signals produced by the inverted quantization means, each block of DCT coefficients of luminance signals corresponding to a block of the current frame, and the DCT coefficients of each block being arranged in a matrix of rows and columns;

hierarchical inverted DCT processing means for repeatedly extracting a group of DCT coefficients from each block of DCT coefficients of luminance signals stored in the DCT coefficient buffer on condition that a frequency band of the group of DCT coefficients gradually extends to a higher frequency and performing an inverted DCT processing for each group of DCT coefficients to produce a plurality of hierarchy pictures respectively indicated by a plurality of non-compressed luminance signals, the hierarchy pictures of different resolutions being produced for each block of the current frame;

DCT compressing means for performing a discrete cosine transform (DCT) processing for each block of non-compressed picture signals stored in the input buffer to obtain a plurality of blocks of discrete cosine transform (DCT) coefficients and quantizing the DCT coefficients to obtain a plurality of blocks of quantized values;

inverted DCT expanding means for performing an inverted DCT processing for the blocks of DCT coefficients obtained by the DCT compressing means to reproduce the blocks of non-compressed picture signals of the 4:2:0 color component type;

frame picture storing means for storing each block of non-compressed picture signals of the 4:2:0 color component type reproduced by the inverted DCT expanding means as picture signals of a block of a referential frame, other non-compressed picture signals of the 4:2:0 color component type corresponding to a frame succeeding to the referential frame being stored in the input buffer;

motion predicting means for calculating a motion vector indicating the motion of a picture according to one block of non-compressed picture signals of the current frame stored in the input buffer and the non-compressed picture signals of the 4:2:0 color component type of the referential frame stored in the frame picture storing means for each block of the current frame and calculating an inter-frame difference between one block of non-compressed picture signals of the current frame and a corresponding block of non-compressed picture signals of the referential frame indicated by the motion vector for each block of the current frame; and coding means for coding the quantized values obtained by the DCT compressing means by using the motion vectors and the inter-frame differences calculated by the motion predicting means to produce the digital picture signals compressed in the second format, the motion predicting means comprises motion vector producing means for repeatedly calculating an intermediate motion vector from one hierarchy picture produced by the hierarchical inverted DCT processing means and a referential original picture of the referential frame indicated by non-compressed luminance signals of the non-compressed picture signals stored in the frame picture storing means and a rough motion vector calculated just before the calculation of the intermediate motion vector while changing the hierarchy picture to another hierarchy picture of a higher resolution for each calculation of the intermediate motion vector and setting the intermediate motion vector as the rough motion vector for each calculation of the intermediate motion vector, and finally calculating the motion vector from the hierarchy picture of the highest resolution and the referential original picture for each block of the current frame, the motion vector for a block of the current frame indicating a block of the referential frame, and the rough motion vector indicating candidates for a particular block of the referential frame indicated by the intermediate motion vector; and inter-frame difference information producing means for producing inter-frame difference information indicating the inter-frame difference between a group of pixel values of one block of the current frame and a group of pixel values of a corresponding block of the referential frame indicated by the motion vector calculated by the motion vector producing means for each block of the current frame.

21. A picture signal converting apparatus according to claim 16 in which the picture decoding means comprises variable-length decoding means for performing a variable-length decoding for the digital picture signals to produce a plurality of quantized values;

inverted quantization means for performing an inverted quantization for the quantized values produced by the variable-length decoding means to produce a plurality of blocks of discrete cosine transform (DCT) coefficients of the non-compressed picture signals of the 4:1:1 color component type, the DCT coefficients of the non-compressed picture signals being classified into DCT coefficients of non-compressed luminance signals and DCT coefficients of non-compressed color difference signals; and inverted DCT processing means for performing an inverted DCT processing for each block of DCT coefficients of non-compressed color difference signals produced by the inverted quantization means to produce a plurality of blocks of non-compressed color difference signals of the 4:1:1 color component type, a plurality of blocks of non-compressed color difference signals of the 4:2:0 color component type being produced from the blocks of non-compressed color difference signals of the 4:1:1 color component type by the component signal converting means, the picture coding means comprises an input buffer for storing the non-compressed picture signals of the 4:2:0 color component type produced by the component signal converting means as picture signals of a current frame frame by frame, the non-compressed picture signals being classified into a plurality of blocks of non-compressed picture signals respectively corresponding to a block of the current frame;

a DCT coefficient buffer for storing a block of DCT coefficients of luminance signals extracted from each block of DCT coefficients of the non-compressed picture signals produced by the inverted quantization means, each block of DCT coefficients of luminance signals corresponding to a block of the current frame, and the DCT coefficients of each block being arranged in a matrix of rows and columns;

a one-dimensional inverted DCT processing means for extracting a block of DCT coefficients of luminance signals arranged in a row as an x-directional group of DCT coefficients from each block of DCT coefficients stored in the DCT coefficient buffer, extracting a block of DCT coefficients of luminance signals arranged in a column as a y-directional group of DCT coefficients from each block of DCT coefficients stored in the DCT coefficient buffer, performing an inverted DCT processing for the x-directional group of DCT coefficients to obtain x-directional information composed of non-compressed luminance signals arranged in the x direction for each block of a current frame and performing an inverted DCT processing for the y-directional group of DCT coefficients to obtain y-directional information composed of non-compressed luminance signals arranged in the y direction for each block of the current frame;

DCT compressing means for performing a discrete cosine transform (DCT) processing for each block of non-compressed picture signals stored in the input buffer to obtain a plurality of blocks of discrete cosine transform (DCT) coefficients and quantizing the DCT coefficients to obtain a plurality of blocks of quantized values;

inverted DCT expanding means for performing an inverted DCT processing for the blocks of DCT coefficients obtained by the DCT compressing means to reproduce the blocks of non-compressed picture signals of the 4:2:0 color component type;

frame picture storing means for storing each block of non-compressed picture signals of the 4:2:0 color component type reproduced by the inverted DCT expanding means as picture signals of a block of a referential frame, other non-compressed picture signals of the 4:2:0 color component type corresponding to a frame succeeding to the referential frame being stored in the input buffer;

motion predicting means for calculating a motion vector indicating the motion of a picture according to one block of non-compressed picture signals of the current frame stored in the input buffer and the non-compressed picture signals of the 4:2:0 color component type of the referential frame stored in the frame picture storing means for each block of the current frame and calculating an inter-frame difference between one block of non-compressed picture signals of the current frame and a corresponding block of non-compressed picture signals of the referential frame indicated by the motion vector for each block of the current frame; and coding means for coding the quantized values obtained by the DCT compressing means by using the motion vectors and the inter-frame differences calculated by the motion predicting means to produce the digital picture signals compressed in the second format, the motion predicting means comprises motion vector producing means for calculating an x-directional motion vector according to the x-directional information obtained by the one-dimensional inverted DCT processing means and non-compressed luminance signals of the non-compressed picture signals stored in the frame picture storing means for each block of the current frame, specifying a plurality of remarked blocks of the referential frame arranged in the neighborhood of a particular block indicated by the x-directional motion vector and calculating a motion vector according to the y-directional information obtained by the one-dimensional inverted DCT processing means and non-compressed luminance signals of the remarked blocks for each block of the current frame; and inter-frame difference information producing means for producing inter-frame difference information indicating the inter-frame difference between a group of pixel values of one block of the current frame and a group of pixel values of a corresponding block of the referential frame indicated by the motion vector calculated by the motion vector producing means for each block of the current frame.

22. A picture signal converting apparatus comprising:

receiving means for receiving a digital picture signal compressed in a first format for each of pixels of a frame;

picture decoding means for decoding the digital picture signals received by the receiving means to produce a plurality of discrete cosine transform (DCT) coefficients of non-compressed picture signals of a 4:1:1 color component type, converting the DCT coefficients into a plurality of DCT coefficients of non-compressed picture signals of a 4:2:0 color component type and producing a plurality of non-compressed picture signals of the 4:2:0 color component type from the DCT coefficients of the non-compressed picture signals of the 4:2:0 color component type;

picture coding means for coding the non-compressed picture signals of the 4:2:0 color component type obtained by the picture decoding means to produce a plurality of digital picture signals compressed in a second format different from the first format; and output means for outputting the digital picture signals compressed in the second format obtained by the picture coding means.

23. A picture signal converting apparatus according to claim 22 in which the first format of the digital picture signals received by the receiving means is a DVC format, the digital picture signals compressed in the DVC format being obtained by performing a discrete cosine transform (DCT) processing for each block of non-compressed picture signals of a 4:1:1 color component type to obtain a block of DCT coefficients from each block of non-compressed picture signals, quantizing each block of DCT coefficients to obtain a block of quantized values from each block of DCT coefficients, coding each block of quantized values to obtain a block of variable-length codes from each block of quantized values and recording each block of variable-length codes as the digital picture signals compressed in the DVC format, and the second format of the digital picture signals obtained by the picture coding means is a moving picture experts group (MPEG) format in which a time-redundancy between frames is reduced by performing a motion compensation, a space-redundancy in each frame is reduced by performing a discrete cosine transform and a code volume is reduced by performing a variable length coding.

24. A picture signal converting apparatus according to claim 22 in which the picture decoding means comprises preparing means for deshuffling the digital picture signals to rearrange the digital picture signals;

variable-length decoding means for performing a variable-length decoding for the digital picture signals deshuffled by the preparing means to produce a plurality of quantized values;

inverted quantization means for performing an inverted quantization for the quantized values produced by the variable-length decoding means to produce a plurality of blocks of discrete cosine transform (DCT) coefficients of the non-compressed picture signals of the 4:1:1 color component type, the DCT coefficients of each block being arranged in a matrix of rows and columns;

DCT coefficient converting means for extracting a block of DCT coefficients of non-compressed color difference signals of the 4:1:1 color component type from each block of DCT coefficients of the non-compressed picture signals obtained by the inverted quantization means and converting each block of DCT coefficients of the non-compressed color difference signals of the 4:1:1 color component type to a block of DCT coefficients of non-compressed color difference signals of a 4:2:0 color component type by removing a lower half portion of DCT coefficients corresponding to higher frequency from each block of DCT coefficients to halve a resolution of the DCT coefficients in a y direction for each block and adding DCT coefficients on the right side of the remaining DCT coefficients for each block to double a resolution of the DCT coefficients in an x direction for each block;

inverted DCT processing means for performing an inverted DCT processing for each block of DCT coefficients of non-compressed luminance signals extracted from the DCT coefficients of the non-compressed picture signals obtained by the inverted quantization means and a corresponding block of DCT coefficients of the non-compressed color difference signals of the 4:2:0 color component type obtained by the DCT coefficient converting means to produce a plurality of blocks of non-compressed picture signals of the 4:2:0 color component type, and the picture coding means comprises an input buffer for storing the blocks of non-compressed picture signals of the 4:2:0 color component type produced by the inverted DCT processing means as picture signals of a current frame frame by frame, each block of non-compressed picture signals corresponding to a block of the current frame;

DCT compressing means for performing a discrete cosine transform (DCT) processing for each block of non-compressed picture signals stored in the input buffer to obtain a plurality of discrete cosine transform (DCT) coefficients for each block and quantizing the DCT coefficients to obtain a plurality of quantized values for each block;

inverted DCT expanding means for performing an inverted DCT processing for the DCT coefficients obtained by the DCT compressing means to reproduce the blocks of non-compressed picture signals of the 4:2:0 color component type;

frame picture storing means for storing the blocks of non-compressed picture signals of the 4:2:0 color component type reproduced by the inverted DCT expanding means as blocks of picture signals of a referential frame, other non-compressed picture signals of the 4:2:0 color component type corresponding to a frame succeeding to the referential frame being stored in the input buffer;

motion predicting means for calculating a motion vector indicating the motion of a picture according to one block of non-compressed picture signals of the current frame stored in the input buffer and the non-compressed picture signals of the 4:2:0 color component type of the referential frame stored in the frame picture storing means for each block of the current frame and calculating an inter-frame difference according to the difference between one block of non-compressed picture signals of the current frame and a corresponding block of non-compressed picture signals of the referential frame indicated by the motion vector;

coding selecting means for selecting a type of coding performed for the quantized values of the current frame obtained by the DCT compressing means;

variable length coding means for performing a variable length coding for the quantized values obtained by the DCT compressing means according to the coding type selected by the coding selecting means, the motion vectors and the inter-frame differences calculated by the motion predicting means to produce pieces of variable length coded data; and structure coding means for producing the digital picture signals compressed in the second format from the variable length coded data obtained by the variable length coding means.

25. A picture signal converting apparatus according to claim 24 in which the motion predicting means comprises hierarchy picture producing means for producing a plurality of current hierarchy pictures of different resolutions from a current original picture of each block of the current frame indicated by one block of non-compressed picture signals stored in the input buffer and producing a plurality of referential hierarchy pictures from a referential original picture of each block of the referential frame indicated by one block of non-compressed picture signals stored in the frame picture storing means, a current hierarchy picture of the highest resolution being the current original picture, a current hierarchy picture of a resolution lower than that of a specific current hierarchy picture being obtained each time every other pixel is removed in an x direction from pixels of the specific current original picture and every other pixel is removed in a y direction from pixels of the specific current original picture, a referential hierarchy picture of the highest resolution being the referential original picture, and a referential hierarchy picture of a resolution lower than that of a specific referential hierarchy picture being obtained each time every other pixel is removed in an x direction from pixels of the specific referential original picture and every other pixel is removed in a y direction from pixels of the specific referential original picture;

motion vector producing means for repeatedly calculating an intermediate motion vector from one current hierarchy picture and one referential hierarchy picture produced by the hierarchy picture producing means and a rough motion vector calculated just before the calculation of the intermediate motion vector while changing the current and referential hierarchy pictures to other current and referential hierarchy pictures of higher resolution for each calculation of the intermediate motion vector and setting the intermediate motion vector as the rough motion vector for each calculation of the intermediate motion vector, and finally calculating the motion vector from the current and referential hierarchy pictures of the highest resolution, the motion vector being calculated for each block of the current frame, the motion vector for a block of the current frame indicating a block of the referential frame, and the rough motion vector indicating candidates for a particular block of the referential frame indicated by the intermediate motion vector; and inter-frame difference information producing means for producing inter-frame difference information indicating the inter-frame difference between a group of pixel values of one block of the current frame and a group of pixel values of a corresponding block of the referential frame indicated by the motion vector produced by the motion vector producing means for each block of the current frame.

26. A picture signal converting apparatus according to claim 24 in which the picture coding means further comprises:

a DCT coefficient buffer for storing a block of DCT coefficients of luminance signals extracted from each block of DCT coefficients of the non-compressed picture signals produced by the inverted quantization means, each block of DCT coefficients of luminance signals corresponding to a block of the current frame, and the DCT coefficients of each block being arranged in a matrix of rows and columns; and hierarchical inverted DCT processing means for repeatedly extracting a group of DCT coefficients from each block of DCT coefficients of luminance signals stored in the DCT coefficient buffer on condition that a frequency band of the group of DCT coefficients gradually extends to a higher frequency and performing an inverted DCT processing for each group of DCT coefficients to produce a plurality of hierarchy pictures respectively indicated by a plurality of non-compressed luminance signals, the hierarchy pictures of different resolutions being produced for each block of the current frame, and the motion predicting means comprises motion vector producing means for repeatedly calculating an intermediate motion vector from one hierarchy picture produced by the hierarchical inverted DCT processing means and a referential original picture of the referential frame indicated by non-compressed luminance signals of the non-compressed picture signals stored in the frame picture storing means and a rough motion vector calculated just before the calculation of the intermediate motion vector while changing the hierarchy picture to another hierarchy picture of a higher resolution for each calculation of the intermediate motion vector and setting the intermediate motion vector as the rough motion vector for each calculation of the intermediate motion vector, and finally calculating the motion vector from the hierarchy picture of the highest resolution and the referential original picture for each block of the current frame, the motion vector for a block of the current frame indicating a block of the referential frame, and the rough motion vector indicating candidates for a particular block of the referential frame indicated by the intermediate motion vector; and inter-frame difference information producing means for producing inter-frame difference information indicating the inter-frame difference between a group of pixel values of one block of the current frame and a group of pixel values of a corresponding block of the referential frame indicated by the motion vector calculated by the motion vector producing means for each block of the current frame.

27. A picture signal converting apparatus according to claim 24 in which the picture coding means further comprises:

a DCT coefficient buffer for storing a block of DCT coefficients of luminance signals extracted from each block of DCT coefficients of the non-compressed picture signals produced by the inverted quantization means, each block of DCT coefficients of luminance signals corresponding to a block of the current frame, and the DCT coefficients of each block being arranged in a matrix of rows and columns; and a one-dimensional inverted DCT processing means for extracting a block of DCT coefficients of luminance signals arranged in a row as an x-directional group of DCT coefficients from each block of DCT coefficients stored in the DCT coefficient buffer, extracting a block of DCT coefficients of luminance signals arranged in a column as a y-directional group of DCT coefficients from each block of DCT coefficients stored in the DCT coefficient buffer, performing an inverted DCT processing for the x-directional group of DCT coefficients to obtain x-directional information composed of non-compressed luminance signals arranged in the x direction for each block of a current frame and performing an inverted DCT processing for the y-directional group of DCT coefficients to obtain y-directional information composed of non-compressed luminance signals arranged in the y direction for each block of the current frame, and the motion predicting means comprises motion vector producing means for calculating an x-directional motion vector according to the x-directional information obtained by the one-dimensional inverted DCT processing means and non-compressed luminance signals of the non-compressed picture signals stored in the frame picture storing means for each block of the current frame, specifying a plurality of remarked blocks of the referential frame arranged in the neighborhood of a particular block indicated by the x-directional motion vector and calculating a motion vector according to the y-directional information obtained by the one-dimensional inverted DCT processing means and non-compressed luminance signals of the remarked blocks for each block of the current frame; and inter-frame difference information producing means for producing inter-frame difference information indicating the inter-frame difference between a group of pixel values of one block of the current frame and a group of pixel values of a corresponding block of the referential frame indicated by the motion vector calculated by the motion vector producing means for each block of the current frame.

28. A picture signal converting method, comprising the steps of:

receiving a digital picture signal compressed in a DVC format for each of pixels of a frame, the digital picture signals compressed in the DVC format being obtained by performing a discrete cosine transform (DCT) processing for each block of non-compressed picture signals of a 4:1:1 color component type to obtain a block of DCT coefficients from each block of non-compressed picture signals, quantizing each block of DCT coefficients to obtain a block of quantized values from each block of DCT coefficients, coding each block of quantized values to obtain a block of variable-length codes from each block of quantized values and recording each block of variable-length codes as the digital picture signals compressed in the DVC format;

decoding the digital picture signals to produce a plurality of non-compressed picture signals of a 4:1:1 color component type, the non-compressed picture signals being arranged in a matrix of rows and columns;

removing color difference signals on every other row from the color difference signals of the non-compressed picture signals to halve the number of color difference signals in a y direction;

adding a color difference signal to a position between each pair of color difference signals adjacent to each other in an x direction to double the number of color difference signals in the x direction;

setting values of the color difference signals according to values of the non-compressed picture signals of the 4:1:1 color component type to directly convert the color difference signals of the 4:1:1 color component type into converted color difference signals of a 4:2:0 color component type;

combining luminance signals of the non-compressed picture signals of the 4:1:1 color component type and the converted color difference signals of the 4:2:0 color component type for each pixel of the frame to produce non-compressed picture signals of the 4:2:0 color component type;

coding the non-compressed picture signals of the 4:2:0 color component type to produce a plurality of digital picture signals compressed in a moving picture experts group (MPEG) format in which a time-redundancy between frames is reduced by performing a motion compensation, a space-redundancy in each frame is reduced by performing a discrete cosine transform and a code volume is reduced by performing a variable length coding; and outputting the digital picture signals compressed in the MPEG format.

29. A picture signal converting method according to claim 28 in which the step of coding the non-compressed picture signals comprises the steps of:

storing the non-compressed picture signals of the 4:2:0 color component type in an input buffer as picture signals of a current frame frame by frame, the non-compressed picture signals being classified into a plurality of blocks of non-compressed picture signals respectively corresponding to a block of the current frame;

performing a discrete cosine transform (DCT) processing for the blocks of non-compressed picture signals stored in the input buffer to obtain a plurality of blocks of discrete cosine transform (DCT) coefficients;

quantizing the blocks of DCT coefficients to produce a plurality of quantized values of the current frame;

performing an inverted DCT processing for each block of DCT coefficients to reproduce the blocks of non-compressed picture signals of the 4:2:0 color component type;

storing the blocks of non-compressed picture signals of the 4:2:0 color component type in a frame memory as picture signals of a referential frame, other non-compressed picture signals of the 4:2:0 color component type corresponding to a frame succeeding to the referential frame being stored in the input buffer;

calculating a motion vector indicating the motion of a picture according to one block of non-compressed picture signals of the current frame stored in the input buffer and the non-compressed picture signals of the 4:2:0 color component type of the referential frame stored in the frame memory for each block of the current frame;

calculating an inter-frame difference between one block of non-compressed picture signals of the current frame and a corresponding block of non-compressed picture signals of the referential frame indicated by the motion vector;

selecting a type of coding performed for the quantized values of the current frame;

performing a variable length coding for the quantized values according to the coding type, the motion vectors and the inter-frame differences to produce pieces of variable length coded data; and producing the digital picture signals compressed in the MPEG format from the variable length coded data, and the step of calculating a motion vector comprises the steps of producing a plurality of current hierarchy pictures of different resolutions from a current original picture of one block of the current frame indicated by one block of non-compressed picture signals stored in the input buffer for each block of the current frame by setting the current original picture as a current hierarchy picture of the highest resolution and obtaining a current hierarchy picture of a resolution lower than that of a specific current hierarchy picture each time every other pixel is removed in an x direction from pixels of the specific current original picture and every other pixel is removed in a y direction from pixels of the specific current original picture;

producing a plurality of referential hierarchy pictures of different resolutions from a referential original picture of one block of the referential frame indicated by one block of non-compressed picture signals stored in the frame memory for each block of the referential frame by setting a referential hierarchy picture of the highest resolution as the referential original picture and obtaining a referential hierarchy picture of a resolution lower than that of a specific referential hierarchy picture each time every other pixel is removed in an x direction from pixels of the specific referential original picture and every other pixel is removed in a y direction from pixels of the specific referential original picture;

repeatedly calculating an intermediate motion vector from one current hierarchy picture and one referential hierarchy picture and a rough motion vector calculated just before the calculation of the intermediate motion vector while changing the current and referential hierarchy pictures to other current and referential hierarchy pictures of higher resolution; and finally calculating the motion vector from the current and referential hierarchy pictures of the highest resolution, the motion vector for a block of the current frame indicating a block of the referential frame, and the rough motion vector indicating candidates for a particular block of the referential frame indicated by the motion vector.

30. A picture signal converting method according to claim 28 in which the step of decoding the digital picture signals comprises the steps of:

performing a variable-length decoding for the digital picture signals to produce a plurality of quantized values;

performing an inverted quantization for the quantized values to produce a plurality of blocks of discrete cosine transform (DCT) coefficients of the non-compressed picture signals of the 4:1:1 color component type, the DCT coefficients of the non-compressed picture signals being classified into DCT coefficients of non-compressed luminance signals and DCT coefficients of the non-compressed color difference signals; and performing an inverted DCT processing for each block of DCT coefficients to produce the non-compressed picture signals of the 4:1:1 color component type, the step of coding the non-compressed picture signals comprises the steps of:

storing each block of DCT coefficients of non-compressed luminance signals in a DCT coefficient buffer;

storing the non-compressed picture signals of the 4:2:0 color component type in an input buffer as picture signals of a current frame frame by frame, the non-compressed picture signals being classified into a plurality of blocks of non-compressed picture signals respectively corresponding to a block of the current frame;

performing a discrete cosine transform (DCT) processing for each block of non-compressed picture signals stored in the input buffer to obtain a plurality of blocks of discrete cosine transform (DCT) coefficients;

quantizing each block of DCT coefficients to produce a plurality of quantized values of the current frame;

performing an inverted DCT processing for each block of DCT coefficients to reproduce the blocks of non-compressed picture signals of the 4:2:0 color component type;

storing the blocks of non-compressed picture signals of the 4:2:0 color component type in a frame memory as picture signals of a referential frame, other non-compressed picture signals of the 4:2:0 color component type corresponding to a frame succeeding to the referential frame being stored in the input buffer;

calculating a motion vector indicating the motion of a picture according to one block of non-compressed picture signals of one block of the current frame stored in the input buffer and the non-compressed picture signals of the 4:2:0 color component type of the referential frame stored in the frame memory for each block of the current frame;

calculating an inter-frame difference between one block of non-compressed picture signals of the current frame and a corresponding block of non-compressed picture signals of the referential frame indicated by the motion vector;

selecting a type of coding performed for the quantized values of the current frame;

performing a variable length coding for the quantized values according to the coding type, the motion vectors and the inter-frame differences to produce pieces of variable length coded data; and producing the digital picture signals compressed in the MPEG format from the variable length coded data, and the step of calculating a motion vector comprises the steps of:

repeatedly extracting a group of DCT coefficients from each block of DCT coefficients of luminance signals stored in the DCT coefficient buffer on condition that a frequency band of the group of DCT coefficients gradually extends to a higher frequency;

performing an inverted DCT processing for each group of DCT coefficients to produce a plurality of hierarchy pictures respectively indicated by a plurality of non-compressed luminance signals, the hierarchy pictures of different resolutions being produced for each block of DCT coefficients of luminance signals;

repeatedly calculating an intermediate motion vector from one hierarchy picture and a referential original picture of the referential frame indicated by non-compressed luminance signals of the non-compressed picture signals stored in the frame memory and a rough motion vector calculated just before the calculation of the intermediate motion vector while changing the hierarchy picture to another hierarchy picture of a higher resolution, the rough motion vector indicating candidates for a particular block of the referential frame indicated by the intermediate motion vector; and finally calculating the motion vector from the hierarchy picture of the highest resolution and the referential original picture, the motion vector for a block of the current frame indicating a block of the referential frame.

31. A picture signal converting method according to claim 28 in which the step of decoding the digital picture signals comprises the steps of:

performing a variable-length decoding for the digital picture signals to produce a plurality of quantized values;

performing an inverted quantization for the quantized values to produce a plurality of blocks of discrete cosine transform (DCT) coefficients of the non-compressed picture signals of the 4:1:1 color component type, each block of DCT coefficients of the non-compressed picture signals being classified into a block of DCT coefficients of non-compressed luminance signals and a block of DCT coefficients of the non-compressed color difference signals; and performing an inverted DCT processing for each block of DCT coefficients to produce the non-compressed picture signals of the 4:1:1 color component type, the step of coding the non-compressed picture signals comprises the steps of:

storing each block of DCT coefficients of non-compressed luminance signals in a DCT coefficient buffer;

storing the non-compressed picture signals of the 4:2:0 color component type in an input buffer as picture signals of a current frame frame by frame, the non-compressed picture signals being classified into a plurality of blocks of non-compressed picture signals respectively corresponding to a block of the current frame;

performing a discrete cosine transform (DCT) processing for each block of non-compressed picture signals stored in the input buffer to obtain a plurality of blocks of discrete cosine transform (DCT) coefficients;

quantizing the blocks of DCT coefficients to produce a plurality of quantized values of the current frame;

performing an inverted DCT processing for the blocks of DCT coefficients to reproduce the blocks of non-compressed picture signals of the 4:2:0 color component type;

storing the blocks of non-compressed picture signals of the 4:2:0 color component type in a frame memory as picture signals of a referential frame, other non-compressed picture signals of the 4:2:0 color component type corresponding to a frame succeeding to the referential frame being stored in the input buffer;

calculating a motion vector indicating the motion of a picture according to one block of non-compressed picture signals of the current frame stored in the input buffer and the non-compressed picture signals of the 4:2:0 color component type of the referential frame stored in the frame memory for each block of the current frame;

calculating an inter-frame difference between one block of non-compressed picture signals of the current frame and a corresponding block of non-compressed picture signals of the referential frame indicated by the motion vector;

selecting a type of coding performed for the quantized values of the current frame;

performing a variable length coding for the quantized values according to the coding type, the motion vectors and the inter-frame differences to produce pieces of variable length coded data; and producing the digital picture signals compressed in the MPEG format from the variable length coded data, and the step of calculating a motion vector comprises the steps of:

extracting a plurality of DCT coefficients of non-compressed luminance signals arranged in a row as an x-directional group of DCT coefficients from each block of DCT coefficients of non-compressed luminance signals stored in the DCT coefficient buffer;

extracting a plurality of DCT coefficients of non-compressed luminance signals arranged in a column as a y-directional group of DCT coefficients from each block of DCT coefficients of non-compressed luminance signals stored in the DCT coefficient buffer;

performing an inverted DCT processing for the x-directional group of DCT coefficients to obtain x-directional information composed of non-compressed luminance signals arranged in the x direction for each block of a current frame;

performing an inverted DCT processing for the y-directional group of DCT coefficients to obtain y-directional information composed of non-compressed luminance signals arranged in the y direction for each block of the current frame;

calculating an x-directional motion vector according to the x-directional information and non-compressed luminance signals of the non-compressed picture signals stored in the frame memory for each block of the current frame;

specifying a plurality of remarked blocks of the referential frame arranged in the neighborhood of a particular block of the referential frame indicated by the x-directional motion vector; and calculating the motion vector according to the y-directional information and non-compressed luminance signals of the remarked blocks for each block of the current frame.

32. A picture signal converting method, comprising the steps of:

receiving a digital picture signal compressed in a DVC format for each of pixels of a frame, the digital picture signals compressed in the DVC format being obtained by performing a discrete cosine transform (DCT) processing for each block of non-compressed picture signals of a 4:1:1 color component type to obtain a block of DCT coefficients from each block of non-compressed picture signals, quantizing each block of DCT coefficients to obtain a block of quantized values from each block of DCT coefficients, coding each block of quantized values to obtain a block of variable-length codes from each block of quantized values and recording each block of variable-length codes as the digital picture signals compressed in the DVC format;

performing a variable-length decoding for the digital picture signals compressed in the DVC format to produce a plurality of quantized values;

performing an inverted quantization for the quantized values to produce a plurality of blocks of discrete cosine transform (DCT) coefficients of the non-compressed picture signals of the 4:1:1 color component type, each block of DCT coefficients of the non-compressed picture signals being classified into a block of DCT coefficients of non-compressed luminance signals and a block of DCT coefficients of the non-compressed color difference signals of the 4:1:1 color component type;

converting each block of DCT coefficients of the non-compressed color difference signals of the 4:1:1 color component type into a block of DCT coefficients of non-compressed color difference signals of a 4:2:0 color component type, the DCT coefficients of each block being arranged in a matrix of rows and columns;

combining each block of DCT coefficients of the non-compressed color difference signals of the 4:2:0 color component type and a corresponding block of DCT coefficients of non-compressed luminance signals to produce a plurality of blocks of DCT coefficients of non-compressed picture signals of the 4:2:0 color component type;

performing an inverted DCT processing for each block of DCT coefficients of non-compressed picture signals of the 4:2:0 color component type to produce a block of non-compressed picture signals of the 4:2:0 color component type for each block of DCT coefficients;

coding each block of non-compressed picture signals of the 4:2:0 color component type to produce a plurality of digital picture signals compressed in a moving picture experts group (MPEG) format in which a time-redundancy between frames is reduced by performing a motion compensation, a space-redundancy in each frame is reduced by performing a discrete cosine transform and a code volume is reduced by performing a variable length coding; and outputting the digital picture signals compressed in the MPEG format, and the step of converting each block of DCT coefficients comprises the steps of:

removing a lower half portion of DCT coefficients corresponding to higher frequency from each block of DCT coefficients to halve a resolution of the DCT coefficients in a y direction for each block; and adding DCT coefficients on the right side of the remaining DCT coefficients for each block to double a resolution of the DCT coefficients in an x direction for each block and to produce the blocks of DCT coefficients of the non-compressed color difference signals of the 4:2:0 color component type.

33. A picture signal converting method according to claim 32 in which the step of coding each block of non-compressed picture signals comprises the steps of:

storing the blocks of non-compressed picture signals of the 4:2:0 color component type in an input buffer as picture signals of a current frame frame by frame, each block of non-compressed picture signals corresponding to a block of the current frame;

performing a discrete cosine transform (DCT) processing for each block of non-compressed picture signals stored in the input buffer to obtain a plurality of blocks of DCT coefficients;

quantizing each block of DCT coefficients to produce a plurality of quantized values of the current frame;

performing an inverted DCT processing for the DCT coefficients to reproduce the blocks of non-compressed picture signals of the 4:2:0 color component type;

storing the blocks of non-compressed picture signals of the 4:2:0 color component type in a frame memory as picture signals of a referential frame, other non-compressed picture signals of the 4:2:0 color component type corresponding to a frame succeeding to the referential frame being stored in the input buffer;

calculating a motion vector indicating the motion of a picture according to one block of non-compressed picture signals of the current frame stored in the input buffer and the non-compressed picture signals of the 4:2:0 color component type of the referential frame stored in the frame memory for each block of the current frame;

calculating an inter-frame difference according to the difference between one block of non-compressed picture signals of the current frame and a corresponding block of non-compressed picture signals of the referential frame indicated by the motion vector;

selecting a type of coding performed for the quantized values of the current frame;

performing a variable length coding for the quantized values according to the coding type, the motion vectors and the inter-frame differences to produce pieces of variable length coded data; and producing the digital picture signals compressed in the MPEG format from the variable length coded data, and the step of calculating a motion vector comprises the steps of producing a plurality of current hierarchy pictures of different resolutions from a current original picture of one block of the current frame indicated by one block of non-compressed picture signals stored in the input buffer for each block of the current frame by setting the current original picture as a current hierarchy picture of the highest resolution and obtaining a current hierarchy picture of a resolution lower than that of a specific current hierarchy picture each time every other pixel is removed in an x direction from pixels of the specific current original picture and every other pixel is removed in a y direction from pixels of the specific current original picture;

producing a plurality of referential hierarchy pictures of different resolutions from a referential original picture of one block of the referential frame indicated by one block of non-compressed picture signals stored in the frame memory for each block of the referential frame by setting a referential hierarchy picture of the highest resolution as the referential original picture and obtaining a referential hierarchy picture of a resolution lower than that of a specific referential hierarchy picture each time every other pixel is removed in an x direction from pixels of the specific referential original picture and every other pixel is removed in a y direction from pixels of the specific referential original picture;

repeatedly calculating an intermediate motion vector from one current hierarchy picture and one referential hierarchy picture and a rough motion vector calculated just before the calculation of the intermediate motion vector while changing the current and referential hierarchy pictures to other current and referential hierarchy pictures of higher resolution; and finally calculating the motion vector from the current and referential hierarchy pictures of the highest resolution for each block of the current frame, the motion vector for a block of the current frame indicating a block of the referential frame, and the rough motion vector indicating candidates for a particular block of the referential frame indicated by the motion vector.

34. A picture signal converting method according to claim 32 in which the step of coding each block of non-compressed picture signals comprises the steps of:

storing the blocks of DCT coefficients of non-compressed luminance signals in a DCT coefficient buffer, each block of DCT coefficients of non-compressed luminance signals corresponding to a block of the current frame;

storing the blocks of non-compressed picture signals of the 4:2:0 color component type in an input buffer as picture signals of a current frame frame by frame;

performing a discrete cosine transform (DCT) processing for each block of non-compressed picture signals stored in the input buffer to obtain a plurality of blocks of discrete cosine transform (DCT) coefficients;

quantizing the blocks of DCT coefficients to produce a plurality of quantized values of the current frame;

performing an inverted DCT processing for the blocks of DCT coefficients to reproduce the blocks of non-compressed picture signals of the 4:2:0 color component type;

storing the blocks of non-compressed picture signals of the 4:2:0 color component type in a frame memory as picture signals of a referential frame, other non-compressed picture signals of the 4:2:0 color component type corresponding to a frame succeeding to the referential frame being stored in the input buffer;

calculating a motion vector indicating the motion of a picture according to one block of DCT coefficients of non-compressed luminance signals in a DCT coefficient buffer and the non-compressed picture signals of the 4:2:0 color component type of the referential frame stored in the frame memory for each block of the current frame;

calculating an inter-frame difference between one block of non-compressed picture signals of the current frame and a corresponding block of non-compressed picture signals of the referential frame indicated by the motion vector;

selecting a type of coding performed for the quantized values of the current frame;

performing a variable length coding for the quantized values according to the coding type, the motion vectors and the inter-frame differences to produce pieces of variable length coded data; and producing the digital picture signals compressed in the MPEG format from the variable length coded data, and the step of calculating a motion vector comprises the steps of:

repeatedly extracting a group of DCT coefficients from each block of DCT coefficients of luminance signals stored in the DCT coefficient buffer on condition that a frequency band of the group of DCT coefficients gradually extends to a higher frequency;

performing an inverted DCT processing for each group of DCT coefficients to produce a plurality of hierarchy pictures respectively indicated by a plurality of non-compressed luminance signals, the hierarchy pictures of different resolutions being produced for each block;

repeatedly calculating an intermediate motion vector from one hierarchy picture and a referential original picture of the referential frame indicated by non-compressed luminance signals of the non-compressed picture signals stored in the frame memory and a rough motion vector calculated just before the calculation of the intermediate motion vector while changing the hierarchy picture to another hierarchy picture of a higher resolution, the rough motion vector indicating candidates for a particular block of the referential frame indicated by the intermediate motion vector; and finally calculating the motion vector from the hierarchy picture of the highest resolution and the referential original picture, the motion vector for a block of the current frame indicating a block of the referential frame.

35. A picture signal converting method according to claim 32 in which the step of coding each block of non-compressed picture signals comprises the steps of:

storing the blocks of DCT coefficients of non-compressed luminance signals in a DCT coefficient buffer, each block of DCT coefficients of non-compressed luminance signals corresponding to a block of the current frame;

storing the blocks of non-compressed picture signals of the 4:2:0 color component type in an input buffer as picture signals of a current frame frame by frame;

performing a discrete cosine transform (DCT) processing for each block of non-compressed picture signals stored in the input buffer to obtain a plurality of blocks of discrete cosine transform (DCT) coefficients;

quantizing the blocks of DCT coefficients to produce a plurality of quantized values of the current frame;

performing an inverted DCT processing for the blocks of DCT coefficients to reproduce the blocks of non-compressed picture signals of the 4:2:0 color component type;

storing the blocks of non-compressed picture signals of the 4:2:0 color component type in a frame memory as picture signals of a referential frame, other non-compressed picture signals of the 4:2:0 color component type corresponding to a frame succeeding to the referential frame being stored in the input buffer;

calculating a motion vector indicating the motion of a picture according to one block of DCT coefficients of non-compressed luminance signals in the DCT coefficient buffer and the non-compressed picture signals of the 4:2:0 color component type of the referential frame stored in the frame memory for each block of the current frame;

calculating an inter-frame difference between one block of non-compressed picture signals of the current frame and a corresponding block of non-compressed picture signals of the referential frame indicated by the motion vector;

selecting a type of coding performed for the quantized values of the current frame;

performing a variable length coding for the quantized values according to the coding type, the motion vectors and the inter-frame differences to produce pieces of variable length coded data; and producing the digital picture signals compressed in the MPEG format from the variable length coded data, and the step of calculating a motion vector comprises the steps of:

extracting a plurality of DCT coefficients of non-compressed luminance signals arranged in a row as an x-directional group of DCT coefficients from each block of DCT coefficients of non-compressed luminance signals stored in the DCT coefficient buffer;

extracting a plurality of DCT coefficients of non-compressed luminance signals arranged in a column as a y-directional group of DCT coefficients from each block of DCT coefficients of non-compressed luminance signals stored in the DCT coefficient buffer;

performing a one-dimensional inverted DCT processing for the x-directional group of DCT coefficients to obtain x-directional information composed of non-compressed luminance signals arranged in the x direction for each block of the current frame;

performing a one-dimensional inverted DCT processing for the y-directional group of DCT coefficients to obtain y-directional information composed of non-compressed luminance signals arranged in the y direction for each block of the current frame;

calculating an x-directional motion vector according to the x-directional information and non-compressed luminance signals of the non-compressed picture signals stored in the frame memory for each block of the current frame;

specifying a plurality of remarked blocks of referential frame arranged in the neighborhood of a particular block of the referential frame indicated by the x-directional motion vector; and calculating the motion vector according to the y-directional information and non-compressed luminance signals of the remarked blocks for each block of the current frame.

36. A picture providing system, comprising:

picture input means for receiving a plurality of digital picture signals compressed in a first format;

picture reproducing means for reproducing a digital picture according to a plurality of digital picture signals compressed in a second format different from the first format;

picture providing means for receiving the digital picture signals compressed in the first format from the picture input means, converting the digital picture signals compressed in the first format into the digital picture signals compressed in the second format and transmitting the digital picture signals compressed in the second format to the picture reproducing means; and a network through which the digital picture signals compressed in the first format is transmitted from the picture input means to the picture providing means and the digital picture signals compressed in the second format is transmitted from the picture providing means to the picture reproducing means, the picture providing means comprising:

communicating means for receiving the digital picture signals compressed in the first format from the picture input means through the network and outputting the digital picture signals compressed in the second format to the picture reproducing means through the network; and picture signal converting means for converting the digital picture signals of the first format received by the communicating means into the digital picture signals compressed in the second format and outputting the digital picture signals compressed in the second format to the communicating means, and the picture signal converting means comprising picture decoding means for decoding the digital picture signals compressed in the first format to produce a plurality of non-compressed picture signals of a 4:1:1 color component type, the non-compressed picture signals being arranged in a matrix of rows and columns;

component signal converting means for directly converting color difference signals of the non-compressed picture signals obtained by the picture decoding means into converted color difference signals of a 4:2:0 color component type by removing color difference signals on every other row from the color difference signals of the non-compressed picture signals to halve the number of color difference signals in a y direction and adding a color difference signal to a position between each pair of color difference signals adjacent to each other in an x direction to double the number of color difference signals in the x direction, setting values of the converted color difference signals of the 4:2:0 color component type according to values of the color difference signals of the non-compressed picture signals obtained by the picture decoding means and combining luminance signals of the non-compressed picture signals obtained by the picture decoding means and the converted color difference signals of the 4:2:0 color component type obtained by the color difference signal converting means for each pixel of the frame to produce non-compressed picture signals of the 4:2:0 color component type; and picture coding means for coding the non-compressed picture signals of the 4:2:0 color component type obtained by the component signal converting means to produce the digital picture signals compressed in the second format.

37. A picture providing system according to claim 36 in which the first format of the digital picture signals received by the picture input means is a DVC format, the digital picture signals compressed in the DVC format being obtained by performing a discrete cosine transform (DCT) processing for each block of non-compressed picture signals of a 4:1:1 color component type to obtain a block of DCT coefficients from each block of non-compressed picture signals, quantizing each block of DCT coefficients to obtain a block of quantized values from each block of DCT coefficients, coding each block of quantized values to obtain a block of variable-length codes from each block of quantized values and recording each block of variable-length codes as the digital picture signals compressed in the DVC format, and the second format of the digital picture signals obtained by the picture signal converting means is a moving picture experts group (MPEG) format in which a time-redundancy between frames is reduced by performing a motion compensation, a space-redundancy in each frame is reduced by performing a discrete cosine transform and a code volume is reduced by performing a variable length coding.

38. A picture providing system according to claim 36 in which the picture reproducing means further comprises picture signal storing means for storing the digital picture signals of the first format received by the communicating means and the digital picture signals of the second format obtained by the picture signal converting means;

control means for receiving a picture output request indicating a request of the output of digital picture signals of the second format from the picture reproducing means through the network and the communicating means, controlling the picture signal storing means and the communicating means to output the digital picture signals of the second format stored in the picture signal storing means to the picture reproducing means through the communicating means and the network.

39. A picture providing system according to claim 36 in which the picture reproducing means further comprises control means for receiving a picture output request indicating a request of the output of digital picture signals of the second format from the picture reproducing means through the network and the communicating means, controlling the picture signal converting means to convert the digital picture signals compressed in the first format into the digital picture signals compressed in the second format according to the picture output request and controlling the communicating means to output the digital picture signals compressed in the second format to the picture reproducing means through the network.

40. A picture providing system, comprising:

picture input means for receiving a plurality of digital picture signals compressed in a first format;

picture reproducing means for reproducing a digital picture according to a plurality of digital picture signals compressed in a second format different from the first format;

picture providing means for receiving the digital picture signals compressed in the first format from the picture input means, converting the digital picture signals compressed in the first format into the digital picture signals compressed in the second format and transmitting the digital picture signals compressed in the second format to the picture reproducing means; and a network through which the digital picture signals compressed in the first format is transmitted from the picture input means to the picture providing means and the digital picture signals compressed in the second format is transmitted from the picture providing means to the picture reproducing means, the picture providing means comprising:

communicating means for receiving the digital picture signals compressed in the first format from the picture input means through the network and outputting the digital picture signals compressed in the second format to the picture reproducing means through the network; and picture signal converting means for converting the digital picture signals of the first format received by the communicating means into the digital picture signals compressed in the second format and outputting the digital picture signals compressed in the second format to the communicating means, and the picture signal converting means comprising picture decoding means for decoding the digital picture signals of the first format to produce a plurality of discrete cosine transform (DCT) coefficients of non-compressed picture signals of a 4:1:1 color component type, converting the DCT coefficients into a plurality of DCT coefficients of non-compressed picture signals of a 4:2:0 color component type and producing a plurality of non-compressed picture signals of the 4:2:0 color component type from the DCT coefficients of the non-compressed picture signals of the 4:2:0 color component type; and picture coding means for coding the non-compressed picture signals of the 4:2:0 color component type obtained by the picture decoding means to produce the digital picture signals compressed in the second format.

41. A picture providing system according to claim 40 in which the first format of the digital picture signals received by the picture input means is a DVC format, the digital picture signals compressed in the DVC format being obtained by performing a discrete cosine transform (DCT) processing for each block of non-compressed picture signals of a 4:1:1 color component type to obtain a block of DCT coefficients from each block of non-compressed picture signals, quantizing each block of DCT coefficients to obtain a block of quantized values from each block of DCT coefficients, coding each block of quantized values to obtain a block of variable-length codes from each block of quantized values and recording each block of variable-length codes as the digital picture signals compressed in the DVC format, and the second format of the digital picture signals obtained by the picture signal converting means is a moving picture experts group (MPEG) format in which a time-redundancy between frames is reduced by performing a motion compensation, a space-redundancy in each frame is reduced by performing a discrete cosine transform and a code volume is reduced by performing a variable length coding.

42. A picture providing system according to claim 40 in which the picture decoding means of the picture signal converting means comprises preparing means for deshuffling the digital picture signals to rearrange the digital picture signals;

variable-length decoding means for performing a variable-length decoding for the digital picture signals deshuffled by the preparing means to produce a plurality of quantized values;

inverted quantization means for performing an inverted quantization for the quantized values produced by the variable-length decoding means to produce a plurality of blocks of discrete cosine transform (DCT) coefficients of the non-compressed picture signals of the 4:1:1 color component type, the DCT coefficients of each block being arranged in a matrix of rows and columns;

DCT coefficient converting means for extracting a block of DCT coefficients of non-compressed color difference signals of the 4:1:1 color component type from each block of DCT coefficients of the non-compressed picture signals obtained by the inverted quantization means and converting each block of DCT coefficients of the non-compressed color difference signals of the 4:1:1 color component type to a block of DCT coefficients of non-compressed color difference signals of a 4:2:0 color component type by removing a lower half portion of DCT coefficients corresponding to higher frequency from each block of DCT coefficients to halve a resolution of the DCT coefficients in a y direction for each block and adding DCT coefficients on the right side of the remaining DCT coefficients for each block to double a resolution of the DCT coefficients in an x direction for each block; and inverted DCT processing means for performing an inverted DCT processing for each block of DCT coefficients of non-compressed luminance signals extracted from the DCT coefficients of the non-compressed picture signals obtained by the inverted quantization means and a corresponding block of DCT coefficients of the non-compressed color difference signals of the 4:2:0 color component type obtained by the DCT coefficient converting means to produce the non-compressed picture signals of the 4:2:0 color component type.

43. A picture providing system according to claim 40 in which the picture reproducing means further comprises picture signal storing means for storing the digital picture signals of the first format received by the communicating means and the digital picture signals of the second format obtained by the picture signal converting means;

control means for receiving a picture output request indicating a request of the output of digital picture signals of the second format from the picture reproducing means through the network and the communicating means, controlling the picture signal storing means and the communicating means to output the digital picture signals of the second format stored in the picture signal storing means to the picture reproducing means through the communicating means and the network.

44. A picture providing system according to claim 40 in which the picture reproducing means further comprises control means for receiving a picture output request indicating a request of the output of digital picture signals of the second format from the picture reproducing means through the network and the communicating means, controlling the picture signal converting means to convert the digital picture signals compressed in the first format into the digital picture signals compressed in the second format according to the picture output request and controlling the communicating means to output the digital picture signals compressed in the second format to the picture reproducing means through the network.

\* \* \* \* \*